United States Patent
Otomo et al.

(10) Patent No.: US 7,095,704 B2
(45) Date of Patent: Aug. 22, 2006

(54) AUDIO DATA STRUCTURE, RECORDING MEDIUM THEREOF, AND PROCESSING APPARATUS THEREOF

(75) Inventors: Hitoshi Otomo, Yokohama (JP); Hideki Mimura, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 610 days.

(21) Appl. No.: 10/386,459

(22) Filed: Mar. 13, 2003

(65) Prior Publication Data

US 2003/0152370 A1 Aug. 14, 2003

Related U.S. Application Data

(62) Division of application No. 09/381,615, filed as application No. PCT/JP99/00248 on Jan. 22, 1999, now Pat. No. 6,567,371.

(30) Foreign Application Priority Data

Jan. 23, 1998 (JP) .................................. 10/11679

(51) Int. Cl.
*G11B 7/24* (2006.01)
*H04N 5/91* (2006.01)

(52) U.S. Cl. ............................ 369/275.3; 369/30.04; 369/47.15; 386/95; 386/98; 386/125

(58) Field of Classification Search ............ 369/275.3, 369/275.1, 47.1, 47.12, 47.15, 53.41, 53.32, 369/30.04, 30.07; 360/78.04; 386/95, 125, 386/126, 98, 120, 96, 104, 105, 54
See application file for complete search history.

(56) References Cited

U.S. PATENT DOCUMENTS

| | | | |
|---|---|---|---|
| 5,530,686 A | 6/1996 | Schylander et al. | |
| 5,625,611 A | 4/1997 | Yokota et al. | |
| 5,636,200 A | 6/1997 | Taira et al. | |
| 5,719,837 A | 2/1998 | Aramaki | |
| 5,841,793 A | 11/1998 | Fukuda | |
| 6,222,806 B1 | 4/2001 | Mori et al. | |
| 6,385,389 B1 | 5/2002 | Maruyama et al. | |
| 6,392,984 B1 | 5/2002 | Mori et al. | |
| 6,453,119 B1 | 9/2002 | Maruyama et al. | |
| 6,532,335 B1 * | 3/2003 | Otomo et al. | 386/95 |
| 6,724,979 B1 * | 4/2004 | Otomo et al. | 386/95 |

(Continued)

FOREIGN PATENT DOCUMENTS

EP 0 810 757 A1 12/1997

(Continued)

OTHER PUBLICATIONS

H. Mimura, et al., Toshiba Review, vol. 51, No. 12, 9 pages, "Application Format DVD-Video," Dec. 1, 1996 (see partial English description on p. No. 12).

(Continued)

*Primary Examiner*—Ali Neyzari
(74) *Attorney, Agent, or Firm*—Oblon, Spivak, McClelland, Maier & Neustadt, P.C.

(57) ABSTRACT

In audio contents which have cells for defining an audio title playback unit and whose actual playback sequence is determined by defining the playback sequence of the cells, cell information to specify the cells is provided with identification information to identify the types of the cells according to the difference in the contents of the data included in the cells. One type of the contents of the data in the cells is for obtaining the length of the silent period of time. The identification information corresponding to the cell indicates a silent cell.

3 Claims, 33 Drawing Sheets

U.S. PATENT DOCUMENTS 6,748,160 B1 * 6/2004 Otomo et al. ............... 386/95

FOREIGN PATENT DOCUMENTS

| EP | 0 910 082 A2 | 4/1999 |
|---|---|---|
| EP | 0 918 331 A2 | 5/1999 |
| JP | 59-195307 | 11/1984 |
| JP | 60-119671 | 6/1985 |
| JP | 64-88964 | 4/1989 |
| JP | 8-336104 | 12/1996 |
| JP | 9-22577 | 1/1997 |
| JP | 9-259506 | 10/1997 |
| JP | 09-259539 | 10/1997 |
| JP | 11-16282 | 1/1999 |
| JP | 11-203794 | 7/1999 |
| WO | WO 97/21310 | 6/1997 |

OTHER PUBLICATIONS

Pohlmann K C, "The Compact Disc System", XP-002163595, pp. 47-101, GB, 1992.

* cited by examiner

FIG. 15 EXAMPLE OF ATS INCLUDING VTS

AUDIO MANAGER INFORMATION MANAGEMENT TABLE AMGI_MAT

| BYTE LOCATION | SYMBOL | DESCRIPTION | NO. OF BYTES |
|---|---|---|---|
| 0-11 | AMG_ID | AMG IDENTIFIER | 12 |
| 12-15 | AMG_EA | AMG END ADDRESS | 4 |
| 16-27 | RESERVATION | RESERVATION | 12 |
| 28-31 | AMGI_EA | AMGI END ADDRESS | 4 |
| 32-33 | VERN | VERSION | 2 |
| 34-37 | RESERVATION | RESERVATION | 4 |
| 38-45 | VLMS_ID | VOLUME SETTING IDENTIFIER | 8 |
| 46-47 | AP_INF | AUTOPLAY INFORMATION | 2 |
| 48-51 | ASUS_SA | START ADDRESS | 4 |
| 52-61 | RESERVATION | RESERVATION | 10 |
| 62-63 | TS_Ns | NUMBER OF TS | 2 |
| 64-95 | PVR_ID | PROVIDER'S UNIQUE ID | 32 |
| 96-127 | RESERVATION | RESERVATION | 32 |
| 128-131 | AMGI_MAT_EA | END ADDRESS | 4 |
| 132-191 | RESERVATION | RESERVATION | 60 |
| 192-195 | AMGM_VOBS_SA | START ADDRESS | 4 |
| 196-199 | ATT_SRPT_SA | START ADDRESS | 4 |
| 200-203 | AOTT_SRPT_SA | START ADDRESS | 4 |
| 204-207 | AMGM_PGCI_UT_SA | START ADDRESS | 4 |
| 208-211 | RESERVATION | RESERVATION | 4 |
| 212-215 | ATXTDT_MG_SA | START ADDRESS | 4 |
| 216-255 | RESERVATION | RESERVATION | 40 |
| 256-257 | AMGM_V_ATR | VIDEO ATTRIBUTE | 2 |
| 258-339 | RESERVATION | RESERVATION | 82 |
| 340-341 | AMGM_SPST_Ns | NO. OF SUB-PICTURE STREAMS | 2 |
| 342-347 | AMGM_SPST_ATR | SUB-PICTURE ATTRIBUTE OF AMGM_VOBS | 6 |
| 348-349 | AMGM_AST_Ns | NO. OF AUDIO STREAMS | 2 |
| 350-357 | AMGM_AST_ATR | AUDIO STREAM ATTRIBUTES | 8 |
| 358-2047 | RESERVATION | RESERVATION | 1690 |
| | | TOTAL NUMBER OF BYTES | 2048 |

FIG. 17

| ATT NO. | CONTENTS OF ATT | AOTT GROUP (AOTT_GR) | | ATT GROUP (ATT_GR) | |
|---|---|---|---|---|---|
| | | AOTT_SRPT | AOTT GR NO. | ATT_SRPT | ATT GR NO. |
| #1 | AVTT | NONE | — | FOR AVTT | GR#1 |
| #2 | AVTT&AOTT | FOR AOTT | GR#1 | FOR AVTT | GR#1 |
| #3 | AOTT | FOR AOTT | GR#1 | FOR AOTT | GR#2 |
| #4 | AOTT | FOR AOTT | GR#1 | FOR AOTT | GR#2 |
| #5 | AOTT | FOR AOTT | GR#2 | FOR AOTT | GR#3 |
| #6 | AOTT | FOR AOTT | GR#2 | FOR AOTT | GR#3 |
| #7 | AOTT | FOR AOTT | GR#2 | FOR AOTT | GR#3 |
| #8 | AVTT&AOTT | NONE | — | FOR AVTT | GR#4 |
| #9 | AVTT | NONE | — | FOR AVTT | GR#4 |

FIG. 22

AUDIO TITLE SET INFORMATION MANAGEMENT TABLE ATSI_MAT

| BYTE LOCATION | SYMBOL | DESCRIPTION | NO. OF BYTES |
|---|---|---|---|
| 0-11 | ATS_ID | ATS IDENTIFIER | 12 |
| 12-15 | ATS_EA | ATS END ADDRESS | 4 |
| 16-27 | RESERVATION | RESERVATION | 12 |
| 28-31 | ATSI_EA | ATSI END ADDRESS | 4 |
| 32-33 | VERN | VERSION | 2 |
| 34-127 | RESERVATION | RESERVATION | 94 |
| 128-131 | ATSI_MAT_EA | END ADDRESS | 4 |
| 132-191 | RESERVATION | RESERVATION | 60 |
| 192-195 | VTS_SA | START ADDRESS | 4 |
| 196-199 | AOTT_AOBS_SA/ AOTT_VOBS_SA | START ADDRESS | 4 |
| 200-203 | RESERVATION | RESERVATION | 4 |
| 204-207 | ATS_PGCIT_SA | START ADDRESS | 4 |
| 208-255 | RESERVATION | RESERVATION | 48 |
| 256-383 | AOTT_AOB_ATR/ AOTT_VOB_ART (#0~#7) | ATTRIBUTE OF AOTT AOB OR ATTRIBUTE OF AOTT VOB AUDIO STREAM | 128 |
| 384-671 | ATS_DM_COEFT (#0~#15) | MULTICHANNEL→MIXING COEFFICIENT FOR 2-CHANNEL AUDIO DATA | 288 |
| 672-2047 | RESERVATION | RESERVATION | 1376 |
|  |  | TOTAL NO. OF BYTES | 2048 |

FIG. 24

AUDIO TITLE SET PROGRAM INFORMATION ATS_PGI

| RELATIVE BYTE LOCATION | SYMBOL | DESCRIPTION | NO. OF BYTES |
|---|---|---|---|
| 0-3 | ATS_PG_CNT | CONTENTS OF ATS_PG | 4 |
| 4 | ATS_PG_EN_CN | ENTRY CELL NO. OF ATS_PG | 1 |
| 5 | RESERVATION | RESERVATION | 1 |
| 6-9 | FAC_S_PTM | PLAYBACK START TIME OF 1ST AUDIO CELL IN ATS_PG | 4 |
| 10-13 | ATS_PG_PB_TM | PLAYBACK TIME OF ATS_PG | 4 |
| 14-17 | ATS_PG_PA_TM | PAUSE TIME OF ATS_PG | 4 |
| 18 | RESERVATION | RESERVATION FOR COPY MANAGEMENT INFORMATION | 1 |
| 19 | RESERVATION | RESERVATION | 1 |

FIG. 26

AUDIO TITLE SET CELL PLAYBACK INFORMATION ATS_C_PBI

| RELATIVE BYTE LOCATION | SYMBOL | DESCRIPTION | NO. OF BYTES |
|---|---|---|---|
| 0 | ATS_C_IXN | INDEX NO. OF ATS_C | 1 |
| 1 | ATS_C_TY | TYPE OF ATS_C | 1 |
| 2-3 | RESERVATION | RESERVATION | 2 |
| 4-7 | ATS_C_SA | START ADDRESS OF ATS_C | 4 |
| 8-11 | ATS_C_EA | END ADDRESS OF ATS_C | 4 |

ATS_PG_ASV_PBI_SRP

| RELATIVE BYTE LOCATION | SYMBOL | DESCRIPTION | NO. OF BYTES |
|---|---|---|---|
| 0 | ASVUN | NO. OF ASVU | 1 |
| 1 | ASV_DMOD | DISPLAY MODE OF ASV | 1 |
| 2-3 | ATS_ASV_PBI_SA | START ADDRESS OF ATS_ASV_PBI | 2 |
| 3-4 | ATS_ASV_PBI_EA | END ADDRESS OF ATS_ASV_PBI | 2 |

AUDIO DATA STRUCTURE, RECORDING MEDIUM THEREOF, AND PROCESSING APPARATUS THEREOF

TECHNICAL FIELD

This invention relates to an audio data structure which facilities the handling of high sound-quality audio data in processing (recording, reproducing, transmitting, and constructing) the data and fulfills the high sound-quality requirement, a recording medium for the audio data structure, and an apparatus for processing its signal.

BACKGROUND ART

DVD video disks are optical disk on which video (moving picture) information can be recorded very densely with high quality and further various types of information, including multiangle pictures, sub-pictures, multilingual voice, and multichannel audio, can be recorded. Such DVD video disks have been developed and on the market and are finding their way into wide application. (DVD is an abbreviation for Digital Versatile Disk.)

The specifications for DVD video disks cover not only compressed multichannel audio (including AC-3 and MPEG) but also uncompressed linear PCM (including 48 kHz sampling, 16-bit quantization, 96 kHz sampling, and 24-bit quantization). The DVD video linear PCM meets the high-frequency sampling, high-number bit, high sound quality specifications, which surpass those for conventional music CDs (with 44.1 kHz sampling and 16 bit quantization). Linear PCM with 96-kHz sampling and 20- to 24-bit quantization is sufficiently qualified for the next generation digital audio disks (what is called super CDs or super audio disks).

However, the DVD video specifications have been determined by video requirements rather than audio requirements. In terms of not only sampling frequency and the number of quantization bits but also the number of recordable channels and recordable time, audio-oriented specifications surpassing the DVD video sound specifications have been expected.

To meet the expectation, DVD audio specifications have been studied (it should be noted that the DVD audio specifications have not been in the prior art yet). The DVD audio specifications have been considered to be capable of supporting linear PCM with 48- to 96-kHz sampling and 24-bit quantization employed in the DVD video specifications up to linear PCM with 192-kHz sampling and 24-bit quantization. Moreover, future versions of the DVD audio specifications might introduce much higher sound quality.

The reason why the DVD audio provides upward compatibility is that it has a part shared with DVD video that can record a large volume of data covering high-definition television images. Moreover, the DVD audio is characterized by having technical, marketable, and economical advantages in the future when it can be used as a result of advance in the DVD video.

For example, when high-capacity DVD disks to be put in practical use in future DVD video are used in DVD audio, if the recording time is constant, there is a possibility that the sampling frequency in recording, the number of quantization bits, and the number of recording channels will be increased more and more. In addition, the technique for DVD video recorders using DVD-RAMs (or rewritable DVD-RW or write-once DVD-R) to be put in practical use in the near future can be used in DVD audio recorders to come in practice soon or later.

Furthermore, as the popularization of DVD video expands its market, DVD video and DVD audio share increasingly more of the recording mediums (including DVD-ROM disks, DVD-RAM/DVD-RW disks, and DVD-R disks), unit parts (including disk drives, optical pickups, and various types of ICs), and various control programs. This accelerates the cost reduction of DVD audio products featuring high sound quality and other advantages. When DVD audio is used widely, DVD video will enjoy the future technical, marketable, and economical advantages available as a result of advance in DVD audio.

As described above, the development of DVD audio has been expected, but, as seen from the aforementioned DVD video, DVD audio with various functions and performances will possibly be proposed and developed as a result of a high-density recording disk having been developed. Specifically, there is a possibility that DVD audio with a different data structure in terms of sampling frequency, the number of quantization bits, and the number of channels will be produced. Moreover, DVD audio with a different data structure in terms of functions, such as DVD audio with or without menu images, or DVD audio with or without background images, will possibly be produced.

Accordingly, an object of the present invention is to provide a data structure that enables audio attributes to be specified track by track. The data structure makes it possible to allow the reproduction side to deal with DVD audio easily even if various functions and performances are included in the DVD audio.

The reproduction side needs a preparation time for changing the hardware devices according to the change of the attributes. The preparation time causes a break in the sound output. Accordingly, another object of the present invention is to provide a data structure which positively recognizes a break in sound and allows the designer or producer to set a sound break period arbitrary. The data structure makes it possible to make silent periods between pieces of music constant when, for example, a DVD audio disk is played back, which provides the user with a stable playback condition.

DISCLOSURE OF THE INVENTION

To achieve the foregoing objects, identification information to identify the type of cells by the difference in the contents of the data included in the cells is provided in cell information to specify the cells in audio contents that have cells defining at least an audio title playback unit and determines the actual playback sequence by defining the playback sequence of the cells. This enables the data structure creator side to deliberately realize data processing management, timing management, and setting management on the reproducing apparatus side during playback according to the contents of the data on the basis of the identification information.

One type of the contents of the data in the cells is for determining the length of a silent period of time. The identification information corresponding to the cell is characterized by indicating a silent cell. Providing a silent cell for determining the time of the silent period enables a silent period to be set. Using the silent period, the reproducing apparatus side can change or set the attributes. In a case where tracks with a break on sound are mingled with tracks without a break in sound, effective use of silent cells at the head of a track without a break in sound makes it possible to edit the data in such a manner that a uniform pause period giving no unnatural feeling on the whole is taken.

BRIEF DESCRIPTION OF DRAWINGS

FIG. 17 shows the recorded contents of the audio manager information management table (AMGI_MAT) included in the audio manager information (AMGI) shown in FIG. 16;

FIG. 22 is a table showing the relationship between a group of audio-only titles (AOTT_GR) accessed using the audio-only title search pointer (AOTT_SRP) in the audio manager information (AMGI) shown in FIG. 16 and a group of audio titles (ATT_GR) accessed using the audio title search pointer (ATT_SRP) in the audio manager information (AMGI);

FIG. 24 shows the recorded contents of the audio title set information management table (ATSI_MAT) included in the audio title set information (ATSI) shown in FIG. 23;

FIG. 26 is a table showing the contents of the audio title set program information (ATS_PGI) shown in FIG. 25;

FIG. 27 is a table showing the contents of the audio title set cell playback information (ATS_C_PBI) shown in FIG. 25;

DESCRIPTION OF THE INVENTION

Hereinafter, referring to the accompanying drawings, an embodiment of the present invention will be explained. This invention relates to an audio data structure which facilitates the handling of high sound quality audio data and assures the high sound quality in processing (recording, reproducing, transferring, and constructing) the high sound quality audio data, a recording medium thereof, a processing apparatus thereof, and a processing method thereof.

In the embodiment, explanation will be given as to a case where the present invention is applied to a system where the objects of contents (including various video contents and various audio contents) are shared. In addition, explanation will be given as to a case where the invention is applied to an information recording medium with management data used to share the objects of contents, an apparatus for reproducing the recorded information from the medium, a method of recording information including the management data on the medium, and a method of reproducing the information from the medium on the basis of the management data.

Figure 1:
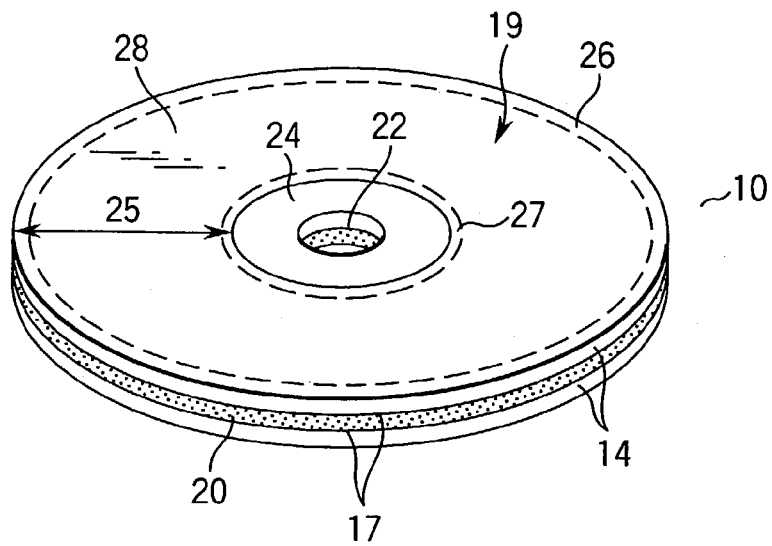
FIG. 1 is a perspective view to help explain the configuration of an optical disk usable as a DVD audio recording medium.

FIG. 1 is a perspective view showing the configuration of an optical disk 10 that can be used as a DVD audio recording medium. As shown in FIG. 1, the optical disk 10 is such that two transparent substrates 14 on each of which a recording layer 17 is provided are laminated together with an adhesion layer 20. Each substrate 14 is made of 0.6-mm-thick polycarbonate. The adhesion layer 20 is made of very thin (for example, 40-μm-thick) ultraviolet-curing resin. The two 0.6-mm-thick substrates 14 are laminated together in such a manner that the recording layer 17 of each substrate is in contact with one surface of the adhesion layer 20, which produces a 1.2-mm-thick large-capacity optical disk 10.

In the optical disk 10, a central hole 22 is made. Around the central hole 22 on both sides of the optical disk 10, clamp areas 24 for clamping the optical disk 10 during rotation are provided. When the optical disk 10 is loaded into a disk drive unit (not shown), the spindle of a disk motor is inserted in the central hole 22. While the optical disk 10 is rotating, the disk is clamped by disk dampers (not shown) in the clamp areas 24.

The optical disk 10 has an information area 25 around the clamp areas 24 in which video data, audio data, and other pieces of information can be recorded.

In the information area 25, a lead-out area 26 is provided at the outer edge and a lead-in area 27 is provided at the inner edge adjacent to the clamp area 24. A data recording area 28 is defined between the lead-out area 26 and lead-in area 27.

In the recording layer (light reflecting layer) 17 of the information area 25, recording tracks are formed continuously, for example, in a spiral. The continuous tracks are divided into physical sectors. Serial numbers are allocated to the sectors. Using the sectors as recording units, various types of data are recorded on the optical disk 10.

The data recording area 28 is an actual data recording area including a DVD audio data recording area and a DVD video data recording area (the DVD video data recording area might not be used in a pure audio disk).

In the DVD audio data recording area, audio data is chiefly written as recording and playback information in the form of pit trains (or in a physical shape or phase that optically changes the laser reflected light). Depending on the situation, still picture data may be recorded in the DVD audio data recording area. The audio data recorded in the DVD audio data recording area can include completely silent data (not a silent portion in music but intentionally silent data).

On the other hand, in the DVD video data recording area, video data (main picture data) for movies, sub-picture data for subtitles and menus, and audio data for words and sound effects are recorded as recording and playback information in the form of pit trains.

When the optical disk 10 is a single-sided single layer, double-sided recording DVD-RAM disk (or a rewritable disk; DVD-RW disk), each recording layer 17 is composed of a triple layer formed by sandwiching a phase change recording material (e.g., $Ge_2Sb_2Te_5$) between two zinc sulfide·silicon oxide mixtures ($ZnS·SiO_2$).

When the optical disk 10 is a single-sided single layer, single-sided recording RAM disk, the recording layer 17 on the reading face 19 side is composed of a triple layer including the phase change recording material layer. In this case, the layer 17 located on the opposite side when viewed from the reading face 19 side need not be an information recording layer. It may be a simple dummy layer.

When the optical disk 10 is a single-sided reading dual-layer RAM/ROM disk, two recording layers 17 are composed of a single phase change recording layer (the rear side viewed from the reading face 19; for reading) and a single translucent metal reflecting layer (the front side viewed from the reading face 19; for playback).

When the optical disk 10 is a write-once DVD-R, polycarbonate is used for a substrate. Gold may be used for a reflecting film (not shown) and an ultraviolet-curing resin may be used as a protective film (not shown). In this case, organic pigment is used for the recording layer 17. Cyanine, squarilium, chroconic, triphenylmethane dyes, xanthene, quinone dyes (e.g., naphthoquine or anthraquinone), and metal complex dyes (e.g., phthalocyanine, porphyrin, dithiol Complex, and the like) may be used as the organic pigment.

Data can be written onto such a DVD-R disk using, for example, a semiconductor laser with an output of about 6 to 12 mW at a wavelength of 650 nm.

When the optical disk 10 is a single-sided reading, dual-layer ROM disk, two recording layers 17 are composed of a single metal reflecting layer (at the back viewed from the reading face 19) and a translucent metal reflecting layer (at the front viewed from the reading face 19).

In a read-only DVD-ROM disk (for DVD audio and/or DVD video), pit trains are formed by a stamper on a substrate 14 in advance. On the surface of the substrate 14 on which the pit trains have been formed, a reflecting layer of metal or the like is formed. The reflecting layer is used as the recording layer 17. In such a DVD-ROM disk, groups serving as recording tracks are normally not provided. Instead, the pit trains formed at the surface of the substrate 14 function as tracks.

In the various types of optical disk 10, the playback-only ROM information is recorded as an emboss signal in the recording layer 17. In contrast, an emboss signal is not recorded on the substrate 14 having the read/write (or write-once) recording layer 17. Instead, a continues groove is inscribed. The groove is provided with phase change recording layers and others. In the case of a read/write DVD-RAM disk, phase change recording layers in the land portions as well as the groove are used for information recording.

When the optical disk 10 is of the single-sided reading type (with either one or two recording layers), the substrate 14 on the reverse side viewed from the reading face 19 is not necessarily transparent to a read/write laser beam. In this case, a label may be printed on the whole surface of the reverse-side substrate 14.

Figure 2:
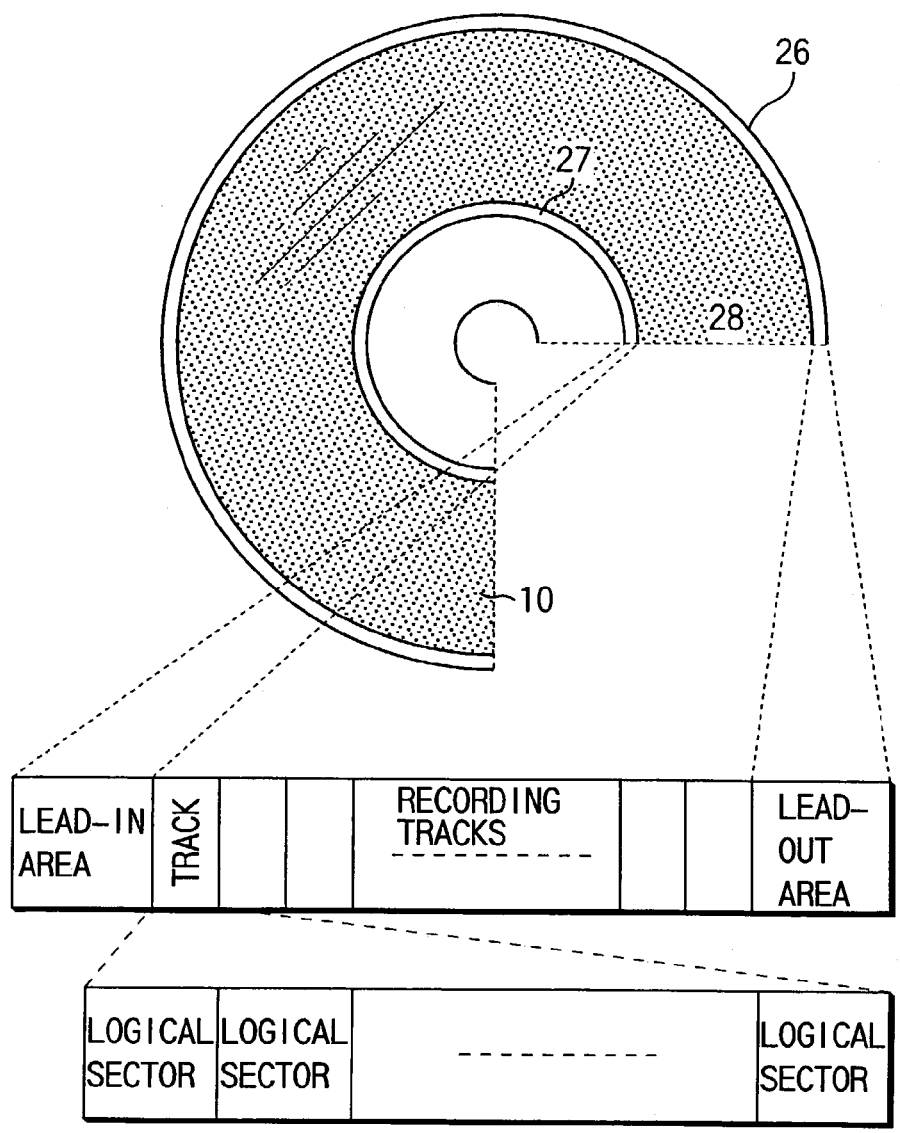
FIG. 2 is a view to help explain the correlation between the data recording area on the optical disk of FIG. 1 and recording tracks of data recorded in the area.

FIG. 2 is a diagram to help explain a correlation between the data recording area 28 on the optical disk 10 of FIG. 1 and recording tracks of data items recorded there. When the optical disk 10 is a DVD-RAM (or DVD-RW), the body of the optical disk 10 is housed in a cartridge (not shown) to protect the delicate disk surfaces. When the DVD-RAM disk together with the cartridge is inserted in the disk drive of a DVD player explained later, the optical disk 10 is drawn out of the cartridge and clamped to the turn table of a spindle motor (not shown). Then, the disk is rotated in such a manner that it faces an optical head (not shown).

On the other hand, when the disk 10 is a DVD-R or a DVD-ROM, the body of the optical disk 10 is not housed in a cartridge. The naked optical disk 10 is set directly in the disk tray of the disk drive.

On the recording layer 17 in the information area 25 of FIG. 1, data tracks are formed continuously in a spiral. As shown in FIG. 2, the continues tracks are divided into logical sectors (the minimum recording unit), each sector having a specific storage capacity. Data is recorded in logical sectors. The storage capacity of one logical sector is set at 2048 bytes (or 2 kilobytes) equal to the data length of one pack.

The data recording area 28 is an actual data recording area, in which management data and sound data have been recorded for DVD audio and similarly management data, main picture (video) data, sub-picture data, and sound data have been recorded.

Although not shown, when the optical disk 10 of FIG. 2 is a DVD-RAM disk, the data recording area 28 may be divided into ring-like (annual-ring-like) recording areas (recording zones). In this case, the angular speed of the disk rotation differs from one recording zone to another. In each zone, however, the linear speed or angular speed can be made constant. When the optical disk 10 of FIG. 2 is a DVD-ROM disk, various data items are recorded on all of the data recording area 28 at a constant linear speed.

Figure 3:
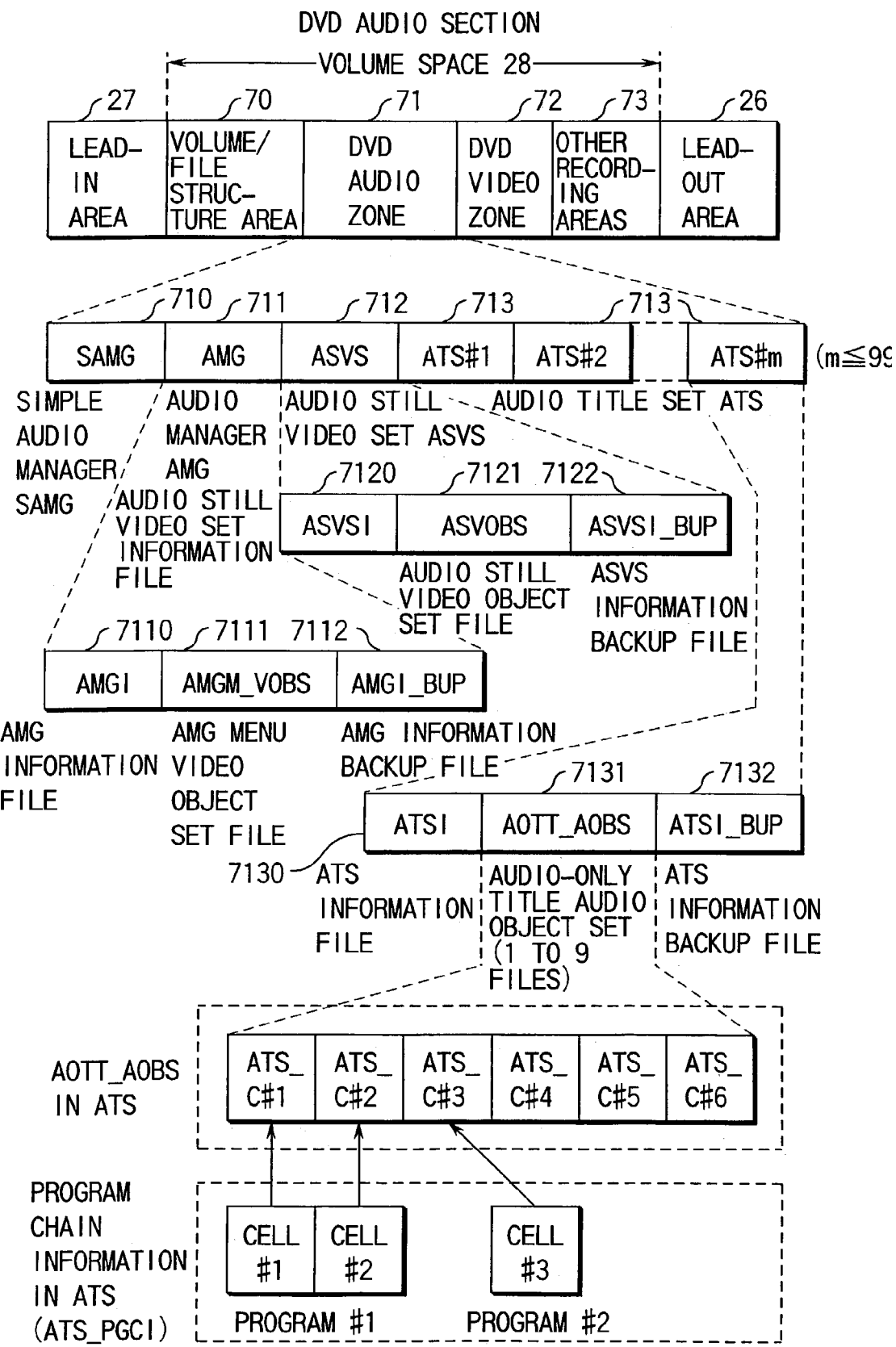
FIG. 3 is a diagram to help explain the hierarchical structure of the information recorded in a DVD audio zone among the various types of information recorded on the optical disk of FIG. 2.

FIG. 3 is a diagram to help explain the hierarchical structure of those recorded in the DVD audio zone among the various pieces of information recorded on the optical disk 10 of FIG. 2. In FIG. 3, the data recording area 28 formed on the optical disk 10 has a structure shown in the figure. A logical format in the structure is determined so as to comply with, for example, ISO 9660, one of the standards, and the universal disk format (UDF) bridge.

The data recording area 28 between the lead-in area 27 and the lead-out area 26 is allocated as a volume space 28. The volume space 28 can include a space (volume/file structure area 70) for information on volume and file structure, a space (DVD audio zone 71 and DVD video zone 72) for applications complying with the DVD standard, and a space (other recording areas 73) for applications other than those complying with the DVD standard.

The volume space 28 is physically divided into a large number of sectors. Serial numbers are allocated to the physical sectors. The logical addresses for the data items recorded in the volume space 28 mean logical sector numbers as determined in ISO 9660 and the UDF bridge. Like the effective data size of a physical sector, the size of a logical sector is set at 2048 bytes (2 kilobytes). The logical sector numbers are serial in such a manner that they correspond to ascending order of physical sector number.

Unlike a logical sector, a physical sector is given redundant information, such as error correction information. To be precise, the physical sector size therefore does not correspond to the logical sector size.

As shown in FIG. 3, the volume space 28 includes a volume/file structure area 70, a DVD audio zone 71, a DVD video zone 72, and other recording areas 73. These areas 70 to 73 are separated at the boundaries of logical sectors shown in FIG. 2. Here, one logical sector is defined as containing 2048 bytes. One logical block is defined as containing 2048 bytes. Consequently, one logical sector is defined in the same manner as one logical block.

The volume/file structure area 70 corresponds to the management area determined in ISO 9660 and the UDF bridge. On the basis of the description in the area 70, the contents of the audio manager (AMG) 711 are stored in the system memory in the DVD player explained later.

The DVD audio zone 71 is composed of a simple audio manager (SAMG) 710, an audio manager (AMG) 711, an audio still video set (ASVS) 712, and one or more audio title sets (ATS #m) 713 (the maximum number of audio title sets m is 99).

The SAMG 710 is a single file containing 128 kilobytes, into which a simple audio play pointer table (SAPPT) with the same contents has been written eight times.

The AMG 711 is composed of an audio manager information (AMGI) file 7110, an audio manager menu video object set (AMGM_VOBS) file 7111, and an audio manager information backup (AMGI_BUP) file 7112. The AMGM_VOBS file 7111 is an optional file and may be absent.

The ASVS 712 is composed of an audio still video set information (ASVSI) file 7210, an audio still video object set (ASVOBS) file 7121, and an audio still video set information backup (ASVSI_BUP) file 7122.

Each ATS 713 is composed of an audio title set information (ATSI) file 7130, an audio-only title audio object set (AOTT_AOBS) file 7131, and an audio title set information backup (ATSI_BUP) file 7132. Here, the AOTT_AOBS file 7131 is made up of one to nine files. It is an optional file and may be absent.

Figure 4:
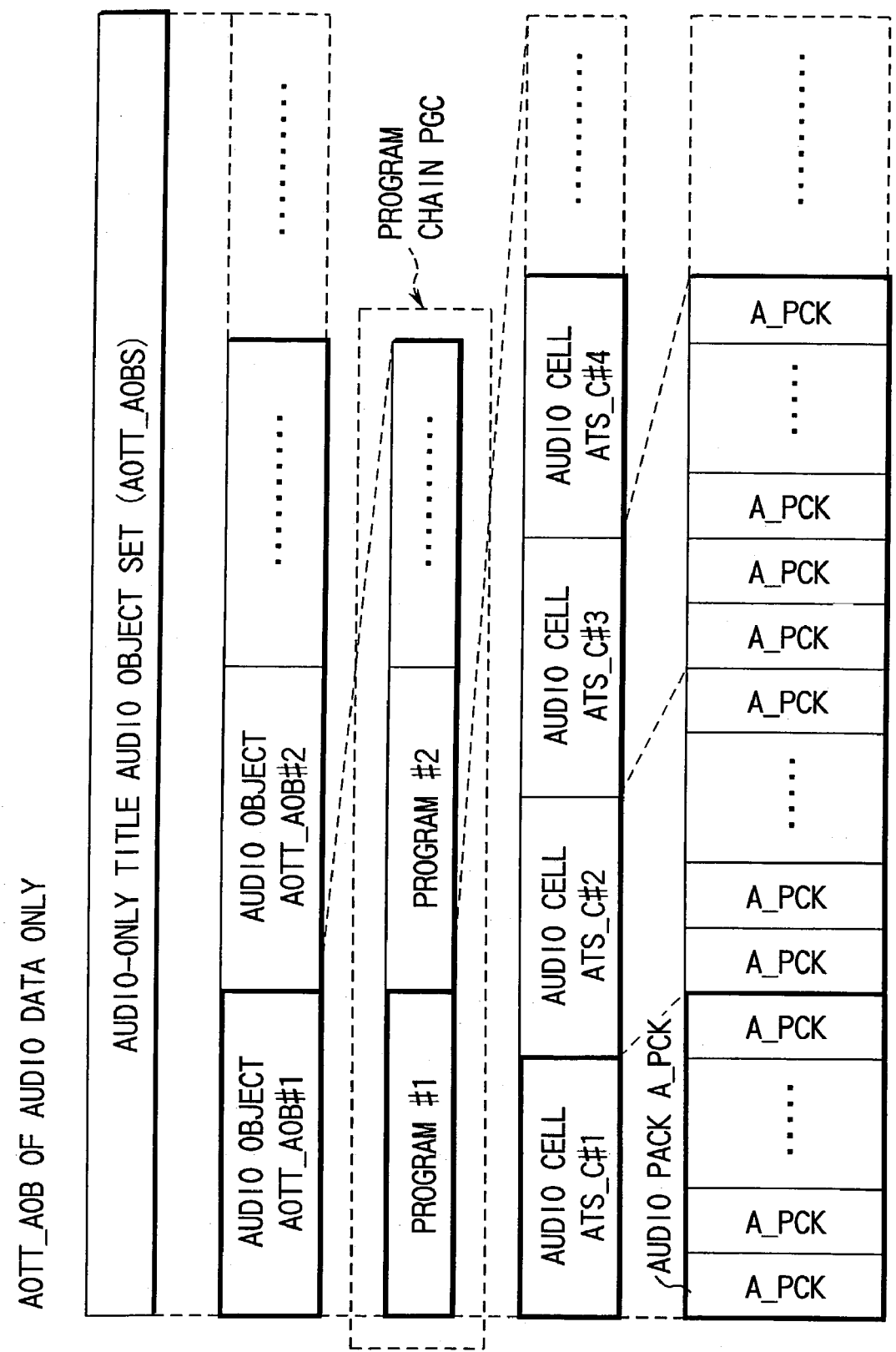
FIG. 4 is a diagram to help explain an example of the data structure of AOTT_AOBS among the pieces of information recorded in the DVD audio zone of FIG. 3.

Referring to FIG. 4, AOTT_AOBS 7131 will be explained. As explained later, AOTT_AOBS 7131 defines a set of one or more audio objects (AOB). Each AOB defines a set of one or more audio title set cells (ATS_C #). A set of one or more cells constitutes an audio title set program. A set of one or more programs constitutes an audio title set program chain (PGC).

In FIG. 3, the structure of AOTT_AOBS 7131 is represented directly by a set of ATS_C #. Each PGC is expressed by the program chain information in the ATS.

When one PGC is compared to an opera, cells constituting the PGC correspond to various music scenes or singing senses in the opera. The contents of the PGC (or the contents of the cells) are determined by a software provider that creates the contents recorded on an optical disk 10. Specifically, the provider can reproduce the cells constituting AOTT_AOBS 7131 as it has planned, using cell playback information ATS_C_PBI written in program chain information ATS_PGCI in the ATS. Explanation of ATS_PGCI and ATS_C_PBI will be given later.

In the other recording areas 73, usable pieces of information in the DVD video zone 72 or other pieces of information unrelated to the DVD video zone 72 can be written. The recording area 73 is not indispensable and may be eliminated, if unnecessary.

Figure 5:
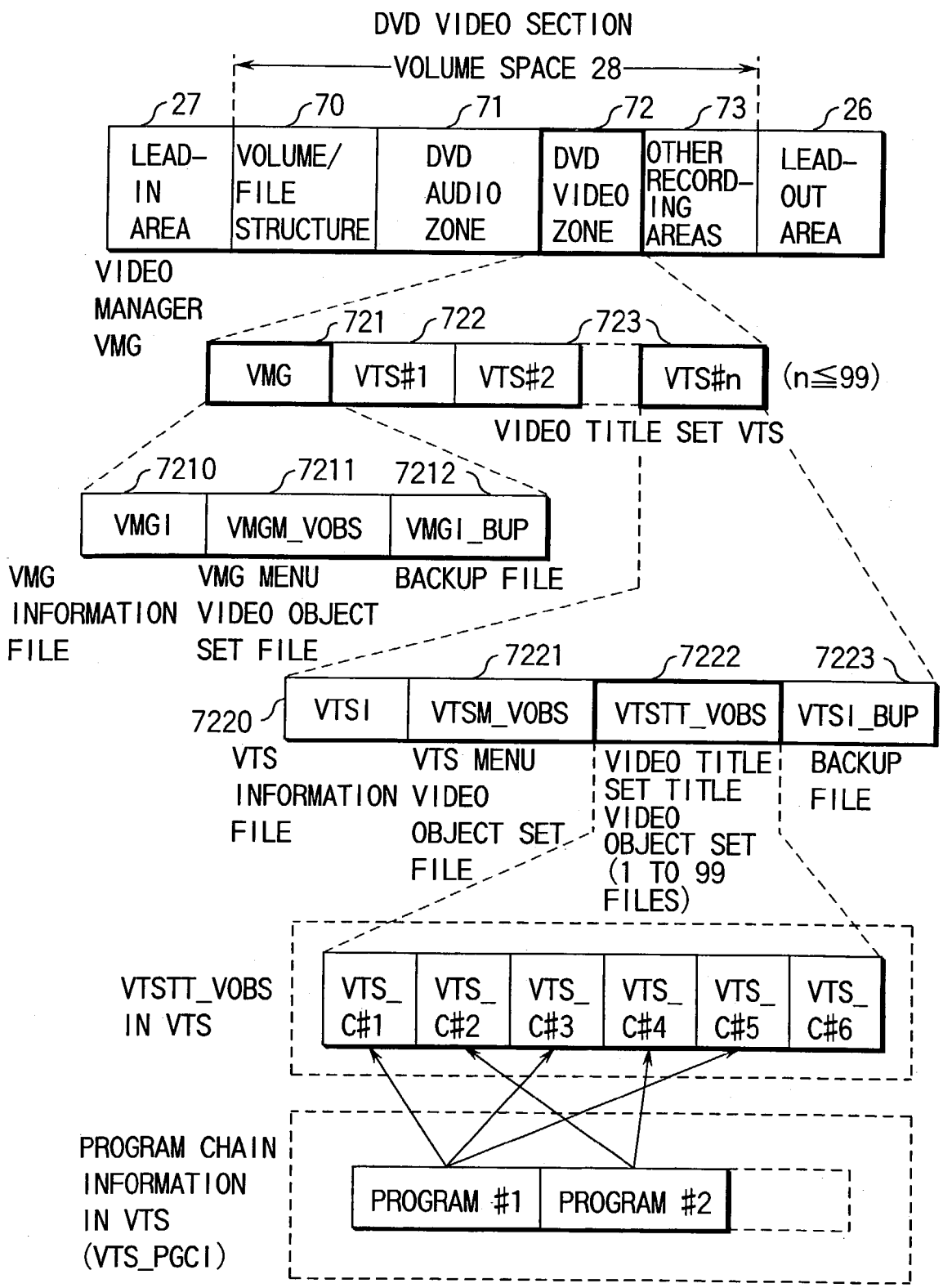
FIG. 5 is a diagram to help explain the hierarchical structure of the information recorded in a DVD video zone among the various types of information recorded on the optical disk of FIG. 2.

FIG. 5 is a diagram to help explain the hierarchical structure of those recorded in the DVD video zone 72 among the various pieces of information recorded on the optical disk 10 of FIG. 2. Hereinafter, what has been explained in FIG. 3 will be omitted and only the part related to the DVD video zone 72 will be explained.

On the basis of the description in the volume/file structure area 70, the contents of the video manager (VMG) 721 are stored in the system memory in the DVD player explained later.

The DVD video zone 72 is composed of a video manager (VMG) 721 and one or more video title sets (VTS #n) 722 (the maximum number "n" of video title sets is 99).

The VMG 721 is composed of a video manager information (VMGI) file 7210, a video manager menu video object set (VMGM_VOBS) file 7211, and a video manger information backup (VMGI_BUP) file 7212. Here, the VMGM_VOBS file 7211 is an optional file and may be absent.

Each VTS 722 is composed of a video title set information (VTSI) file 7220, a video title set menu video object set (VTSM_VOBS) file 7221, a video title set title video object set (VTSTT_VOBS) file 7222, and a video title set information backup (VTSI_BUP) file 7223. Here, the VTSM_VOBS file 7221 is an optional file and may be absent.

Stored in each video title set (VTS) 722 are not only the video data (or video packs explained later) compressed according to the MPEG standard, the audio data (audio packs explained later) compressed or uncompressed according to a specific standard, and run-length-compressed sub-picture data (sub-picture packs used to reproduce these data items (navigation packs explained later, including presentation control information and data search information).

Figure 6:
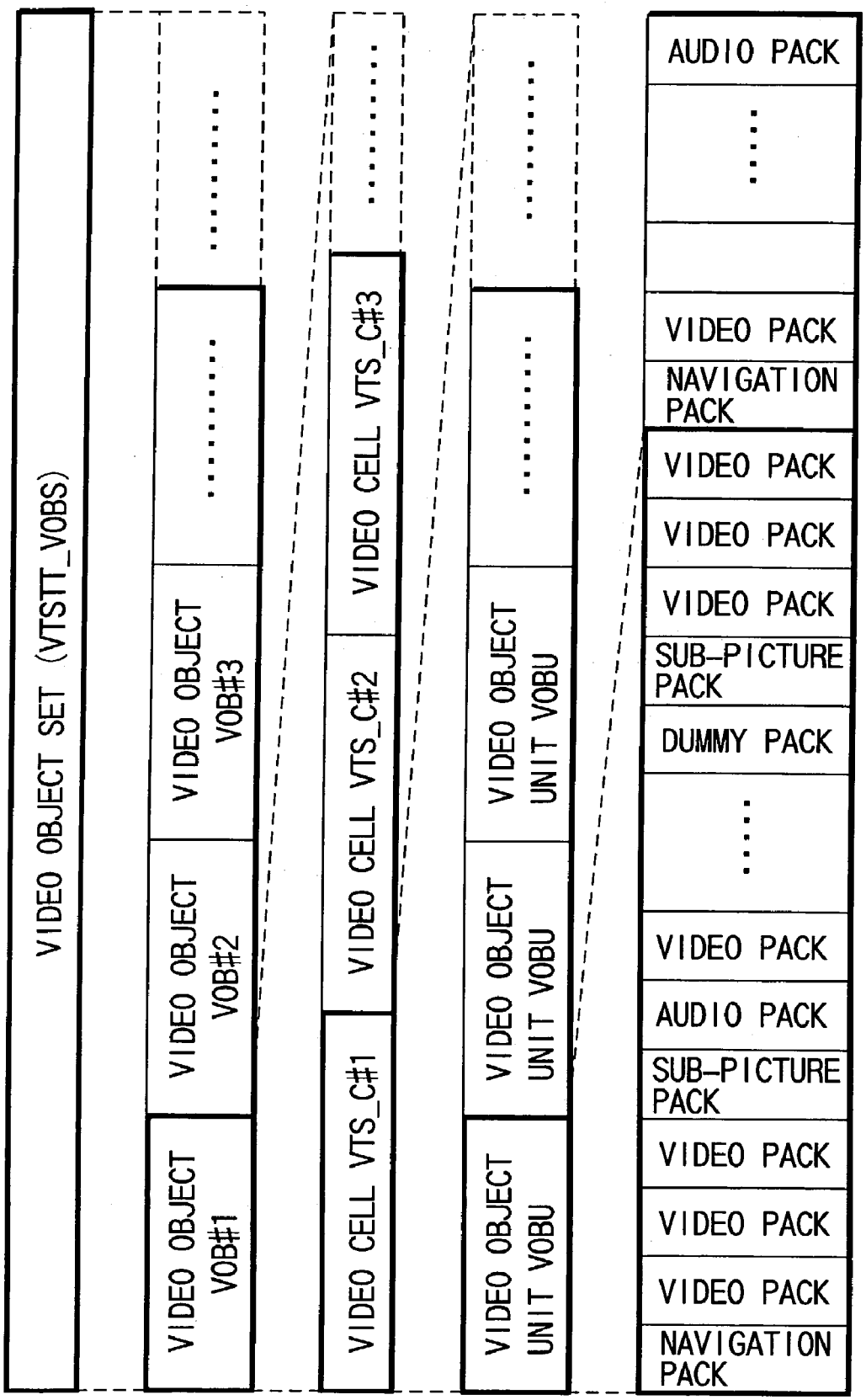
FIG. 6 is a diagram to help explain an example of the data structure of VTSTT_VOBS in the information recorded in the DVD video zone of FIG. 5.

Referring to FIG. 6, VTSTT_VOBS 7222 will be explained. As explained later, VTSTT_VOBS 7222 defines a set of one or more video objects (VOB). Each VOB defines a set of one or more video title set cells (VTS_C #n). VTS_C #n is composed of one or more video object units (VOBU). A VOBU may include navigation packs, audio packs, and sub-picture packs. A set of one or more video title set cells (VTS_C #n) constitutes a video title set (VTS) program. A set of one or more programs constitutes a video title set (VTS) program chain (PGC).

FIG. 5 shows the relationship between a program chain (PGC) and video title set cells (VTS_C #n).

When one PGC is compared to a drama, cells constituting the PGC can be considered to correspond to various scenes in the drama. The contents of the PGC (or the contents of the cells) are determined by a software provider that creates the contents recorded on an optical disk 10. Specifically, as with the ATS_PGCI explained in FIG. 3, the provider can reproduce the cells constituting VTSTT_VOBS 7222 as it has planned, using the cell playback information (not shown) written in program chain information (VTS_PGCI) in the VTS.

Figure 7:
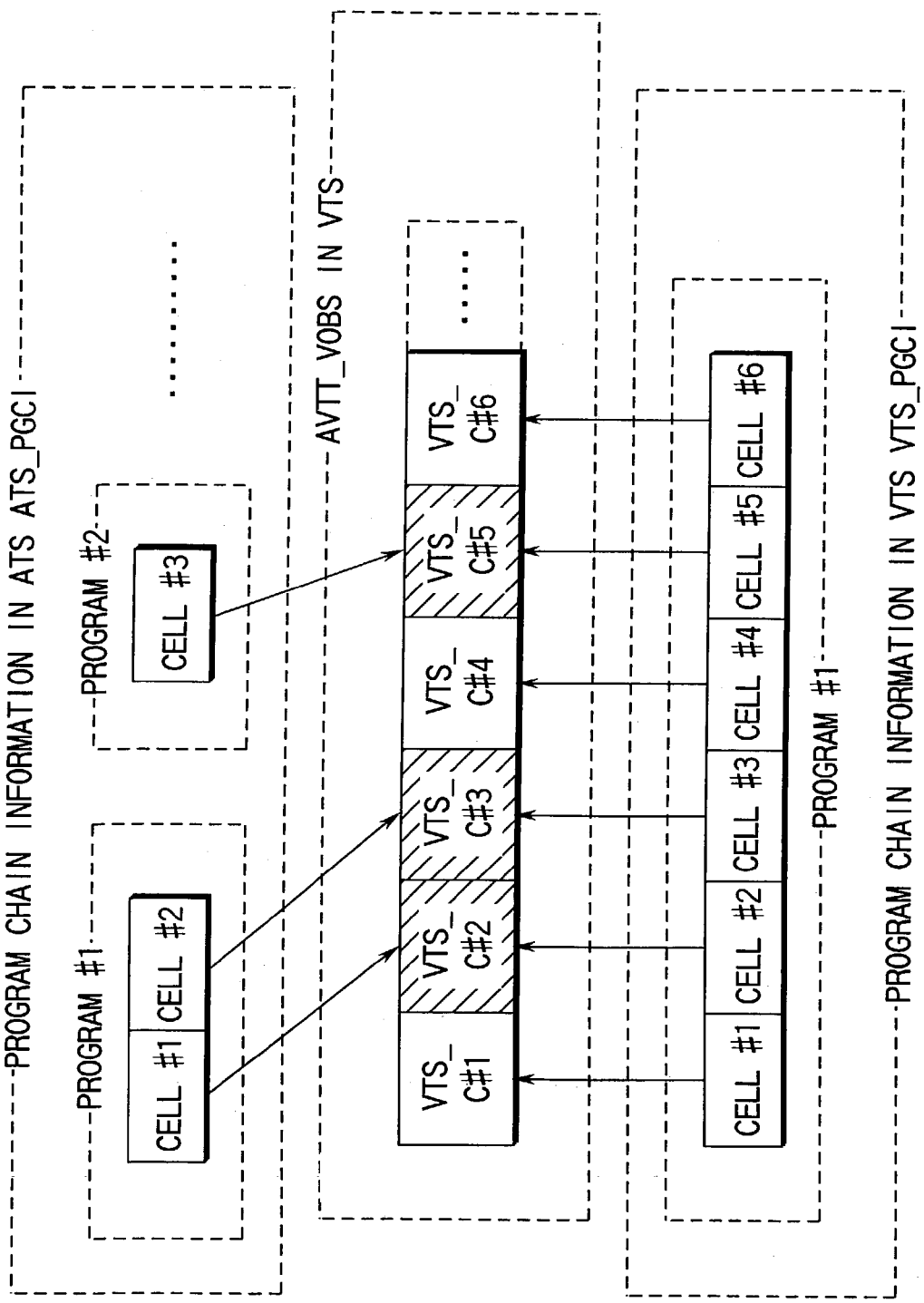
FIG. 7 is a diagram to help explain an example of video information (e.g., VTS_C #2) accessed by both program chain information (ATS_PGCI) in the DVD audio zone of FIG. 3 and program chain information (VTS_PGCI) in the DVD video zone of FIG. 5.

FIG. 7 is a diagram to help explain a case where specific pieces of video information (VTS_C #2, VTS_C #3, VTS_C #5) are accessed (in different methods) by both the program chain information (ATS_PGCI) in the DVD audio zone 71 of FIG. 3 and the program chain information (VTS_PGCI) in the DVD video zone 72 of FIG. 5. In other words, FIG. 7 shows a case where the same video objects (VOB) are referred to in different methods by the audio reproducing unit and video reproducing unit.

Specifically, when video playback is carried out from the video title set (VTS) side, cells VTS_C #1 to VTS_C #6 in the VOB are reproduced in sequence on the basis of the cell playback information (not shown) in the VTS_PGCI.

On the other hand, when video playback (or still playback) is carried out from the audio title set (ATS) side, cells VTS_C #2, VTS_C #3, and VTS_C #5 in the VOB are selectively reproduced on the basis of the cell playback information (ATS_C_PBI) in the ATS_PGCI.

In this case, because neither the ATS nor the VTS needs to have the same cell data items (VTS_C #2, VTS_C #3, and VTS_C #5) separately on the same optical disk 10, it is possible to use the limited storage capacity of the optical disk 10 effectively.

FIG. 4 shows an example of the data structure of the recorded contents (AOTT_AOBS) in the DVD audio zone 71 of FIG. 3. The AOTT_AOBS 7131 explained in FIG. 3 defines a set of one or more audio objects (AOTT_AOB #) as shown in FIG. 4. Each AOTT_AOB defines a set of one or more audio title set cells (ATS_C #). A set of one or more cells (ATS_C #) constitutes a program. A set of one or more programs constitutes a program chain (PGC). This PGC constitutes a logical unit indicating the whole of or part of an audio title.

In the example of FIG. 4, each audio title set cell (ATS_C #) is composed of a set of 2048-byte audio packs (A_PCK). These packs are the smallest units in performing a data transfer process. The smallest unit in logical processing is a cell. Logical processing is done in cells.

FIG. 6 shows an example of the data structure of the recorded contents (VTSTT_VOBS) in the DVD video zone 72 of FIG. 5.

As shown in FIG. 6, the VTSTT_VOBS 7222 explained in FIG. 5 defines a set of one or more video objects (AOB #). Each VOB defines a set of one or more video title set cells (VTS_C #). Each VTS_C defines a set of one or more video object units (VOBU). A set of one or more video title set cells constitutes a program. A set of one or more programs constitutes a program chain (PGC). The PGC constitutes a logical unit indicating the whole of or part of a video title or visual menu.

As shown in FIG. 6, each VOBU is a collection (a pack train) of a navigation pack, video packs (MPEG-compressed moving picture data), sub-picture packs (run-length-compressed bit map data), and audio packs (uncompressed linear PCM audio data or compressed multichannel audio data), with the navigation pack at the head. Specifically, the video object unit (VOBU) is defined as a collection of all the packs starting from a navigation pack to the one just before the next navigation pack. The navigation pack is incorporated in each VOBU to realize angle change (seamless angle change playback or nonseamless angle change playback).

Those packs are used as the smallest units in transferring data as in FIG. 4. The smallest unit in logical processing is a cell. Logical processing is done in cells.

The playback time of the VOBU corresponds to the playback time of the video data made up of one or more video groups (Groups of Pictures, abbreviated as GOPs) contained in the VOBU. The playback time is set in the range from 0.4 second to 1.2 seconds. In the MPEG standard, the playback time of one GOP is normally about 0.5 second. One GOP contains screen data compressed so that about 15 pictures may be reproduced in about 0.5 second.

When the VOBU includes video data, GOPs (complying with the MPEG standard) composed of video packs, sub-picture packs, and audio packs are arranged to produce a video data stream. The VOBU is determined on the basis of the playback time of the GOPs, regardless of the number of GOPs. At the head of the VOBU, a navigation pack is always placed.

In DVD video playback, even when the playback data contains only audio and/or sub-picture data, it is constructed using a VOBU as one unit. For example, when a VOBU is made up of only audio packs, with a navigation pack at the head, the audio packs to be reproduced within the playback time (0.4 second to 1.2 seconds) of the VOBU to which the audio data belongs are stored in the VOBU, as in the video data VOBU.

As shown in FIG. 6, the VTSTT_VOBS is defined as a set of one or more VOBs. The VOBs in the VOBS are used for the same application. A menu VOBS is usually composed of one VOB, in which menu screen display data items are stored. In contrast, a video title set VOBS is usually composed of more than one VOB.

When a concert video for a certain rock band is taken as an example, VOBs constituting a video object set (VTST-T_VOBS) for title sets can be considered to correspond to the video data for the performance of the band. In this case, by specifying particular VOBs, for example, the third piece on the band's concert program can be reproduced.

In the VOBs constituting a video object set (VTSM-_VOBS) for menus, the menu data for all the pieces of the band's concert program is stored. According to the menu on the screen, a specific piece of music, for example, an encore, can be reproduced.

In an ordinary video program, one VOBS can be composed of one VOB. In this case, one video stream is completed with a single VOB.

On the other hand, for example, in the case of a collection of animations with multiple stories or omnibus movies, plural video streams [plural program chains (PGCs)] can be provided for each story in one VOBS. In this case, each video stream is stored in the corresponding VOB. At that time, the audio stream and sub-picture stream related to each video stream are also completed in each VOB.

Each video object (VOB) is assigned an identification number (#i; i=0 to i). By the identification number, the VOB can be identified. A VOB is composed of one or more cells. An ordinary video stream is made up of plural cells. A video stream for menus may be composed of one cell. Like the VOB, each cell is assigned an identification number (#j; j=1 to j).

Figure 8:
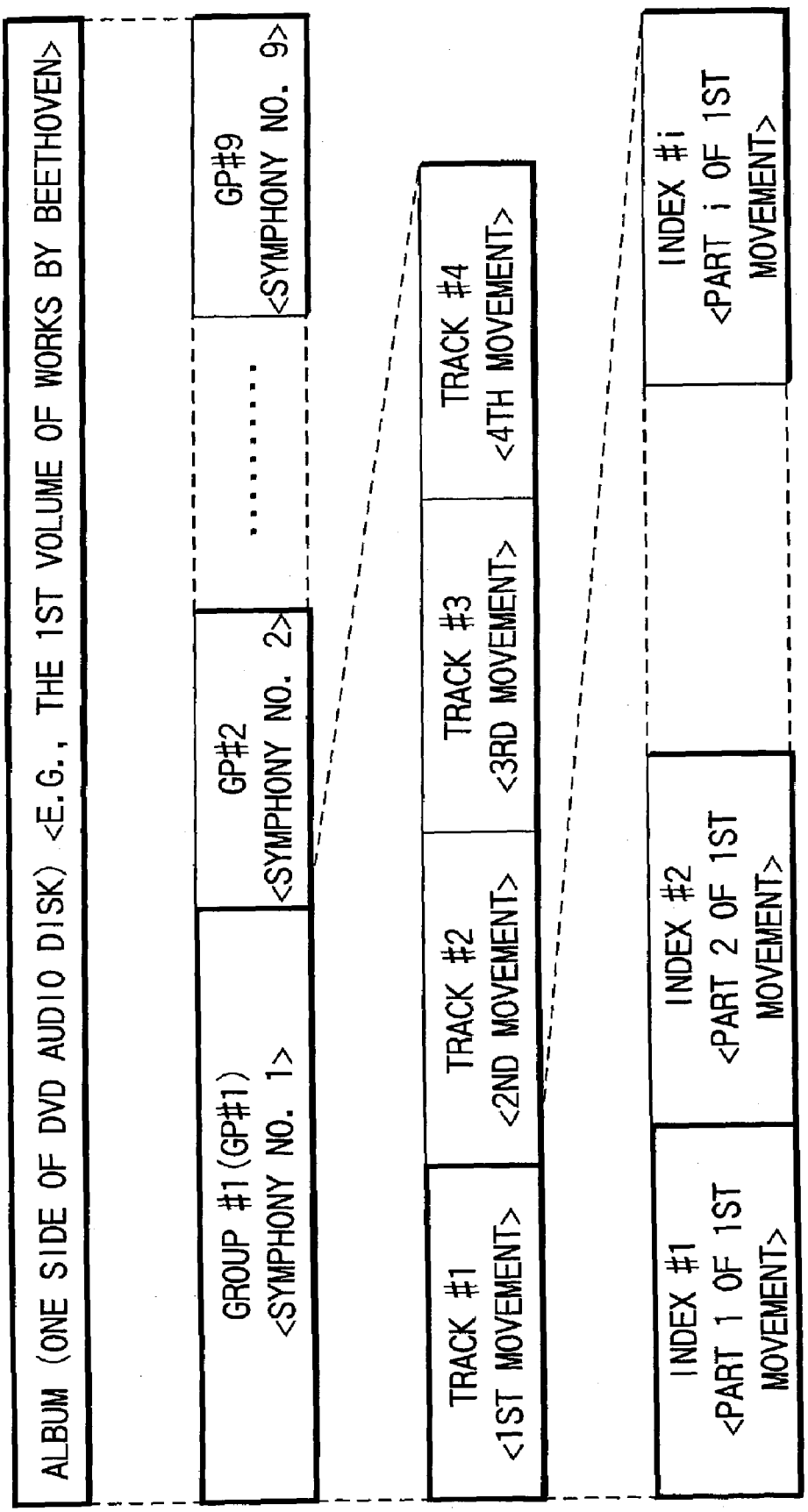
FIG. 8 is a diagram to help explain an example of the data structure that is about the recorded contents of user-accessible DVD audio and is recorded on one side of the optical disk shown in FIG. 1.

FIG. 8 shows the recorded contents in the user-accessible DVD audio zone 71 to help explain an example of the data structure recorded on one side (of one or two layers) of the optical disk 10 shown in FIG. 1.

In DVD audio, a hierarchical structure composed of albums, groups, tracks, and indexes is prepared as a management structure for recorded contents viewed from the software producer side.

An album corresponds to one side of a DVD audio disk. For example, "The first volume of works by Beethoven" can be allocated to the album. In this case, the album may be composed of group #1 of Symphony No. 1 to group #9 of Symphony No. 9.

Each group (e.g., group #1) is composed of the first to fourth movements of the corresponding symphony (Symphony No. 1). Each track is composed of indexes #1 to #i, which are obtained by dividing a track (e.g., track #1) into i pieces.

When the user plays back a DVD audio disk with such a hierarchical structure as is shown in FIG. 8, the user sets the optical disk 10 in the DVD audio player, operates the remote controller (not shown), and selects group #1 and track #1.

After the selection, when the user presses the playback button on the remote controller, the DVD audio player starts to reproduce Beethoven's symphony No. 1, starting at the first movement. When the user specifies a specific index from the remote controller, the specified index portion is searched for and playback is started at that portion. The first index part of the first track in the first group in the album can be reproduced in default, or even when the user specifies nothing.

In playing back a DVD disk, the user can recognize the title (such as, the title of a specific movie), whereas in playing back a DVD audio disk, the user cannot see the title. What the user can see are only the album, groups, tracks, and indexes shown in FIG. 8.

Figure 9:
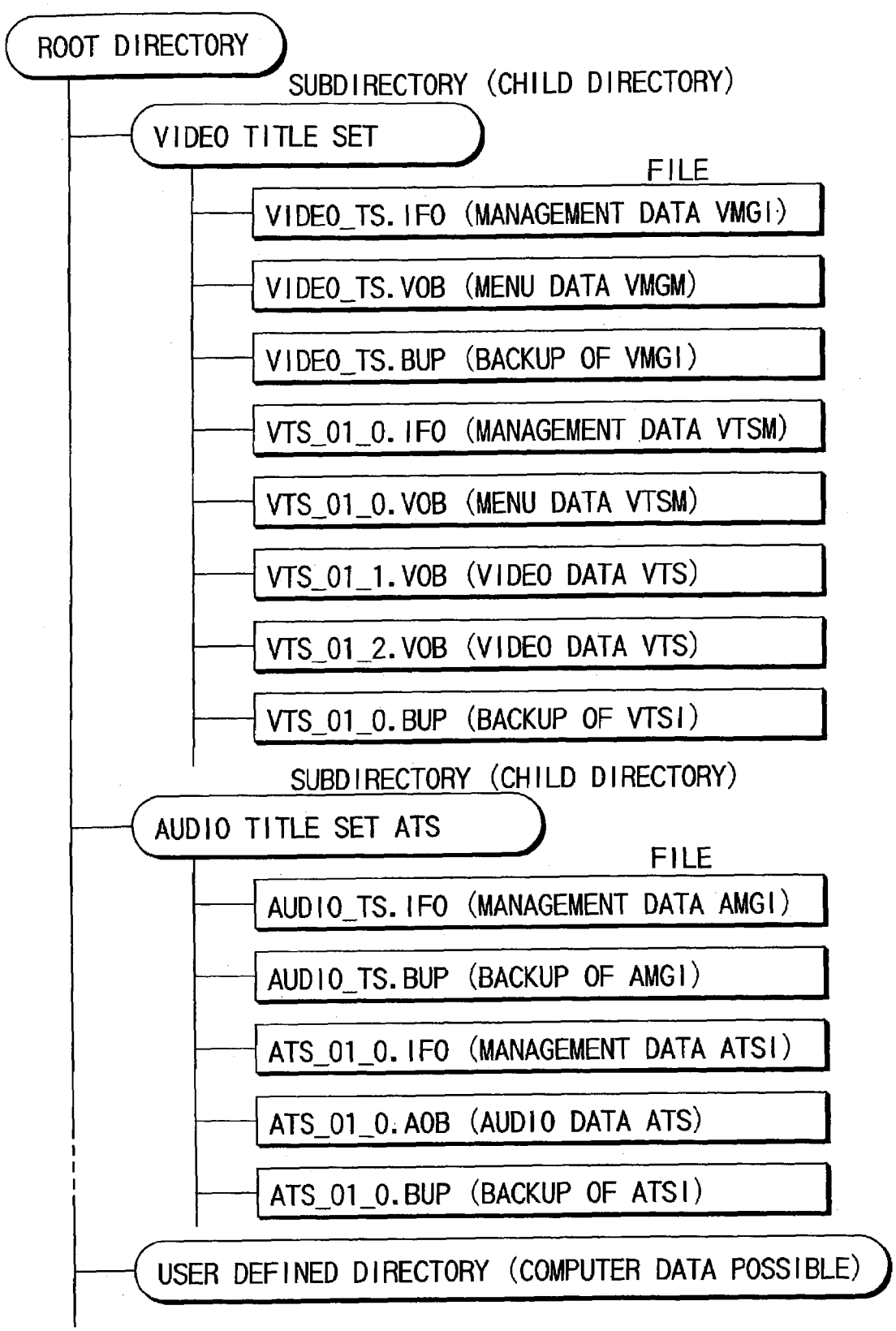
FIG. 9 is a diagram to help explain an example of the directory structure of the information (in data files of DVD audio and DVD video) recorded on the optical disk of FIG. 1.

FIG. 9 shows the directory structure of the information (DVD audio and DVD video data files) recorded on the optical disk 10 shown in FIG. 1. The structure is an example of a file directory structure defined in the DVD file standard.

As in a hierarchical file structure used by a general-purpose computer operating system, a subdirectory of video title set (VTS), a subdirectory of audio title set (ATS), and a user-defined directory are connected to a root directory.

Specifically, in the subdirectory of video title set (VTS), various video files (including VMGI, VMGM, VTSI, VTSM, and VTS files) as shown in FIG. 5 are so arranged that the individual files can be managed in order.

Moreover, in the subdirectory of audio title set (ATS), various audio files (including AMGI, ATSI, and ATS files) as shown in FIG. 3 are so arranged that the individual files can be managed in order.

The user can access a specific file (for example, a specific VTS or a specific ATS) by specifying a path from the root directory to the file.

When a DVD video player produced according to the DVD video standard plays back a DVD video disk produced according to the DVD video standard, it first reads the management information (VMG) in the video title set (VTS) directory under the root directory and reproduces the video contents on the basis of the information. However, what can be reproduced according to the VMG is limited to the video contents (VTS) recorded in the VTS directory.

On the other hand, when a DVD audio player (or a DVD video-DVD audio compatible player) produced according to the DVD audio standard plays back a DVD audio disk produced according to the DVD audio standard, it first reads the management information (AMG) in the audio title set (ATS) directory under the root directory and reproduces the audio contents on the basis of the information.

In this case, what can be reproduced according to the AMG is not limited to the audio contents (ATS) recorded in the ATS directory. The video contents (VTS) in the VTS directory can also be reproduced (the reproducing method will be explained later).

Figure 10:
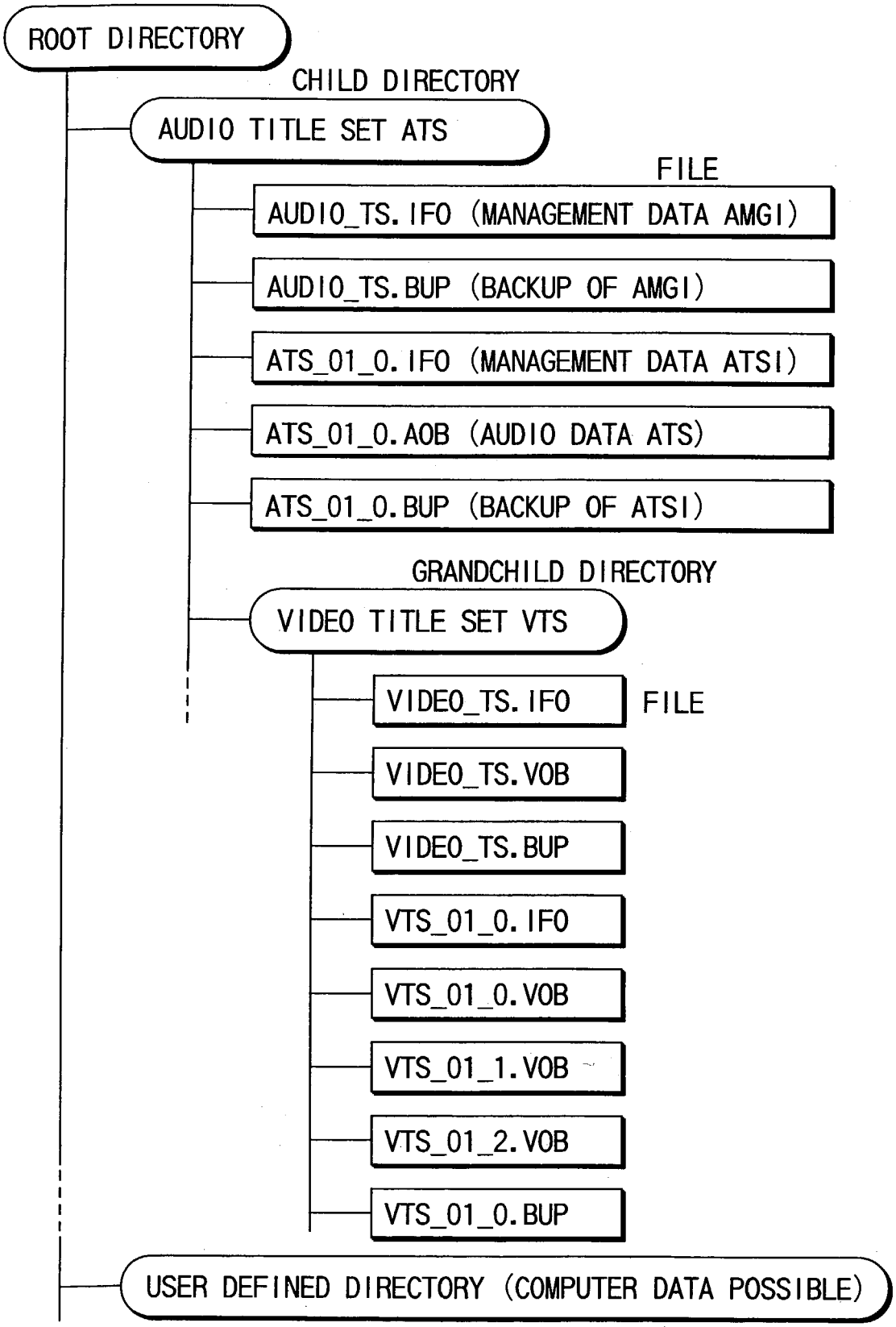
FIG. 10 is a diagram to help explain another example of the directory structure of the information (in data files of DVD audio and DVD video) recorded on the optical disk of FIG. 1.

FIG. 10 shows another example of the directory structure of the information (DVD audio and DVD video data files) recorded on the optical disk 10 shown in FIG. 1. In the example of FIG. 9, the VTS directory and the ATS directory are placed in the same level of hierarchy under the root directory. On the other hand, in the example of FIG. 10, the ATS directory (child directory) is placed in a level of hierarchy under the root directory (parent directory). The VTS directory (grandchild directory) is placed in a level of hierarchy under the ATS directory.

Figure 11:
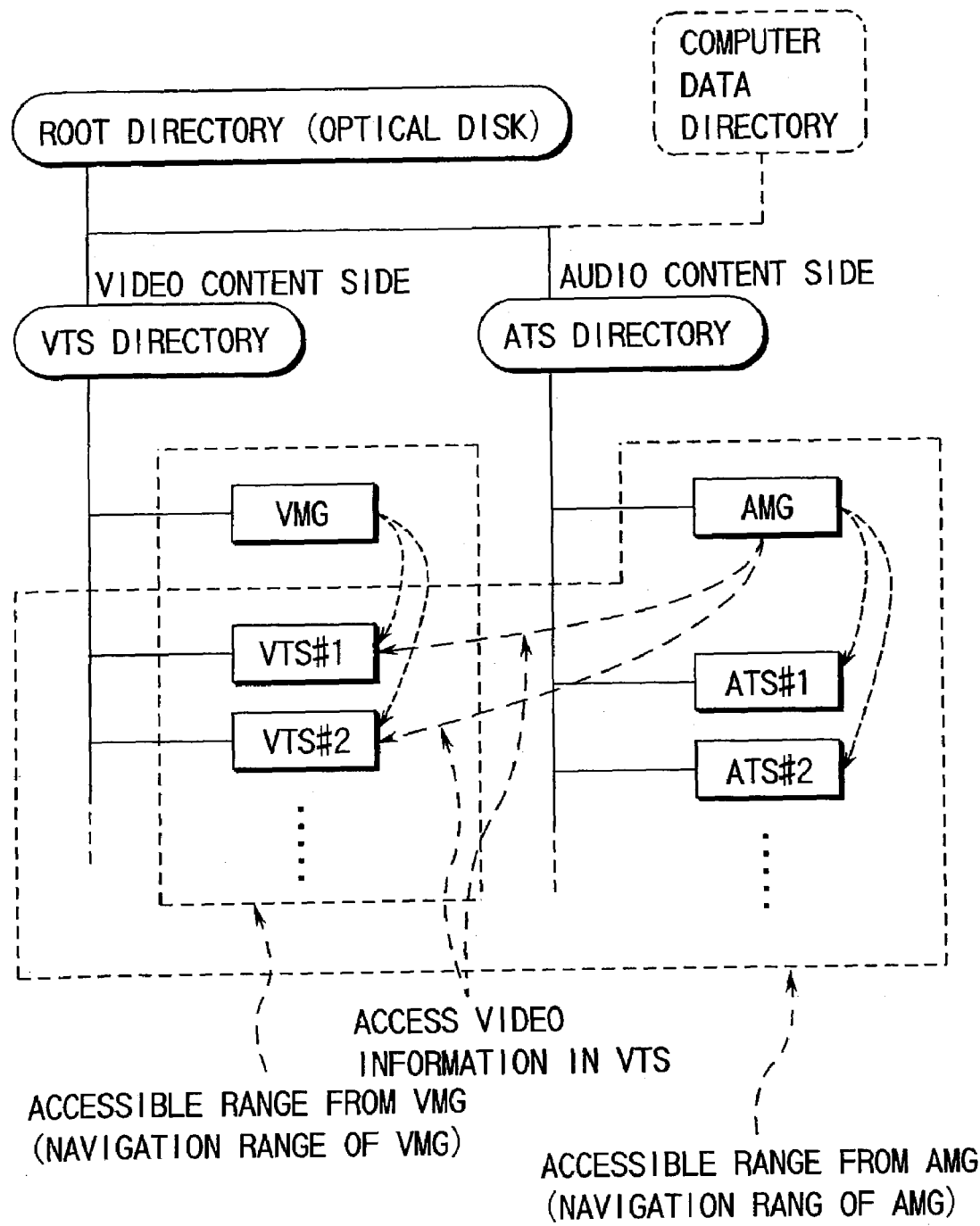
FIG. 11 is a diagram to help explain a case where the directory on the audio content side accesses a file in the directory on the video content side in the directory structure shown in FIG. 9.

FIG. 11 is a diagram to help explain the way the directory on the audio content side accesses a file in the directory on the video content side in the directory structure shown in FIG. 9.

Specifically, in the hierarchical management structure for managing the data files recorded on the optical disk 10, the video title set directory (a child directory) and the audio title set directory (a child directory) are placed under the root directory (a parent directory).

The video title set directory (VTS directory) is a directory for dealing with the video content files recorded on the optical disk 10 and includes a video manger (VMG) file and one or more video title set (VTS) files (video content logical units) (see FIG. 5).

The audio title set directory (ATS directory) is a directory for dealing with the audio content files recorded on the optical disk 10 and includes an audio manger (AMG) file and one or more audio title set (ATS) files (audio content logical units) as well as the aforementioned SAMG and ASVS (not shown in FIG. 11) (see FIG. 3).

The VMG in the VTS directory manages only the VTS and is designed to access only the VTS in the VTS directory.

On the other hand, the AMG in the ATS directory manages mainly the ATS and is designed to access not only the ATS in the ATS directory but also the VTS in the VTS directory.

The AMG includes audio manger information (AMGI). The AMGI includes an audio title search pointer table (ATT_SRPT). The ATT_SRPT includes an audio-only title (AOTT) search pointer (ATT_SRP) and an audio video (AVTT) search pointer (ATT_SRP). The contents of these will be explained in detail later.

Specifically, the AMG in the ATS directory can access the audio title sets (ATS #1, ATS #2, . . . ) in the ATS directory using the AOTT search pointer ATT_SRPT. It can also access the video title sets (VTS #1, VTS #2, . . . ) in the VTS directory using the AVTT search pointer (ATT_SRPT). This enables a certain object (such as, VTS #1) to be shared by both the video contents and the audio contents. This is one of the important characteristics of "an object sharing system" according to the present invention.

Figure 12:
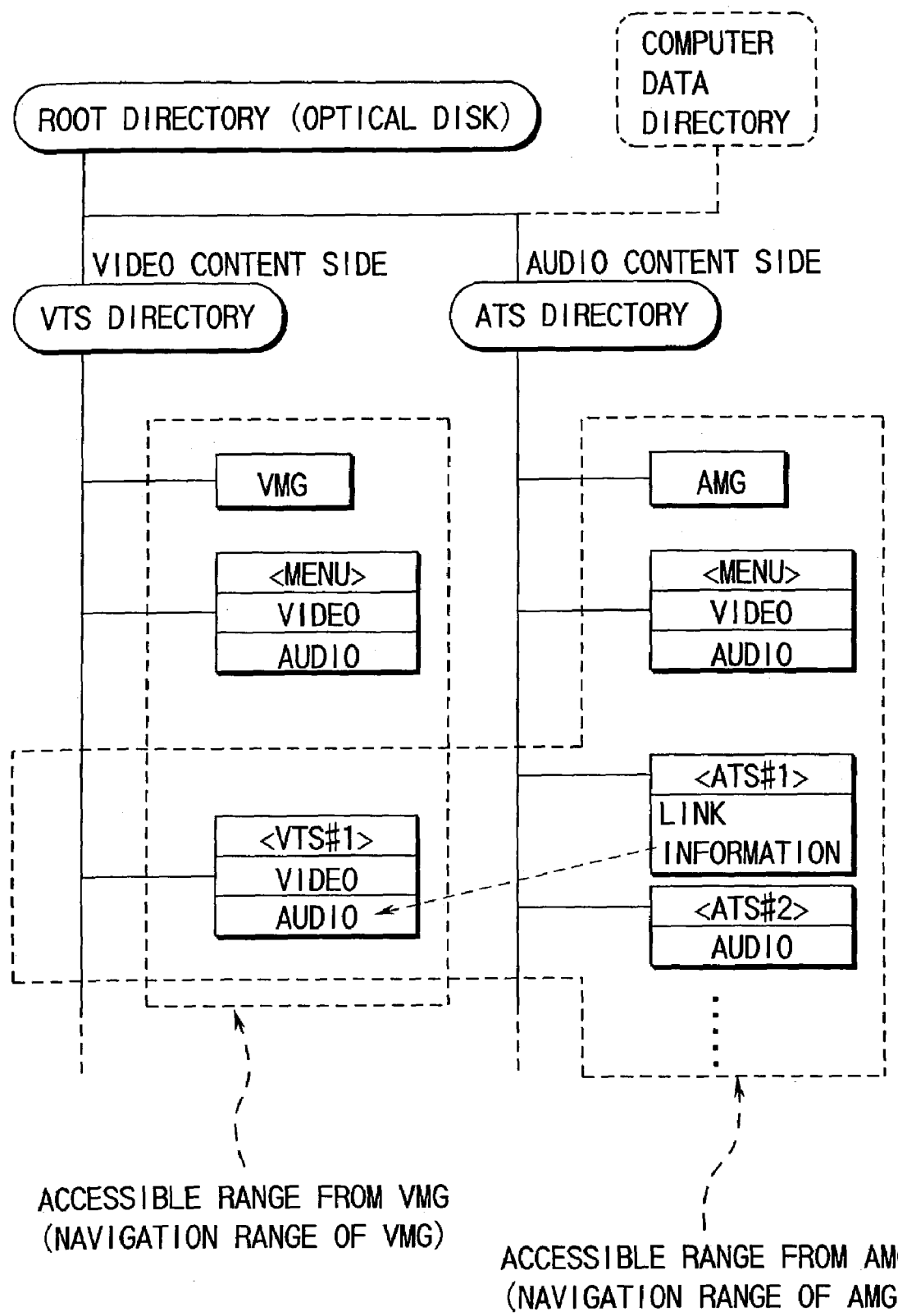
FIG. 12 is a diagram to help explain a case where a file in the directory on the audio content side links with a file in the directory on the video content side in the directory structure shown in FIG. 9.

FIG. 12 is a diagram to help explain a case where a file in the directory on the audio content side links with a file in the directory on the video content side. FIG. 12 can be considered to be a modification of FIG. 11.

Specifically, in the example of FIG. 11, the audio manager (AMG) is designed to be able to access both an audio title set (ATS) and a video title set (VTS). This enables a VTS to be shared by the video contents and audio contents.

On the other hand, in the example of FIG. 12, information (e.g., a pointer indicating an address for a specific part of VTS #1) to link with a video title set (here, VTS #1) is written in an audio title set (here, ATS #1). This enables, for example, the audio data in VTS #1 to be shared by the video contents and audio contents.

Figure 13:
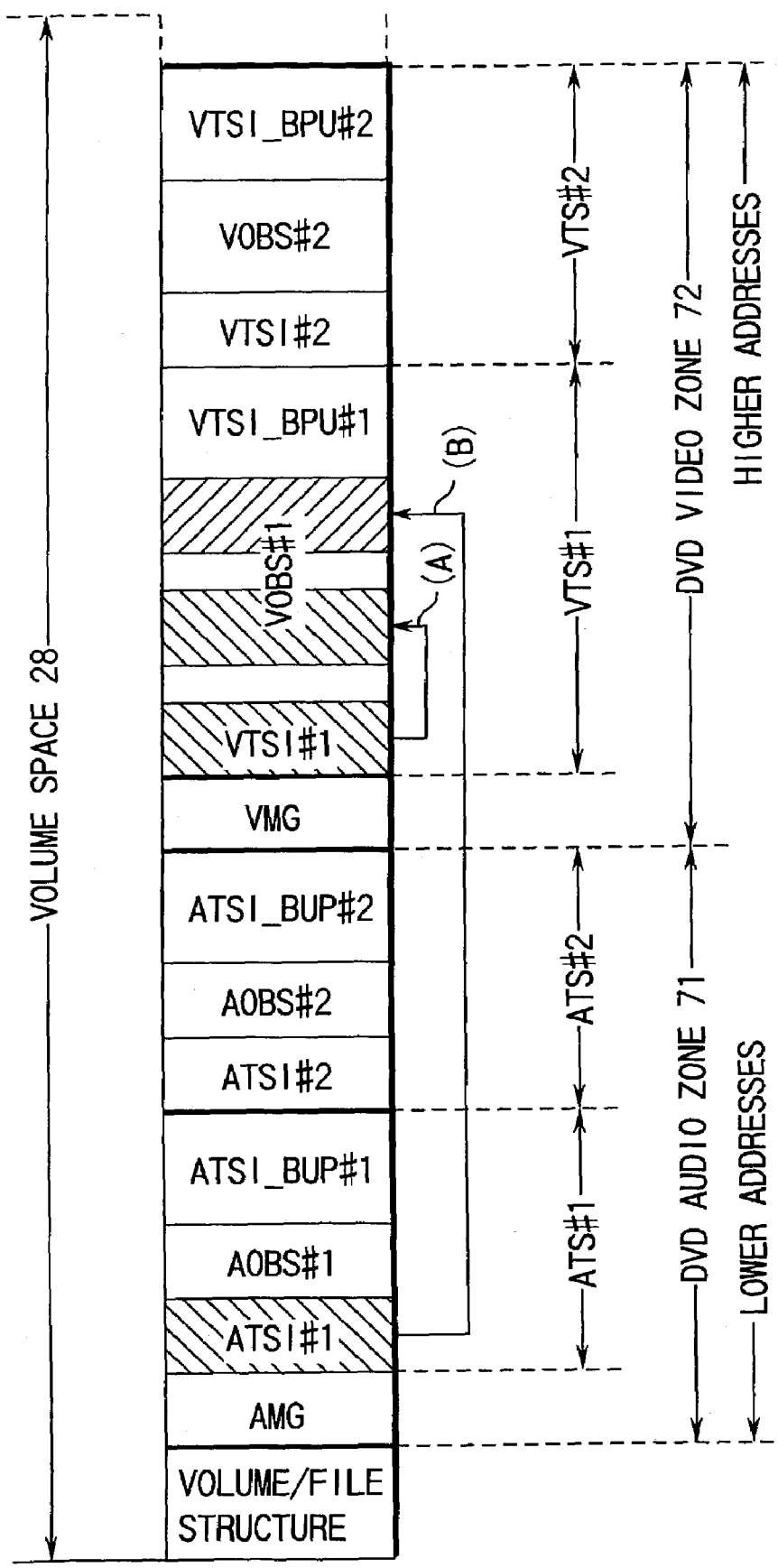
FIG. 13 is a diagram to help explain an example of how file accessing of FIG. 11 is effected in the volume spaces shown in FIG. 3 of 5.

FIG. 13 shows a data structure to help explain an example of how file access in FIG. 11 is carried out in the volume space 28 shown in FIG. 3 or 5. The data structure of FIG. 13 corresponds to the directory structure of FIG. 11.

In FIG. 13, the shaded portions indicate examples of the contents shared by the video contents (or video volume) and the audio contents (or audio volume).

The basic idea of the data structure of FIG. 13 is to record a recording area (VMG+VTS) for video contents and a recording area (AMG+ATS) for audio contents in the volume space 28 independently and enable video contents shared by both video and audio uses to be managed by the AMG.

Specifically, in FIG. 13, the video title set (VTS #1) managed by the VMG can access part (cells) of the video object set (VOBS #1) and the audio title set (ATS #1) managed by the AMG can access the other part (cells) of VOBS #1. In this example, part of the cells constituting the video object set (VOBS #1) of VTS #1 are shared by the video contents and audio contents.

In the data structure of FIG. 13, the DVD audio zone 71 is placed in locations with lower addresses (closer to the lead-in area 27 in FIG. 3). The DVD video zone 72 is placed in locations with higher addresses (closer to the lead-out area 26 in FIG. 3). In this case, the AMG has only to always use increasing addresses, when it accesses either ATS or VTS, and need not deal with decreasing addresses. This facilitate the construction of the reproducing system.

Figure 14:
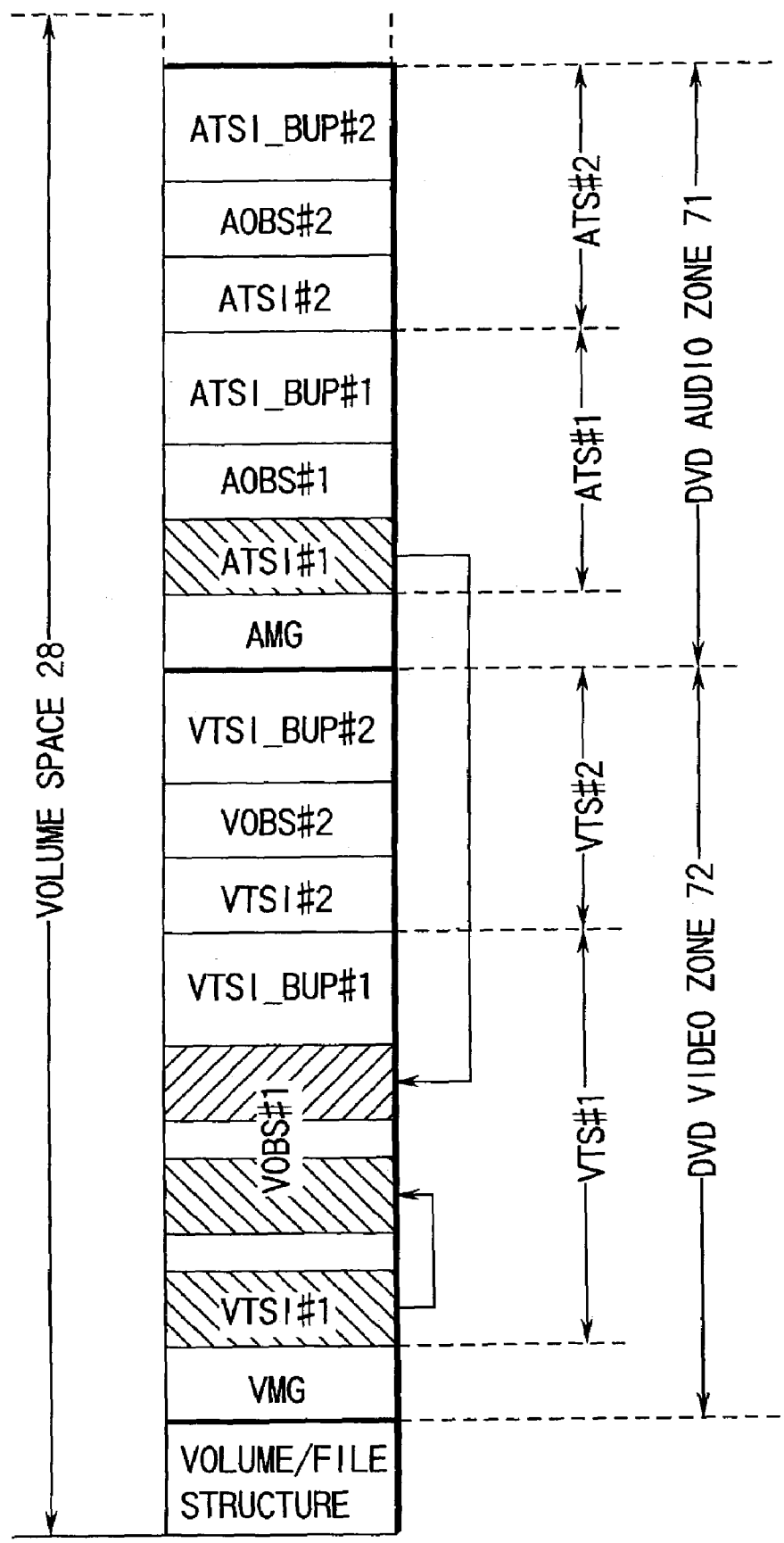
FIG. 14 is a diagram to help explain another example of how file accessing of FIG. 11 is effected in the volume space shown in FIG. 3 of 5.

FIG. 14 shows a data structure to help explain another example of how file access in FIG. 11 is carried out in the volume space 28 shown in FIG. 3 or 5. Namely, FIG. 14 can be considered to be a modification of FIG. 13.

In FIG. 13, because the DVD audio zone 71 is placed in locations with lower addresses and the DVD video zone 72 is placed in locations with higher addresses, the AMG need not handle decreasing addresses.

On the other hand, in FIG. 14, the DVD video zone 72 is placed in locations with lower addresses (closer to the lead-in area 27 in FIG. 3). The DVD audio zone 71 is placed in locations with higher addresses (closer to the lead-out area 26 in FIG. 3). In this case, the AMG uses increasing addresses when it accesses the ATS and decreasing addresses when it accesses the VTS. In this case, addressing in accessing a desired object (a cell in the ATS or VTS) is troublesome. Therefore, it is difficult to apply the technique to commercial-use DVD audio players for which product costs are a problem.

However, when a personal computer with a DVD drive is turned into a DVD audio player, the cost problem can be avoided even when the data structure of FIG. 14 has been employed. Specifically, the operating system (or the control software) of a personal computer whose data structure of FIG. 14 has been analyzed can convert the data structure with the physical arrangement of FIG. 14 into the arrangement of FIG. 13 in appearance by remapping the addresses on its memory. By doing this, the MPU or CPU of the personal computer can access either ATS or VTS from the AMG by specifying increasing addresses.

Figure 15:
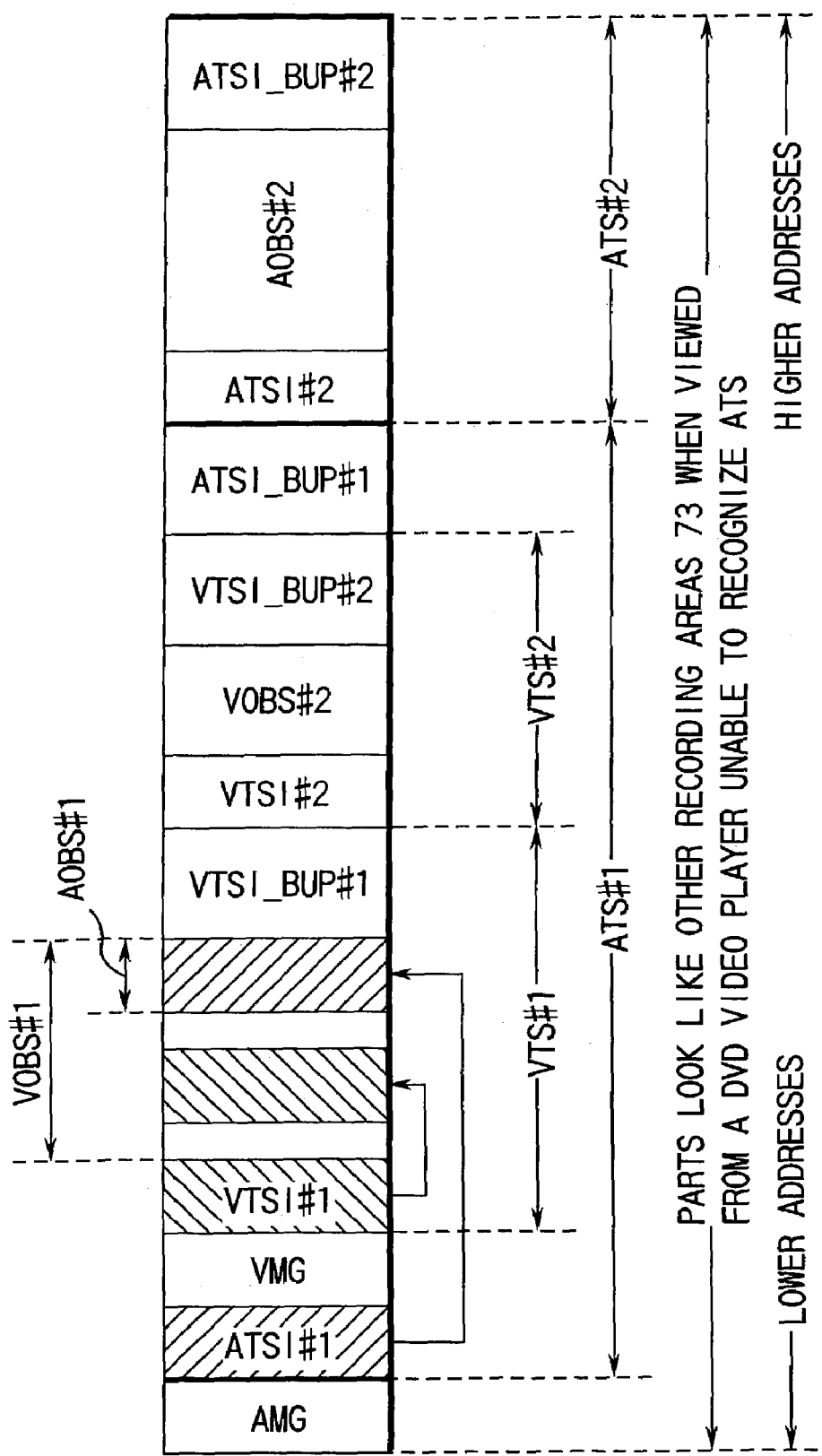
FIG. 15 is a diagram to help explain still another example of how file accessing of FIG. 11 is effected in the volume space shown in FIG. 3 or 5.

FIG. 15 shows a data structure to help explain still another example of how file access in FIG. 11 is carried out in the volume space 28 shown in FIG. 3 or 5. Namely, FIG. 15 can be considered to be a modification of FIG. 13.

In FIG. 13, because the DVD audio zone 71 is placed in locations with lower addresses and the DVD video zone 72 is placed in locations with higher addresses, the AMG need not handle decreasing addresses.

In contrast, in the data structure of FIG. 15, the AMG in the DVD audio zone 71 is placed in locations with lower addresses (closer to the lead-in area 27 in FIG. 3). The VMG in the DVD video zone 72 is placed in locations with higher addresses (closer to the lead-out area 26 in FIG. 3). In this case, the AMG has only to always use increasing addresses, when it accesses either the ATS and the VTS, and need not deal with decreasing addresses. Therefore, as in FIG. 13, it is easy to construct a reproducing system.

Because the data structure of FIG. 15 is a nested structure where VTS #1 is placed in ATS #1, the VMG of FIG. 5 cannot recognize that the VTS in the ATS exists in the DVD video zone 72. In this case, the VMG can treat the VTS in the ATS as existing in the other recording areas 73.

The data structure of FIG. 15 can be used when the other recording areas 73 are used in a case where the AMG is allowed to access not only the ATS but also the VTS.

Three examples of the data structure that enables the AMG to access not only the ATS but also VTS have shown in FIGS. 13 to 15. The most favorable one is the data structure of FIG. 13. The reason is that a desired common object can be accessed by just specifying increasing addresses without remapping the addresses.

Figure 16:
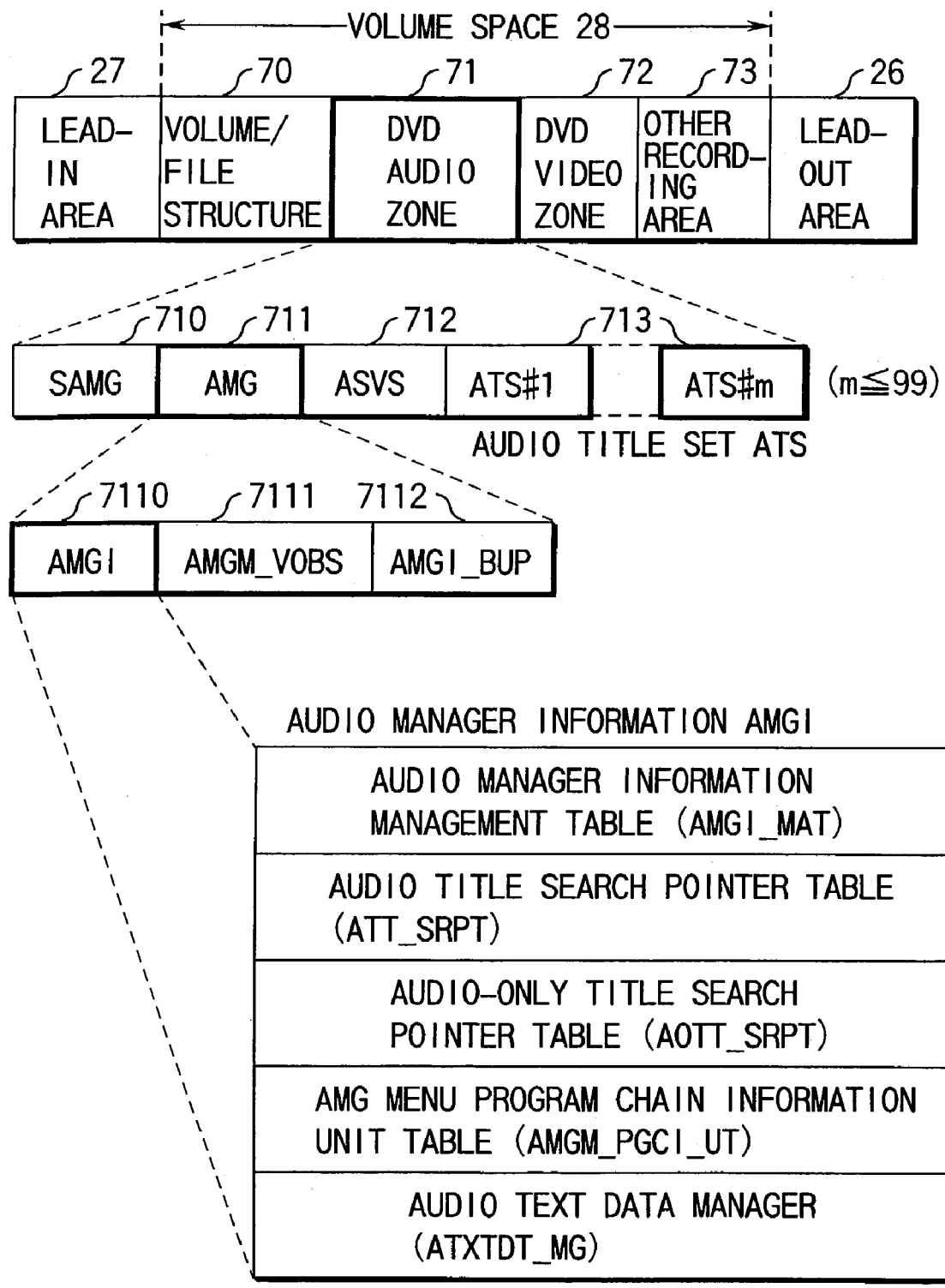
FIG. 16 is a diagram to help explain the recorded contents of audio manager information (AMGI) in the DVD audio zone shown in FIG. 3.

FIG. 16 is a diagram to help explain the recorded contents of the audio manager information (AMGI) in the DVD audio zone 71 shown in FIG. 3.

The contents the DVD audio zone 71 deals with include two types of titles: an audio-only title (AOTT) and a video-added audio title [or audio-video title (AVTT)].

The AOTT is a title in an audio disk (A disk) without a video section and is defined in the ATS recorded under the audio title set directory. On the other hand, the AVTT is a title in an audio-video disk (AV disk) with a video section and is defined in the VTS recorded under the video title set directory. The AOTT and AVTT are generally called ATT (audio title).

The DVD audio zone 71 in which the ATT data is recorded is composed of SAMG 710, AMG 711, ASVS 712, and one or more (up to 99) audio title sets (ATS #1 to ATS #m) 713.

The AMG 711 is composed of an audio manager information (AMGI) file 7110, an audio manger menu video object set (AMGM_VOBS) file (optional file) 7111, and an audio manger information backup (AMGI_BUP) file 7112.

The AMGI file 7110 includes an audio manager information management table (AMGI_MAT), an audio title search pointer table (ATT_SRPT), an audio-only title search pointer table (AOTT_SRPT), an audio manger menu program chain information unit table (AMGM_PGCI_UT), and an audio text data manager (ATXTDT_MG).

Specifically, the AMG 711 has two pieces of search information (ATT_SRPT) and (AOTT_SRPT). Here, the ATT_SRPT is a table in which search information for both the AOTT and the AVTT has been written. The AOTT_SRPT is a table in which search information only for the AOTT has been written.

The reason why the search information is not divided into AVTT search information and AOTT search information, but into ATT (the generic name for AOTT and AVTT) search information (ATT_SRPT explained later) and AOTT search information (AOTT_SRPT explained later) is to simplify the reproducing method for various types of DVD players.

FIG. 17 shows the recorded contents of the audio manager information management table (AMGI_MAT) included in the audio manager information shown in FIG. 16.

The audio manger information management table (AMGI_MAT) includes an audio manager identifier (AMG_ID), an audio manager end address (AMG_EA), an audio manager information end address (AMGI_EA), the version number (VERN) of the standard employed by the optical disk (DVD audio disk) 10, a volume setting identifier (VLMS_ID), autoplay information (AP_INF), an audio still video set start address (ASVS_SA), the number of title sets (TS_Ns), a provider (software producer and/or seller) identifier (PVR_ID), an audio manager information management table end address (AMGI_MAT_EA), an audio manager menu video object set start address (AMGM_VOBS_SA), an audio title search pointer table start address (ATT_SRPT_SA), an audio-only title search pointer table start address (AOTT_SRPT_SA), an audio manger menu program chain information unit table start address (AMGM_PGCI_UT_SA), an audio text data manager start address (ATXTDT_MG_SA), a video attribute (AMGM_V_ATR) for an audio manager menu video object set, the number of sub-picture streams (AMGM_SPST_Ns) for an audio manager menu, an attribute (AMGM_SPST_ATR) for sub-pictures of an audio manager menu video object set, the number of audio streams (AMGM_AST_Ns) for an audio manager menu, an audio attribute (AMGM_AST_ATR) for an audio manager menu video object set, and other reservation areas.

In the audio manager menu video object set start address (AMGM_VOBS_SA), the start address of the AMGM_VOBS is written in the relative number of blocks counted from the first logical block in the AMG. When no AMGM_VOBS is present, "00000000 (h)" is written in the AMGM_VOBS_SA.

In the start address (ATT_SRPT_SA), the start address of the ATT_SRPT is written in the relative number of blocks counted from the first logical block in the AMGI.

In the start address (AOTT_SRPT_SA), the start address of the AOTT_SRPT is written in the relative number of blocks counted from the first logical block in the AMGI.

From the ATT_SRPT_SA or AOTT_SRPT_SA written in the AMGI_MAT of FIG. 17, it can be found on which part of the optical disk 10 the search pointer to the audio title (ATT_SRPT) or the search pointer to the audio-only title (AOTT_SRPT) has been written.

Figure 18:
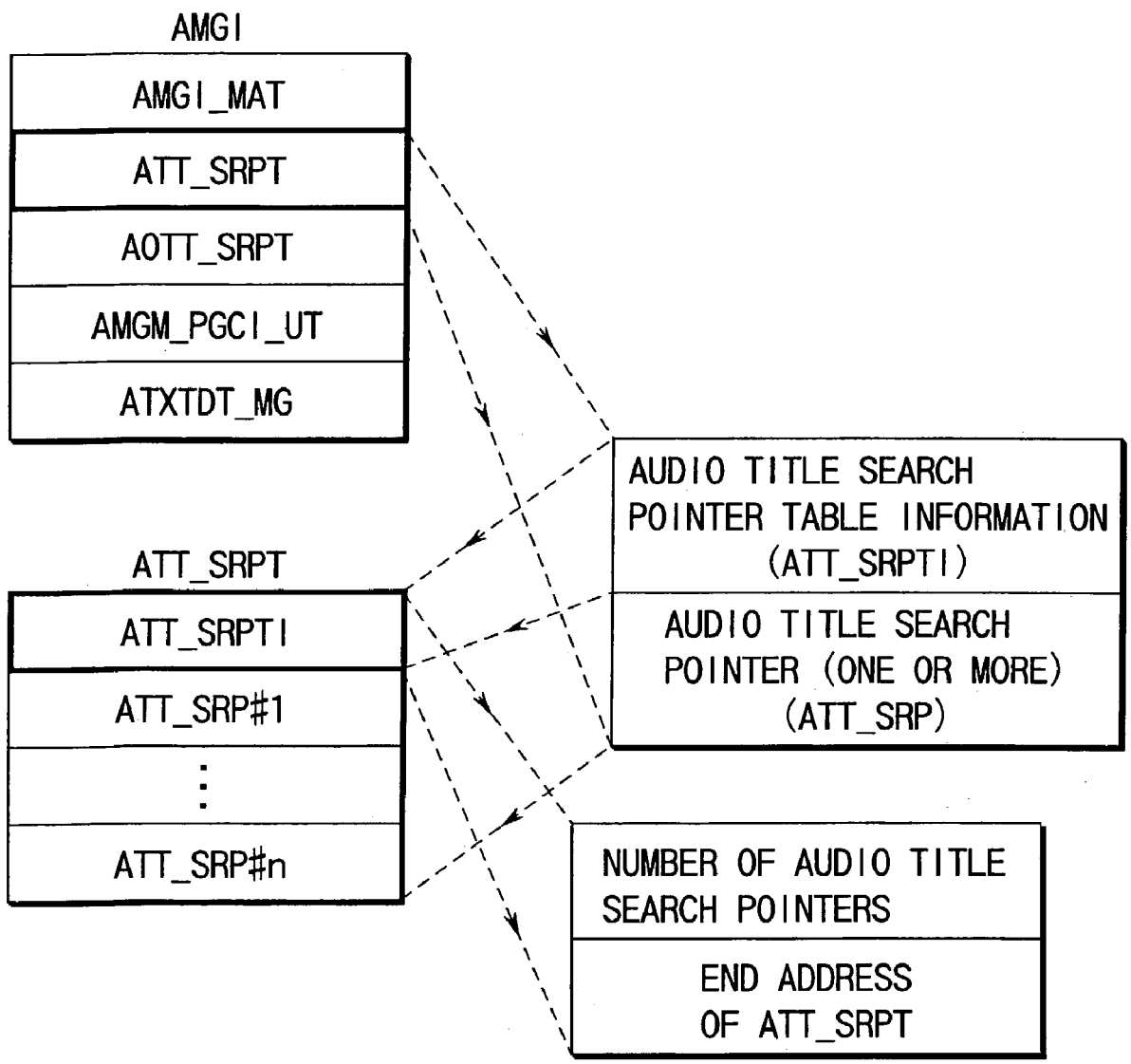
FIG. 18 is a diagram to help explain the contents of the audio title search pointer table (ATT_SRPT) included in the audio manager information (AMGI) shown in FIG. 16.

FIG. 18 is a diagram to help explain the contents of the audio title search pointer table (ATT_SRPT) included in the audio manager information of FIG. 16. The AMGI has two types of search pointers (ATT_SRPT) and (AOTT_SRPT). FIG. 18 shows a search pointer (ATT_SRP) that can access not only AOTT but also AVTT.

Specifically, the ATT_SRPT included in the AMGI includes audio title search pointer table information (ATT_SRPTI) and one or more audio title search pointers [ATT_SRP (ATT_SRP #1 to ATT_SRP #n)]. The ATT_SRPTI includes the number of audio title search pointers and the ATT_SRPT end address.

Figure 19:
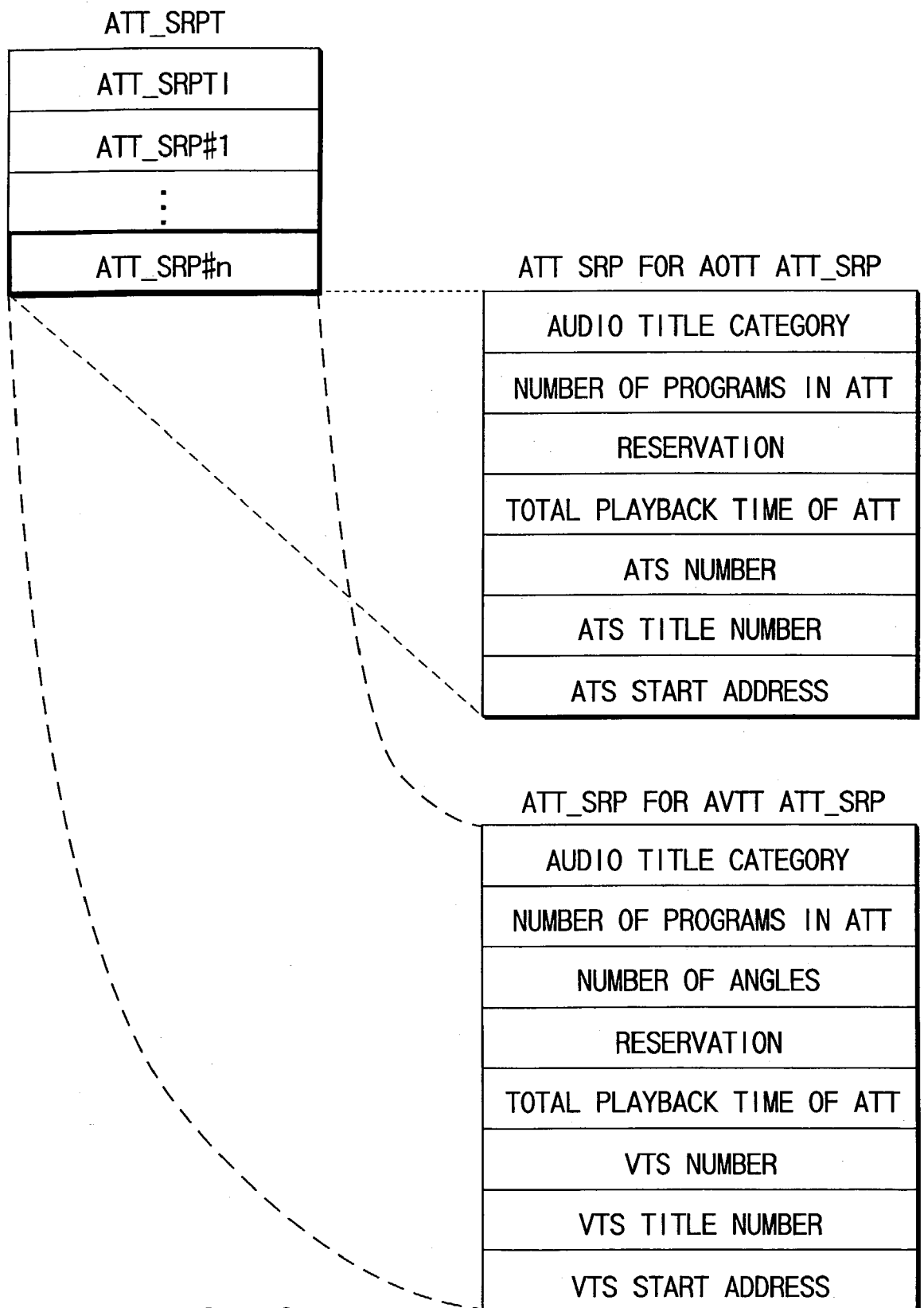
FIG. 19 is a diagram to help explain the contents of the audio title search pointer (ATT_SRP) included in the audio title search pointer table (ATT_SRPT) shown in FIG. 18.

FIG. 19 is a diagram to help explain the contents of each audio title search pointer (here, ATT_SRP #n) included in the search pointer table (ATT_SRPT) of the audio title shown in FIG. 18.

The DVD audio standard has been determined so as to deal with not only sound but also images. The AMG has two pieces of search information (ATT_SRPT) and (AOTT_SRPT). The ATT_SRPT of FIG. 19 is a table in which both AOTT search information and AVTT search information have been written.

In FIG. 19, the audio-only title (AOTT) audio title search pointer (ATT_SRP) includes an audio title (ATT) category, the number of programs in the audio title (ATT), reservation, the total playback time of the audio title (ATT), the number of the audio title set (ATS), the title number of the audio title set (ATS), and the start address of the audio title set (ATS).

The video-added audio title (AVTT) search pointer (ATT_SRP) includes an audio title (ATT) category, the number of programs in the audio title (ATT), the number of angles included in video, reservation, the total playback time of the audio title (ATT), the number of the video title set (VTS), the title number of the video title set (VTS), and the start address of the video title set (VTS).

Figure 20:
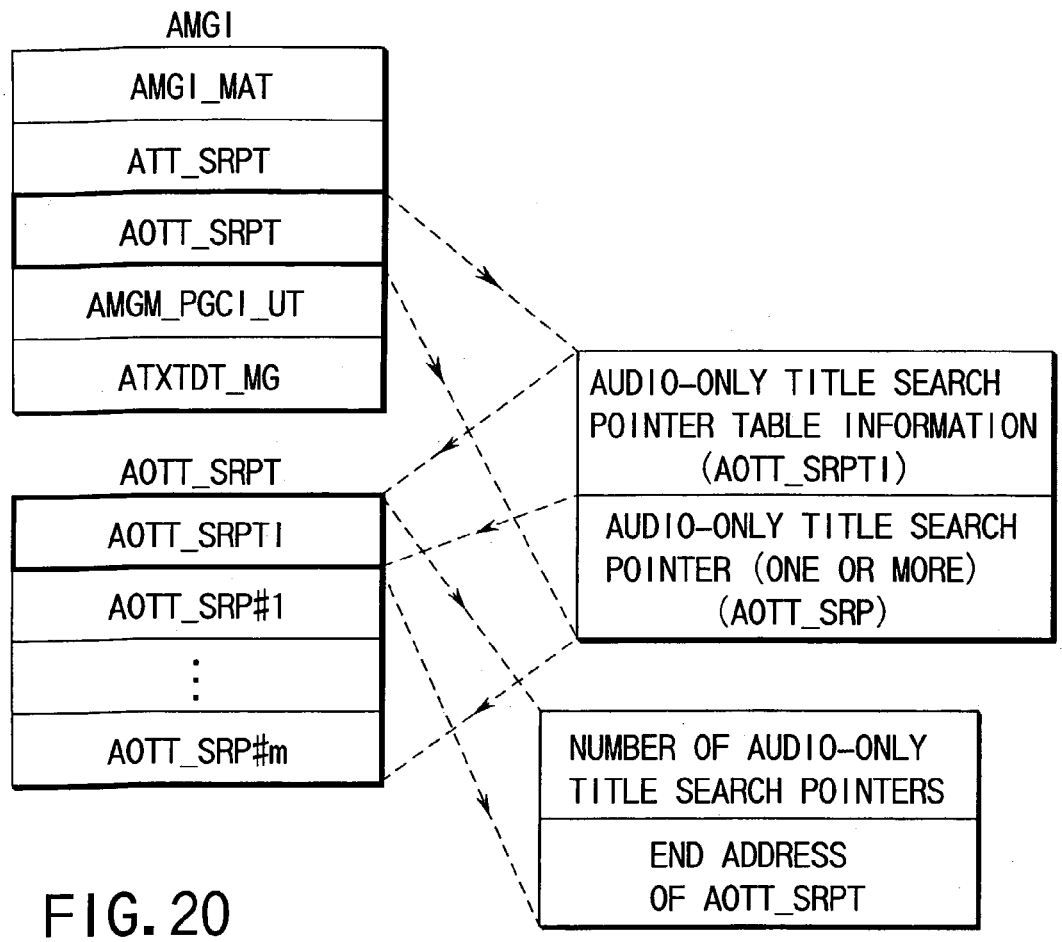
FIG. 20 is a diagram to help explain the contents of the audio-only title search pointer table (AOTT_SRPT) included in the audio manager information (AMGI) shown in FIG. 16.

FIG. 20 is a diagram to help explain the contents of the audio-only title search pointer table (AOTT_SRPT)

included in the audio manager information (AMGI) shown in FIG. 16. The AMGI has two types of search pointers (ATT_SRPT) and (AOTT_SRPT). FIG. 20 shows a search pointer (AOTT_SRP) that can access only the AOTT.

Specifically, the AOTT_SRPT included in the AMGI includes audio-only title search pointer table information (AOTT_SRPTI) and one or more audio-only title search pointers [AOTT_SRP(AOTT_SRP #1 to AOTT_SRP #m)]. The AOTT_SRPTI includes the number of audio-only title search pointers and the end address of the AOTT_SRPT.

Figure 21:
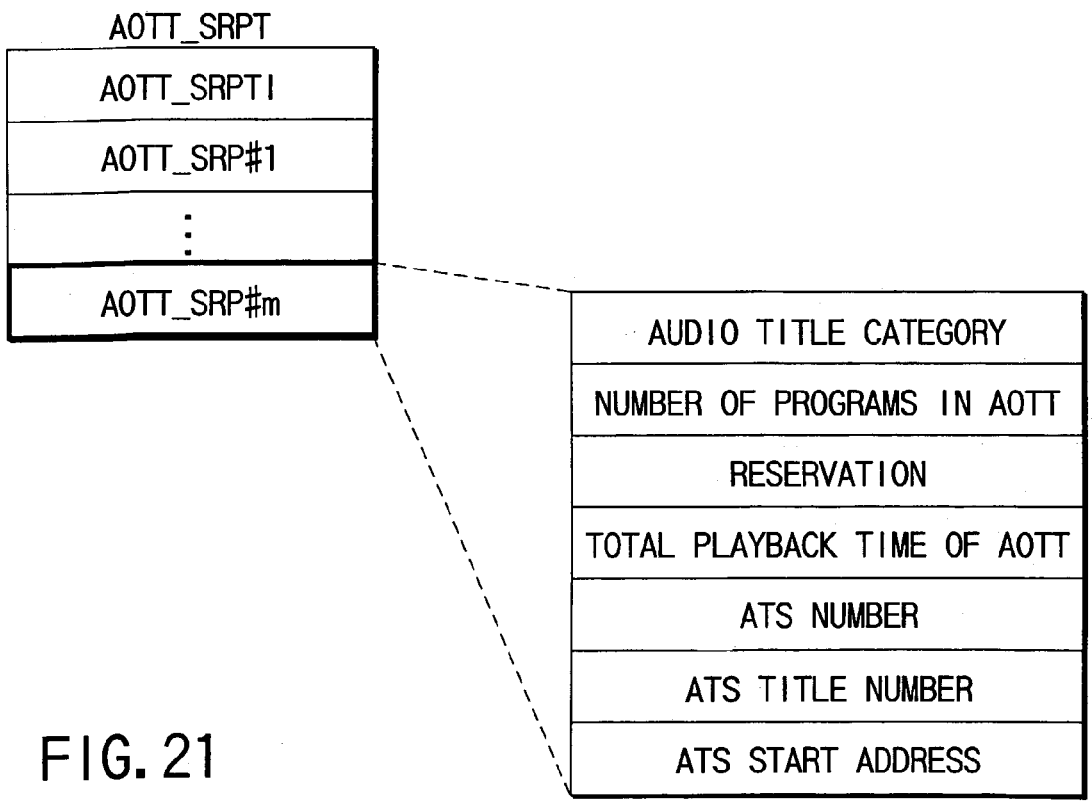
FIG. 21 is a diagram to help explain the contents of the audio-only title search pointer (AOTT_SRP) included in the audio-only title search pointer table (AOTT_SRPT) shown in FIG. 20.

FIG. 21 is a diagram to help explain the contents of an audio-only title search pointer (here, AOTT_SRP #m) included in the search pointer table (AOTT_SRPT) of the audio-only title shown in FIG. 19.

The DVD audio standard has been determined so as to deal with not only sound but also images. The AMG has two pieces of search information (ATT_SRPT) and (AOTT_SRPT). The AOTT_SRPT of FIG. 21 is a table in which only AOTT search information has been written.

In FIG. 21, the audio-only title search pointer (AOTT_SRP) includes an audio title (ATT) category, the number of programs in the audio-only title (AOTT), reservation, the total playback time of the audio-only title (AOTT), the number of the audio title set (ATS), the title number of the audio title set (ATS), and the start address of the audio title set (ATS).

In the playback title control information defined in the audio manger (AMG), a title group (TT_GR) can be specified.

The title group (TT_GR) is a collection of one or more audio titles (ATT) and is defined as a unit that assures continuous playback of ATT groups. From the user's viewpoint, the audio title (ATT) corresponds to a piece of music and the title group (TT_GR) corresponds to an album, a collection of pieces (see FIG. 8). With a record or a CD, when playback is started at the head of the album or in the middle of a piece, the album can be played back continuously until the end of the album has been reached. Similarly, when playback is started at the head of the TT_GR or in the middle of the ATT, the TT_GR can be played back continuously until the end of the TT_GR has been reached.

The following two types can be defined as a title group (TT_GR).

<A1> Audio title group (ATT_GR): this ATT_GR is a title group (TT_GR) composed of audio titles (ATT) defined in the audio title search pointer table (ATT_SRPT).

<A2> Audio-only title group (AOTT_GR): this AOTT_GR is a title group (TT_GR) composed of audio-only titles (AOTT) defined in the audio-only title search pointer table (AOTT_SRPT).

The audio title group (ATT_GR) is for a player that can reproduce images and sound complying with the audio standard (a player that handles both AOTT and AVTT). The audio-only title group (AOTT_GR) is for a player that can reproduce only sound conforming to the audio standard (a player that deals with only AOTT).

The structure of the audio title (ATT) has the following three types:

<B1> ATT has only AOTT.
<B2> ATT has only AVTT.
<B3> ATT has both AOTT and AVTT.

Here, AOTT and AVTT are the same in a piece of music, but AOTT is an pictureless version and AVTT is a picture-added version.

In the case of <B1>, the AOTT search information is written in both of the ATT_SRPT and AOTT_SRPT (see FIGS. 19 and 21).

In the case of <B2>, the AVTT search information is written only in the ATT_SRPT (see FIG. 19).

In the case of <B3>, the AOTT search information is written only in the AOTT_SRPT and the AVTT search information is written only in the ATT_SRPT (see FIG. 19).

FIG. 22 shows the relationship between <B1>, <B2>, and <B3>. FIG. 22 shows the relationship between the audio-only title group (AOTT_GR) accessed using the audio-only title search pointer (AOTT_SRP) in the audio manager information (AMGI) of FIG. 16 and the audio title group (ATT_GR) accessed using the audio title search pointer (ATT_SRP) in the audio manager information (AMGI). It can be said that FIG. 22 shows an example of the relationship between ATT_SRPT and AOTT_SRPT.

In FIG. 22, the audio titles (ATT #1) and (ATT #9) are each composed of only video-added audio titles (AVTT). ATT #2 and ATT #8 are each composed of video-added audio titles (AVTT) and audio-only titles (AOTT). ATT #3 to ATT #7 are each composed of audio-only titles (AOTT).

In FIG. 22, nine audio titles (ATT) are used. These are divided into four groups (GR #1 to GR #4), which constitute an audio title group (ATT_GR). The nine titles are divided into two groups (GR #1, GR #2), which constitute an audio-only title group (AOTT_GR).

In this example, the audio titles (ATT #1) and (ATT #9) are composed of only AVTT and include no AOTT. Consequently, ATT #1 and ATT #9 do not exist as the audio-only title group (AOTT_GR).

Therefore, the number (four in the example) of audio title groups (ATT_GR) generally does not coincide with the number (two in the example) of audio-only title groups (AOTT_GR).

What is important here is to keep the identity of the title group (TT_GR) in both cases where ATT groups are reproduced on a player capable of reproducing images and sound complying with the audio standard (or a player that deals with both AOTT and AVTT) and where ATT group are reproduced on a player capable of reproducing only sound conforming to the audio standard (a player that deals with only AOTT).

Specifically, the corresponding ATT_GR and AOTT_GR have to be composed of the same ATT even when they differ in the GR number and have the same order of ATT in the TT_GR. Otherwise, the user gets confused. This does not apply to the ATT (ATT #1 and ATT #9 in FIG. 22) where only AVTT is present and no AOTT exists.

To meet the above-described requirements, restrictions should be placed in such a manner that "ATT not defined as AOTT" is prevented from mixing with "ATT defined as AOTT" in a one ATT_GR. This maintains the identity of TT_GR in a portion where both ATT_GR and AOTT_GR exist.

In the example of FIG. 22, each of ATT_GR #2 and AOTT_GR #1, and ATT_GR #3 and AOTT_GR #2 is composed of the same ATT and has the same order of ATT in the TT_GR.

Figure 23:
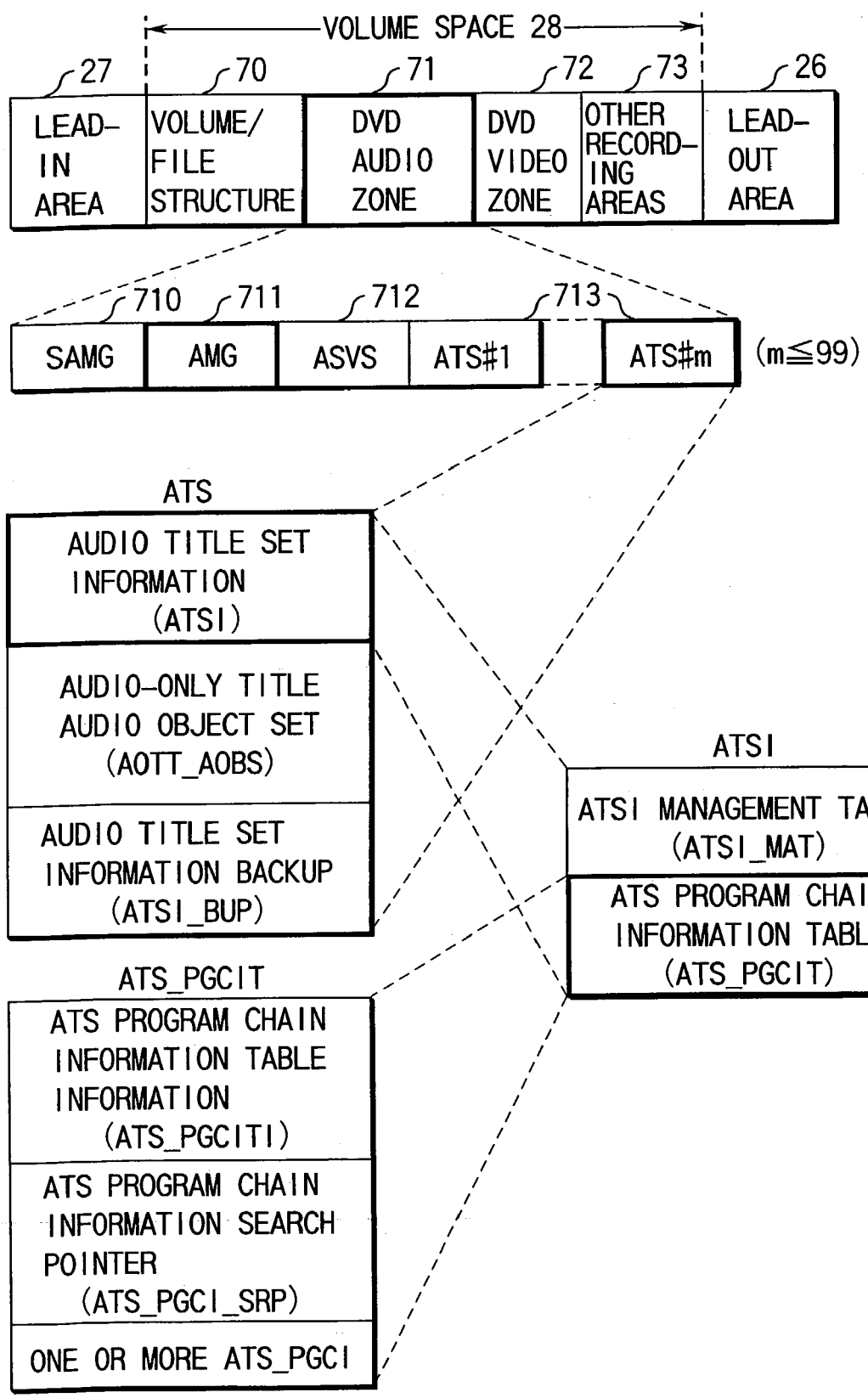
FIG. 23 is a diagram to help explain the recorded contents of an audio title set (ATS) in the DVD audio zone shown in FIG. 3.

FIG. 23 is a diagram to help explain the recorded contents of the audio title set (ATS) in the DVD audio zone 71 of FIG. 3.

The audio title set (ATS) is composed of audio title set information (ATSI), an audio-only title audio object set (AOTT_AOBS), and audio title set information backup (ATSI_BUP).

The audio title set information (ATSI) includes an audio title set information management table (ATSI_MAT) and an audio title set program chain information table (ATS_PGCIT).

The audio title set program chain information table (ATS_PGCIT) includes audio title set program chain information table information (ATS_PGCITI), an audio title set program chain information search pointer (ATS_PGCI_SRP), and one and more pieces of audio title set program chain information (ATS_PGCI).

FIG. 24 is a diagram to help explain the recorded contents of the audio title set information management table (ATSI_MAT) of FIG. 23.

Specifically, the audio title set information management table (ATSI_MAT) includes an audio title set identifier (ATS_ID), the end address of the audio title set (ATS_EA), the end address of the audio title set information (ATSI_EA), the version number (VERN) of the employed audio standard, the end address of the audio title set information management table (ATSI_MAT_EA), the start address (VTS_SA) of the audio-only title AOTT video title set (VTS), the start address of the audio-only title audio object set (AOTT_AOBS_SA) or the start address of audio-only title video object set (AOTT_VOBS_SA), the start address of the audio title set program chain information table (ATS_PGCIT_SA), the attributes for the audio-only title audio object (AOTT_AOB_ATR) or the attributes for the audio-only title video object (AOTT_VOB_ATR) #0 to #7, audio title set data mix coefficients (ATS_DM_COEFT) #0 to #15, and other reservation areas.

When the ATS has no AOTT_AOBS, the start address of the VTS including the VTSTT_VOBS (see FIG. 6) for AOTT is written in the start address (VTS_SA) of the audio-only video title set. When the ATS has AOTT_AOBS, "00000000h" is written in the VTS_SA.

When the ATS has AOTT_AOBS, the start address of AOTT_AOBS is written in the AOTT_AOBS_SA in the relative number of logical blocks counted from the first logical block in the ATS. On the other hand, when the ATS has no AOTT_AOBS, the start address of VTSTT_VOBS is written in the AOTT_VOBS_SA in the relative number of blocks counted from the first logical block in the VTS including the VTSTT_VOBS used for the ATS.

In the ATS_PGCIT_SA, the start address of ATS_PGCIT is written in the relative number of blocks counted from the first logical block in the ATSI.

The number of the aforementioned AOTT_AOB_ATR or AOTT_VOB_ART prepared is 8, from #0 to #7. When the ATS has AOTT_AOBS, the attribute of the AOTT_AOB recorded in the ATS is written in the AOTT_AOB_ATR. On the other hand, when the ATS has no AOTT_AOBS, the attribute of the audio stream in the VOB used in the AOTT_VOB in the ATS is written in the AOTT_VOB_ART. In the AOTT_AOB_ATR or AOTT_VOB_ART, the employed sampling frequency (44 to 192 kHz) and the number of quantization bits (16 to 24 bits) are written.

The ATS_DM_COEFT indicates coefficients used to mix down the audio data with a multichannel output (5.1 channel output) to a two channel output and is used only in one or more AOTT_AOB recorded in the ATS. When the ATS has no AOTT_AOBS, "0h" is written in all the bits in each of the 16 ATS_DM_COEFT (#0 to #15). The area for the 16 ATS_DM_COEFT (#0 to #15) are provided constantly.

Figure 25:
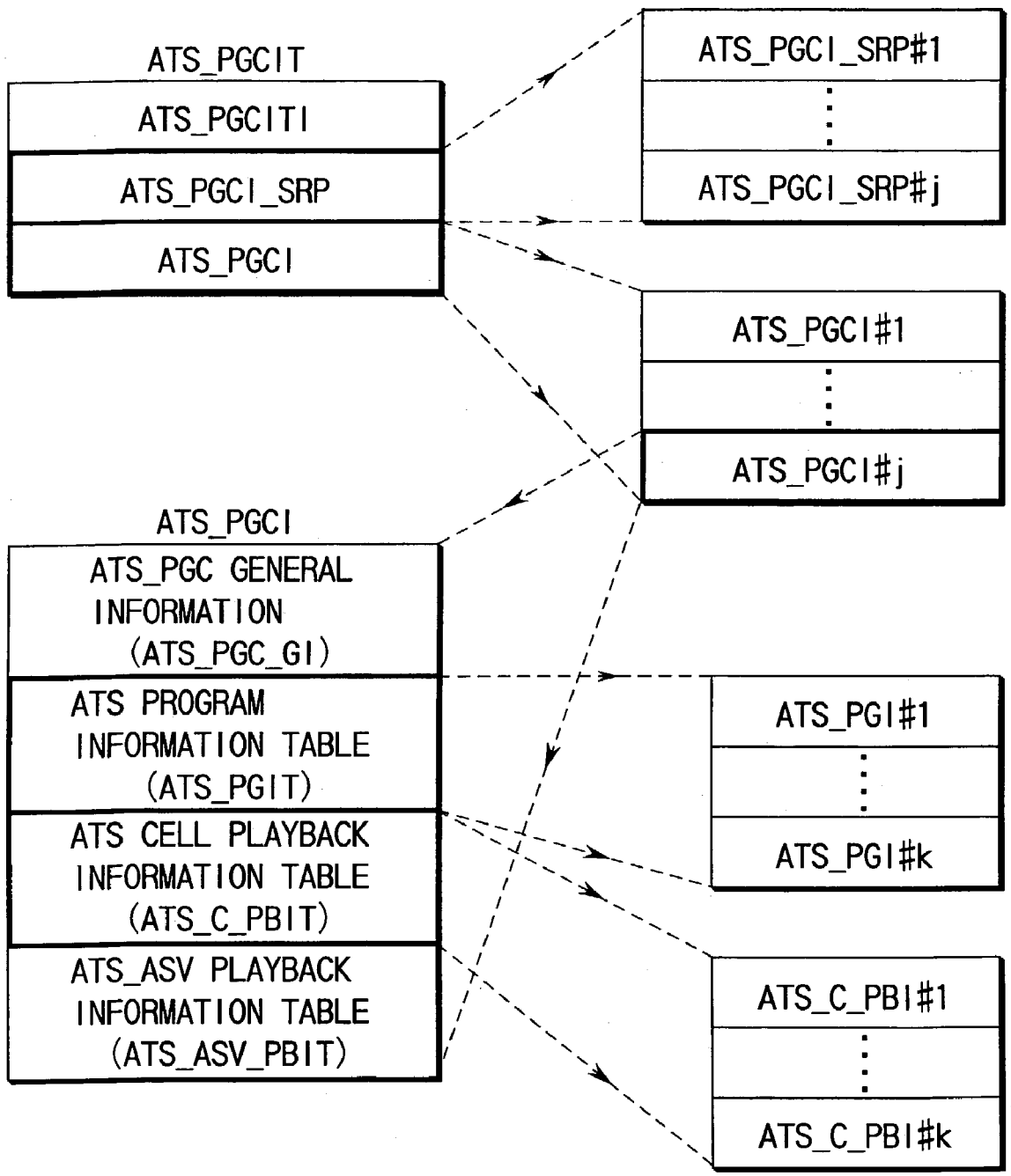
FIG. 25 is a diagram to help explain the contents of the audio title set program chain information table (ATS_PGCIT) included in the audio title set information (ATSI) shown in FIG. 23.

FIG. 25 is a diagram to help explain the contents of the audio title set program chain information table (ATS_PGCIT) included in the audio title set information (ATSI) shown in FIG. 23. The recording position of the ATS_PGCIT is written in the ATS_PGCIT_SA in the ATSI_MAT of FIG. 24.

As described earlier, the ATS_PGCIT includes audio title set program chain information table information (ATS_PGCITI), an audio title set program chain information search pointer (ATS_PGCI_SRP), and audio title set program chain information (ATS_PGCI).

The ATS_PGCI_SRP includes one or more audio title set program chain information search pointers (ATS_PGCI_SRP #1 to ATS_PGCI_SRP #j). The ATS_PGCI includes as many pieces of audio title set program chain information (ATS_PGCI #1 to ATS_PGCI #j) as ATS_PGCI_SRP.

Each ATS_PGCI functions as navigation data for controlling the reproduction of the audio title set program chain (ATS_PGC).

Here, the ATS_PGC is a unit to define an audio-only title (AOTT) and is composed of ATS_PGCI and one or more cells (cells in the AOTT_AOBS or cells in the AOTT_VOBS used as an object for the AOTT).

Each ATS_PGCI includes general information on audio title set program chains (ATS_PGC_GI), an audio title set program information table (ATS_PGIT), an audio title set cell playback information table (ATS_C_PBIT), and an audio title set audio still video playback information table (ATS_ASV_PBIT).

The ATS_PGIT includes one or more pieces of audio title set program information (ATS_PGI #1 to ATS_PGI #k). The ATS_C_PBIT includes as many pieces of audio title set cell playback information (ATS_C_PBI #1 to ATS_C_PBI #k) as the ATS_PGI.

FIG. 26 is a table showing the contents of the audio title set program information (ATS_PGI) shown in FIG. 25. The ATS_PGI includes the contents of the audio title set program (ATS_PG_CNT), the entry cell number of ATS_PG (ATS_PG_EN_CN), the playback start time of the first audio cell in ATS_PG (FAC_ST_PTM), the playback time of ATS_PG (ATS_PG_PB_TM), the pause time of ATS_PG (ATS_PG_PA_TM), reservation for copy management information, and other reservations.

The ATS_PG_CNT includes a description showing the relationship between the preceding program and the present program in terms of physical allocation, a description showing the relationship between the preceding program and the present program in terms of playback time stamp, a description (ATRN) showing the attribute of AOB or the attribute of the audio stream in the VOB in the ATS_PG, and a description (DM_COEFTN) showing a coefficient table number for effecting the down-mixing of an AOB in the ATS_PG (AOB_PG) having the number of AOTT_AOB_ART or AOTT_VOB_ART defined in the ATSI_MAT by using the number of ATS_DM_COEFT defined in ATSI_MAT.

The ATS_PG_EN_CN includes a description of the first ATS cell number (1 to 255) constituting an ATS_PG.

The FAC_SA_PTM includes a description of the low-order 32 bits in the playback time stamp (or presentation time stamp PTS) written in the head audio packet in the first audio cell in the ATS_PG.

The ATS_PG_PB_TM is a description of the total playback time of each cell in the ATS_PG. The total playback time (seconds) is obtained by dividing ATS_PG_PB_TM (32-bit data) by 90000.

The ATS_PG_PA_TM is a description of the pause time able to be defined at the beginning of the ATS_PG. The pause time (seconds) is obtained by dividing ATS_PG_PA_TM (32-bit data) by 90000.

FIG. 27 is a table showing the contents of the audio title set cell playback information (ATS_C_PBI) shown in FIG. 25. The ATS_C_PBI includes the index number (ATS_C_IXN) of a cell in the audio title set, the type of ATS_C (ATS_C_TY), the start address of ATS_C (ATS_C_SA), the end address of ATS_C (ATS_C_EA), and other reservations.

When the ATT has no AOBS, "01h" is written in the ATS_C_IXN. When the ATT has AOBS, the contents of ATS_C_IXN are as follows according to the contents of the ATT_C.

When ATS_C is a silent cell described earlier, "00h" is written in ATS_C_IXN as the index number for the ATS_C.

When ATS_C is an audio cell described earlier, one of "1" to "99" is written in ATS_C_IXN as the index number for the ATS_C.

The index number of the first audio cell (the one having the ATS_C with the lowest number excluding the silent cell) is set at "1." A similar index number may be allocated to one or more ATS_C in the ATS_PG.

When the ATT has no AOBS, "0" is written in all the bits in the ATS_C_TY. On the other hand, when the ATT has AOBS, the structure of ATT_C (ATS_C_COMP) and its usage (ATS_C_Usage) are written in the ATS_C_TY.

Specifically, when the cell is an audio cell composed only of audio data, "00b" is written in ATS_C_COMP (2 bits).

When the cell is an audio cell composed of audio data and real-time information, "01b" is written in ATS_C_COMP (2 bits).

When the cell is a silent cell composed only of silent audio data, "10b" is written in ATS_C_COMP (2 bits).

In the ATS_C_Usage, the data "0001b" indicating such usage as "a spotlight section" for highlighting (spotlighting) a specific portion of the audio manager menu (AMGM) displayed is written.

When the ATS has AOTT_AOBS, the start address of ATS_C expressed in the relative logical block number counted from the first logical block in the AOTT_AOBS in which ATS_C has been recorded is written in the ATS_C_SA.

On the other hand, when the ATS has no AOTT_AOBS, the start address of ATS_C expressed in the relative logical block number counted from the first logical block in the AOTT_VOBS in which ATS_C has been recorded is written in the ATS_C_SA.

When the ATS has AOTT_AOBS, the end address of ATS_C expressed in the relative logical block number counted from the first logical block in the AOTT_AOBS in which ATS_C has been recorded is written in the ATS-_C_EA.

On the other hand, when the ATS has no AOTT_AOBS, the end address of ATS_C expressed in the relative logical block number counted from the first logical block in the VTSTT_VOBS in which ATS_C has been recorded is written in the ATS_C_EA.

Figures 28, 29:
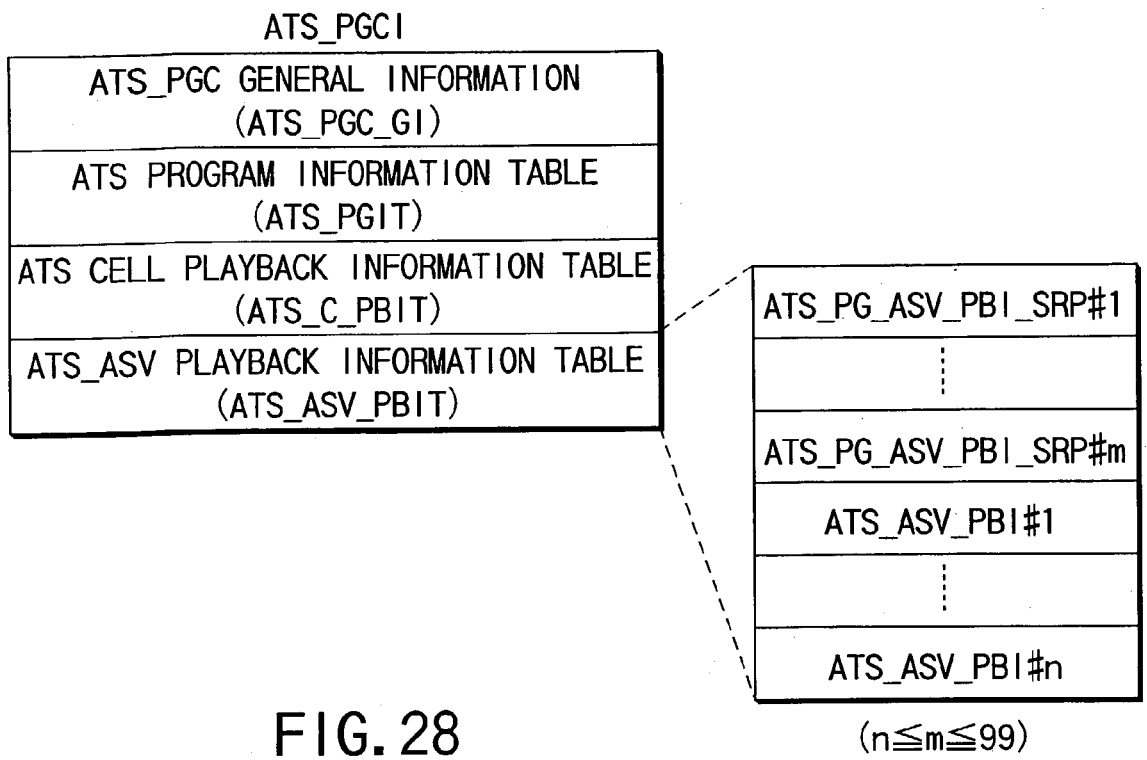
FIG. 28 is a diagram to help explain the contents of the audio title set audio still video playback information table (ATS_ASV_PBIT) shown in FIG. 25.
FIG. 29 is a table showing the contents of the audio title set program audio still video playback information search pointer (ATS_PG_ASV_PBI_SRP) shown in FIG. 28.

FIG. 28 is a diagram showing the contents of the audio title set audio still video playback information table (ATS_ASV_PBIT) shown in FIG. 25. The ATS_ASV_PBIT includes audio title set program audio still video playback information search pointers (ATS_PG_ASV_PBI_SRP #1 to ATS_PG_ASV_PBI_SRP #m) and audio title set audio still video playback information (ATS_ASV_PBI #1 to ATS_ASV_PBI #n). Here, n and m meets the expression: $n \leq m \leq 99$.

FIG. 29 is a table showing the contents of the audio title set program audio still video playback information search pointers (ATS_PG_ASV_PBI_SRP). The ATS_PG _ASV_PBI_SRP includes the number (ASVUN) of audio still video units (ASVU), the display mode (ASV_DMOD) of audio still video (ASV), the start address (ATS_ASV_P-BI_SA) of audio title set audio still video playback information (AST_ASV_PBI), and the end address (ATS_ASV_PBI_EA) of audio title set audio still video playback information (ATS_ASV_PBI).

The ATS_ASV_PBI includes display lists (ASV_DLIST #1 to ASV_DLIST #k: $k \leq 99$) for audio still video (ASV).

Figure 30:
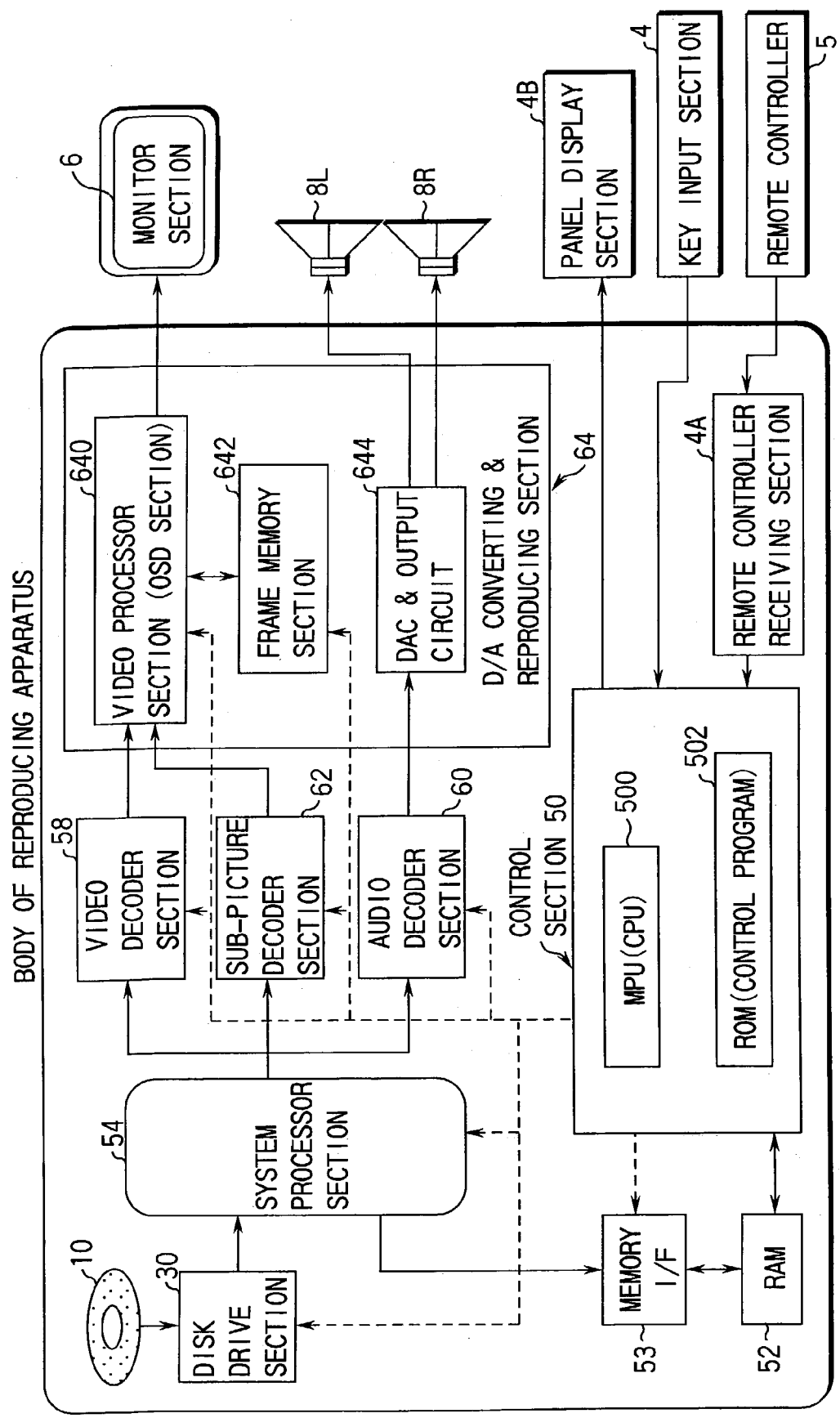
FIG. 30 is a block diagram of an apparatus for reproducing the recorded information in the DVD audio zone of FIG. 3 or the recorded information in the DVD video zone of FIG. 5 from the optical disk of FIG. 1.

FIG. 30 is a block diagram of an apparatus (a DVD player) for reproducing the recorded information in the DVD audio zone 71 of FIG. 3 or the recorded information in the DVD video zone 72 of FIG. 5 from the optical disk (DVD audio disk) 10 of FIG. 1. The reproducing apparatus has the configuration of a DVD video/DVD audio compatible player capable of performing not only audio playback but also video playback. Explanation of the concrete configuration will not be given. The player may be compatible with the current CD playback.

The reproducing apparatus for the optical disk 10 shown in FIG. 30 includes a remote controller 5 that receives the user's operations, a remote controller receiving section that receives the operating state of the remote controller 5, a key input section 4 that receives the user's operations on the reproducing apparatus body side, and a panel display section 4B that is provided on the reproducing apparatus body (or/and the remote controller 5) and informs the user of the result of the user's operation and the playback state of the optical disk 10. The other external units include a monitor section 6 and a speaker section 8L/8R. The speaker section is for two-channel stereo. To effect multichannel playbacks as many speaker systems and driving amplifiers for the speakers as are needed for multichannel playback must be prepared.

The key input section 4, panel display section 4B, remote controller 5, and monitor section 6 constitute a visual user interface. The monitor section 6 is used not only as a playback image monitor for still-picture-added DVD audio disks, but also as display means, such as an on-screen display (OSD). The monitor section 6 is not limited to a direct-view display, such as a CRT display, a liquid-crystal display, or a plasma display, and may be a video projector that projects various images (such as a menu screen, still pictures showing the state of the recording spot, and others) including the OSD information on a large screen.

Information on the user's operations from the remote controller 5 is sent via a remote controller receiving section 4A to the microcomputer (MPU or CPU) 500 of a system control section 50 that controls the operation of the entire reproducing apparatus. The control section 50 includes a ROM 502 in which a control program and others to be executed by the MPU 500 have been stored.

Information on the user's operations from the key input section 4 is sent directly to the MPU 500. The MPU 500 displays the operating state of the reproducing apparatus (various setting states and playback information on the DVD disk) according to information on the user's operations on the panel display section 4B.

A RAM 52 and a memory interface (memory I/F) 53 are connected to the MPU 500. The input/output control of the RAM 52 is carried out via the memory I/F 53. The MPU 500 uses the RAM 52 as a work area. On the basis of various processing programs stored in the ROM 502, the MPU 500 controls the operations of a disk drive section 30, a system processor section 54, a video decoder section 58, an audio decoder section 60, a sub-picture decoder section 62, and a D/A converting & reproducing section 64.

The disk drive section 30 not only rotates the optical disk 10 set in the tray (the inside of the DISK TRAY INLET of FIG. 31) of the reproducing apparatus body, but also reads the recorded data (audio data including voice/music information and, if recorded on the optical disk 10, main picture data/video data including moving picture information/still picture information, and sub-picture data including subtitle information/menu information) from the optical disk 10. The disk drive section 30 subjects the read-out data to signal processes, including signal demodulation and error correction, and converts the processed data into data strings in pack form (see FIGS. 4 and 6). The resulting data is sent to the system processor section 54.

The system processor section 54 has a packet transferring section (not shown) that judges the types of various packets included in the data reproduced from the optical disk 10 and delivers the data items in the packet to the corresponding one of the decoders (58, 60, 62).

The packet transferring section segments the pack-form data string from the disk drive section 30 by the type of pack (such as, navigation pack, video pack, sub-picture pack, audio pack, or real-time information pack). An ID data item indicating the transfer time data item and the type of data is recorded in each of the segmented packs.

Referring to the transfer time data item and the ID data item, the system processor section 54 transfers video packs, sub-picture packs, and video packs to the video decoder section 58, sub-picture decoder section 62, and audio decoder section 68, respectively. An audio pack or a real-time information pack corresponding to a silent cell is sent to the audio decoder section 60.

The system processor section 54 transfers the control data in the navigation pack to the RAM 52 via the memory I/F 53. The MPU 500, referring to the transferred control data in the RAM, controls the playback operation in each section of the reproducing apparatus body.

The video decoder section 58 decodes the video data MPEG-encoded in the video pack transferred from the system processor section 54 and creates the uncompressed image data.

The sub-picture decoder section 62 decodes the sub-picture data run-length-compressed in the sub-picture pack transferred from the system processor section 54 and creates the uncompressed bit map sub-picture data. The sub-picture decoder section 62 includes not only a sub-picture decoder for decoding the sub-picture data from the system processor section 54 but also a highlighting section (in the case of DVD video) for decoded sub-picture data.

The sub-picture decoder expands the pixel data (including highlighted pixels, pattern pixels, and background pixels) in units of a specific number of bits (two bits) run-length-compressed according to a specific rule and restores the original bit map image.

The highlighting section performs a corresponding highlighting process according to the X-Y coordinate values indicating the rectangular area in which the highlight information (e.g., the choices on a menu), color codes, and highlight color/contrast value supplied from the MPU 500.

The highlighting process can be used as means for enabling the user to easily recognize a displayed specific item (the operator for selecting the type of reproduced spoken language and the type of language used in reproduced subtitles or the operator for selecting a specific item, such as the sampling frequency of the reproduced sound, the number of quantization bits, or the number of playback channels) on a visual user interface on the monitor section 6.

When the color and contrast of each pixel in the decoded sub-picture data are changed according to the highlight information, the changed sub-picture data is supplied to the image combining section (not shown) of a video processor section 640. The image combining section combines the decoded image data with the highlighted sub-picture data. The resulting-image is displayed on the monitor section 6.

The RAM 52 includes a menu table for storing the start addresses of a sub-picture menu, an audio menu, an angle menu, and a chapter (program) menu. To highlight a specific part of these menus, the highlighting process is used.

The audio decoder section 60 decodes the audio data in the audio pack transferred from the system processor section 54 and creates audio data for two-channel stereo or multi-channel stereo. When the audio data in the audio pack is compression-encoded data (such as MPEG or AC-3), the audio decoder section 60 also decodes the data.

The image data (normally, moving-picture signals) decoded by the video decoder section 58 and the sub-picture data (normally, the bit map data on subtitles and menus) decoded by the sub-picture decoder section 62 are transferred to a video processor 640. The video processor 640 mixes the image data and the sub-picture data in a specific ratio to produce the final analog image signals (composite video signals, separate S signals, or component signals Y/Cr/Cb) and outputs these signals to the monitor section 6.

When the image data decoded by the video decoder section 58 is the main part of the movie on a DVD video disk, the sub-picture data is usually the subtitles in the language selected by the user. The monitor section 6 displays the main part of the movie with subtitles.

When the image data decoded by the video decoder section 58 is the menu section of the movie, the sub-picture data serves as the characters constituting menus and user select operators (subjected to the highlighting process, when necessary). In this case, the background (still picture or moving picture) of the menu is displayed according to the image data and the operators whose representations are changed by the user's select operation are displayed on the background screen according to the sub-picture data.

On the other hand, when the image data decoded by the video decoder section 58 is a still picture on a DVD audio disk, the sub-picture data is, for example, an explanatory text in the language selected by the user. In that case, the still picture with text is displayed on the monitor section 6.

The video processor section 640 includes an OSD section that generates display data for on-screen display. The user's operations from the remote controller 5 or the like are processed by the MPU 500. The result of the processing is sent from the MPU 500 to the OSD section of the video processor 640. The OSD section generates image data corresponding to the result of processing from the MPU 500 and sends the image data to the monitor section 6 in analog image signal form.

In other words, the video processor section 640 converts the digital signals from the video decoder section 58 and sub-picture decoder section 62 into analog signals and multiplexes them.

A frame memory section 642 is connected to the video processor section 640. The frame memory section 642 is used not only to multiplex the pictures of the image data and the pictures of the sub-picture data but also to provide an n-partition (e.g., 4-partition) multiscreen display.

When chapter searching is done, the frame memory section 642 can fix part of the images from the video decoder section 58 as still pictures and use them when sending the still pictures to the monitor section 6 until the target chapter starts to be reproduced.

When the display corresponding to the result of the user's operation is made by the OSD, the frame memory section 642 can be used in multiplexing the image data with the OSD display.

The audio data decoded at the audio decoder section 60 is transferred to a DAC & output circuit 644. The DAC & output circuit 644 converts the audio data (digital) from the audio decoder section 60 into the corresponding analog audio signal, amplifies the analog audio signal suitably, and outputs it to the speaker section 8L/8R.

When the multichannel audio is down-mixed to two channels on the basis of the contents of ATS_DM_COEFT in the audio title set information management table (ATSI_MAT) shown in FIG. 24, the MPU 500 sends the down-mix coefficient (parameter) to the DAC & output circuit 644. Then, on the basis of the coefficient received, the DAC & output circuit 644 down-mixes the multichannel audio data decoded at the audio decoder section 60 into two channels and outputs two channel analog audio signals.

The video processor section 640, frame memory section 642, and DAC & output circuit 644 constitute the D/A converting/reproducing section 64.

Each of the system processor section 54, video decoder section 58, audio decoder section 60, and sub-picture decoder section 62 includes a register for temporarily storing a system time clock (STC) used to know the operation timing and the instructions and pieces of information from the system MPU 500.

Figure 31:
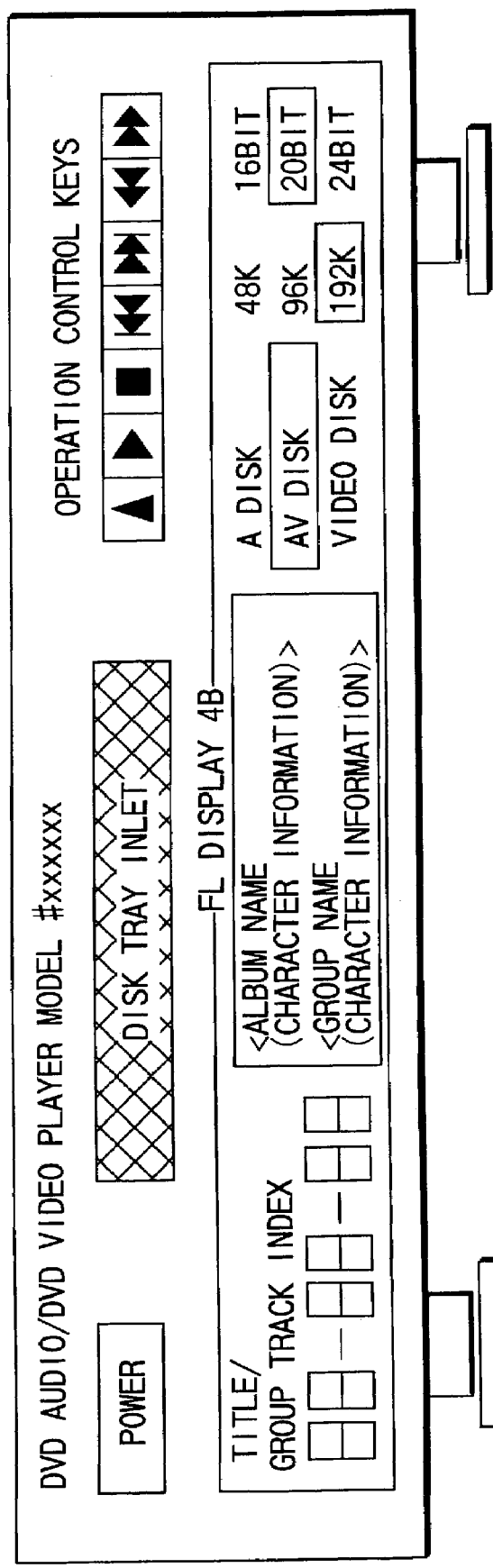
FIG. 31 is a front view of an example of the front panel of the reproducing apparatus of FIG. 30.

FIG. 31 shows an example of the front panel of the reproducing apparatus shown in FIG. 30. The front panel is provided with a fluorescent display section (FL display) 4B corresponding to the panel display section 4B shown in FIG. 30.

On the FL display 4B of FIG. 31, an album name and/or a group name are displayed in characters according to the audio text data manager ATXTDT_MG in the AMGI. Taking FIG. 8 as an example, "THE FIRST VOLUME OF WORKS BY BEETHOVEN" is displayed as an album name and "SYMPHONY NO. 1" is displayed as a group name.

On the left numeral display section of the FL display 4B, a title number (in the case of DVD video) or group number (in the case of DVD audio), a track number, and index number are displayed.

When the optical disk 10 set in the disk tray of FIG. 31 is an AV disk (a disk with ATT_SRP of FIG. 19), the "AV DISK" part is highlighted as shown in the figure on the character display section somewhat in the middle and on the right side of the FL display 4B. When the optical disk 10 set is an A disk (a disk with AOTT_SRT of FIG. 21), the "A DISK" part is highlighted on the right character display section of the FL display 4B. When the optical disk 10 set is a video disk with only VTS and no ATS (a disk without the ATS directory of FIG. 11), the "VIDEO DISK" part is highlighted on the right character display section of the FL display 4B.

Furthermore, on the right numeral display section of the FL display 4B, the sampling frequency and the number of quantization bits in the audio contents to be reproduced are displayed. The display can be made automatically on the basis of AOTT_AOB_ATR or AOTT_VOB_ART in the audio title set information management table ATSI_MAT.

The following two types of DVD audio player that plays back a DVD audio disk (A disk or AV disk) can be considered:

<C1> Player capable of reproducing images and sound complying with the audio standard.

<C2> Player capable of reproducing only sound complying with the audio standard.

The <C1>-type player has only to read the search information (FIG. 19) written in the ATT_SRPT for playback of contents.

On the other hand, the <C2>-type player has only to read the search information (FIG. 21) written in the AOTT_SRPT for playback of contents.

By doing this, the reproducing method on each type of player is simplified. Because the <C2>-type player cannot reproduce ATT #1 and ATT #9 of FIG. 22 because they have no AOTT.

The reproducing apparatus of FIG. 30 is a player of the <C1>type. The operation of the player playing back the optical disk 10 with the data structure of FIG. 13 will be explained.

When the optical disk 10 with the data structure of FIG. 13 is played back on an ordinary DVD video player, the video player reads the VMG in the VTS directory under the root directory of FIG. 11 and, on the basis of the information, determines the title to be reproduced. Then, according to the instruction given by the playback unit defined in the VTS corresponding to the determined title, all of or part of the object set (VOBS #1 or VOBS #2) of FIG. 13 is reproduced.

In the data structure of FIG. 13, the video player recognizes the parts excluding VMG, VTS #1 and VTS #2 as the other recording areas 73 (see FIGS. 3 and 5). Therefore, no matter what type of data has been written in the parts recognized as the other recording areas 73, this has no effect on the video player reproducing VOBS #1 and VOBS #2. In this case, the video player cannot reproduce the objects present in the other recording areas 73.

On the other hand, when the optical disk 10 with the data structure of FIG. 13 is played back on a DVD audio player of FIG. 30, the audio player reads the AMG in the ATS directory under the root directory of FIG. 11 and reproduces the contents on the basis of the information. In title specification using AMG, not only the playback unit defined in the ATS recorded in the DVD audio zone 71 (see FIG. 3) but also the playback unit defined in the VTS recorded in the DVD video zone 72 (see FIG. 5) can be specified.

The playback unit defined in the ATS can specify not only the playback route of the object (AOBS #1 or AOBS #2) recorded in the DVD audio zone 71 but also the playback route of the audio data recorded in the object (e.g., VOBS #1) in the DVD video zone 72.

The VOBS #1 marked with slanted lines in FIG. 13 indicates part of the DVD video shared by the DVD audio side. Here, the arrow (A) indicates the case where the playback unit in the DVD video zone 72 is referred to. The arrow (B) indicates the case where the playback unit in the DVD audio zone 71 refers to the audio part of the object (VOBS #1) in the DVD video zone 72.

When the audio part of the object (VOBS #1) in the DVD video zone 72 is referred to by the playback unit in the DVD audio zone 71, the common reference part (the part shared by the DVD audio and DVD video) can be defined differently from each unit (such as cells, programs, or program chains) defined by the definition information (VTSI) in the playback unit in the DVD video zone 72, on the basis of the definition information (ATSI) in the playback unit. This is because the video player may differ from the audio player in the reproducing method, although the objects are the same (see FIG. 7).

The shared part is used by using a video object unit VOBU as a unit. The reason is that the unit in which an audio data stream and other (video and sub-picture) data streams are each packed and time-division-multiplexed is a VOBU.

As shown in FIG. 13, by placing the DVD audio zone 71 physically in front of the DVD video zone 72, all the addresses of the playback units specified in the individual pieces of the management information can be limited to only ascending address specification. This simplifies the design and development of audio players.

The operation of a video player in the data structure of FIG. 15 is the same as in FIG. 13. The operation of an audio player in the data structure of FIG. 15 is almost the same as in FIG. 13. The audio player jumps to the head of the AMG, reads the management information, and reproduces the audio object sets (AOBS #1 and AOBS #2). The AOBS #1 is an object in the DVD video zone 72. Using ATSI #1, cells, programs, and program chains in AOBS #1 are defined again. In AOBS #1, VOBU is used as a unit.

In the above embodiment, the case where the DVD audio data and/or DVD video data included in the volume space is recorded on the optical disk 10 has been explained. However, the data structure of the present invention (see FIGS. 3 to 29) is not limited to the case where the data is recorded on the optical disk 10. For instance, bit streams including the data having the structures shown in FIGS. 3 and 11 may be used in digital broadcasting or digital communications. In this case, electromagnetic waves or communication lines function as mediums. Moreover, communication terminals, such as DVD broadcasting receivers or personal computers, function as DVD audio players.

Systems to which the present invention is applicable have been generally explained. The points a stress is laid on in the invention will be explained in order.

The main point is that the cell structure in DVD audio is given a characteristic. First, there are the following two types of DVD audio, depending on the type of data dealt with:

[A-1] Audio with Video: a system that handles both audio data and video data.

[A-2] Audio without Video: a system that handles only audio data and deals with no video data.

The data structure of type [A-1] is basically the same as that in the DVD standard. What the present invention deals with is related to the audio data structure of type [A-2]. The optical disk 10 for the DVD audio system has the structure as explained earlier. All of the one side of the optical disk 10 is defined as a volume. A title group (TT_GR) is a component element of a volume and composed of one or more audio titles (ATT). The TT_GR compares to an album in a record or a CD. It is assured that track groups in one TT_GR can be reproduced continuously.

There are the following two types of ATT:

[B-1] Audio with Video Title (AVTT): a title made up of audio data and video data.

[B-2] Audio Only Title (AOTT): a title made up of only audio data.

The AVTT and AOTT are generally called ATT. As described above, since the present invention deals with the data structure of type [A-2], explanation of AOTT will be given. One AOTT is made up of one PGC. More specifically, as shown in FIG. 3, one AOTT is composed of the program chain information (ATS_PGCI) in the ATS and one or more cells in the audio object set (AOBS) in the corresponding ATS.

A track is a program (PG) defined in the PGC. One track is composed of one PG. The track is made up of one or more cells.

Generally, in the audio contents, a track is used as a unit in separating pieces of music. A cell is used as a unit in separating the numbers in a piece of music. The playback of the audio contents is defined by specifying the playback sequence of cells.

The following specifications are required for the audio data structure of type [A-2]:

[C-1] The attribute of audio data has to be able to be set track by track.

About [C-1]: in a music CD, the attributes (including the sampling frequency fs and the number of quantization bits Qb) of each piece of music in one album are all the same. In DVD audio, however, attributes are allowed to be set piece by piece to increase the degree of freedom of the sound source. Specifically, the content provider can set attributes track by track. The attributes for each track in DVD audio include sampling frequency, the number of quantization bits, channel assignment, and down-mix coefficient.

As described above, when the audio data fulfilling the specification in item [C-1] is reproduced on a DVD player, there arises a sound break problem at the start of playback of tracks. However, from the viewpoints of contents, the sound break should be managed by the producer. Moreover, as described above, the length of a sound break should be the same, regardless of a player with or without a video reproducing function.

Therefore, according to the present invention, there is provided a data structure which enables the producer to set the length of sound break time by himself and which enables a player to determine whether a sound break is present or not in the playback procedure defined by the producer and realizes the setting of the sound break time set by the producer.

A sound break may occur in a place where the attributes of two tracks making a playback transition differ from each other. Specifically, when the player reproduces a track with an attribute and the attribute of the next track to be reproduced differs from the preceding one, the player has to make various settings [including the setting of buffers affected due to the difference in the number of quantization bits, the setting of the clock (sampling) frequency, and the setting of the number of channels]. During the settings, the data transfer is stopped and therefore a break in the sound takes place. Naturally, the sound break does not occur when the attributes of two tracks making a playback transition are the same. Consequently, a sound break may or may not take place in one title group (TT_GR).

Since the sound break is ascribed to a physical cause, it cannot be solved in terms of the application-level data structure. Therefore, the system of the present invention positively admits the existence of a sound break described above and constructs such a data structure as allows the content provider to manage the sound break time length. The resulting form gives no unnatural feeling to the user when it is reproduced.

The types of cells of audio data are defined as follows:

[D-1] Audio cell (A_C): a cell composed of ordinary audio data.

[D-2] Silent cell (SI_C): a cell composed of silent audio data.

Then, the data identifying information to identify the contents of cell components is added to the cell information, thereby making it possible to discriminate between the two types of cells. Here, silent means not that audio data does not exist, but that there is audio data with an amplitude of zero.

Figure 32:
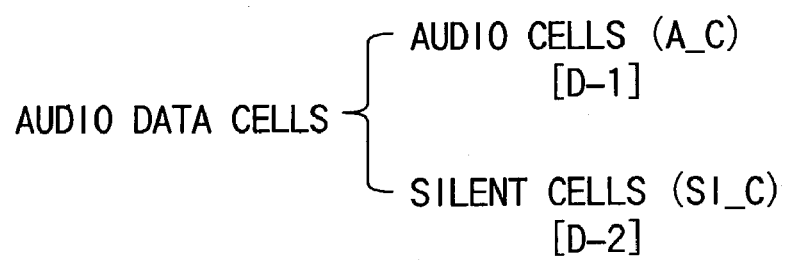
FIG. 32 describes the types of audio data cells forming the important part of the present invention.

FIG. 32 shows the classification of two types of cells.

An audio cell (A_C) in a audio data cell includes no still picture data. A silent cell (SI_C) corresponds to a special case in an audio data cell. All the audio data items in the silent cell are silent. The silent cell is used to set and manage the length of time of silence.

One ATS_PG is composed of one or more ATS_C. The ATS_PG corresponds to a track and the ATS_C corresponds to a cell.

Figure 33A:
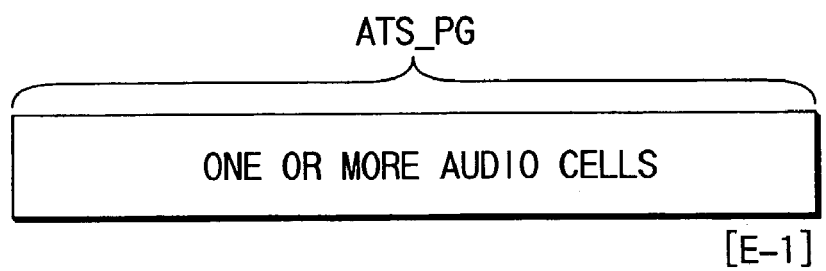
FIGS. 33A and 33B are diagrams to help explain the types of audio title set program and the data allocation structure.
Figure 33B:
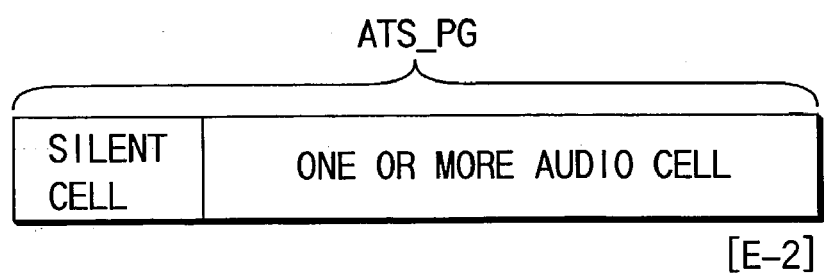

FIGS. 33A and 33B show two ways in which ATS_C are arranged in the ATS_PG.

Specifically, in [E-1] ATS_PG, only A_C are arranged.

In [E-2] ATS_PG, the first cell is SI_C and the second and later cells are all A_C arranged in sequence.

All the ATS_C constituting one ATS_PG meet the following conditions:

[F-1] All the ATS_C constituting one ATS_PG are physically consecutive in the arrangement.

[F-2] The presentation time stamps (PTS) in all the ATS_C constituting one ATS_PG are consecutive.

[F-3] At least one A_C exists in one ATS_PG.

[F-4] The presentation time of one A_C is one second or longer.

[F-5] The audio attributes of all the SI_C constituting one ATS_PG and those of the A_C group are the same.

[F-6] The presentation time of one SI_C is 0.5 sec or longer.

Figure 34:
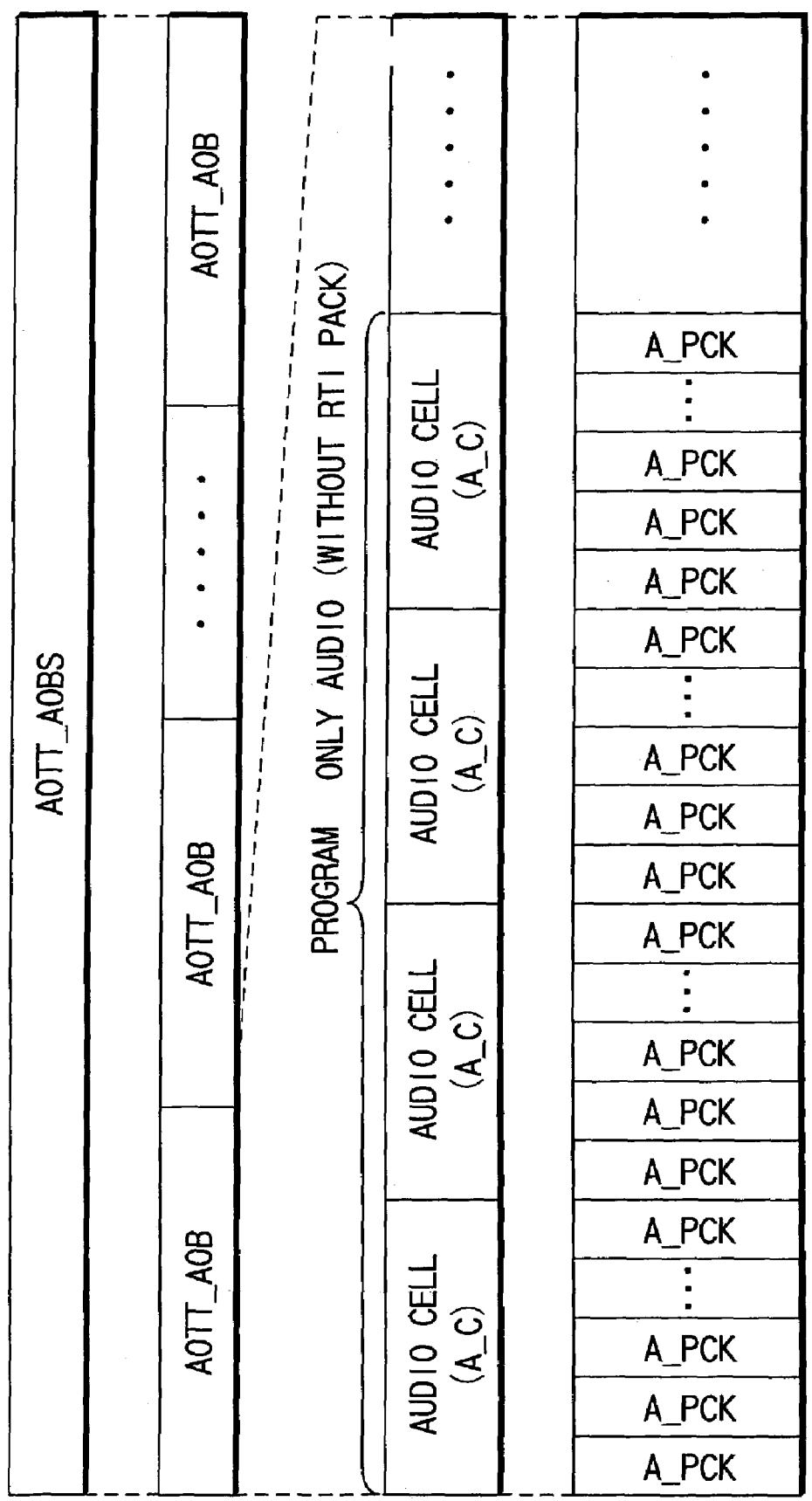
FIG. 34 is a diagram to help explain an example of audio-only data pack trains in the audio-only title.
Figure 35:
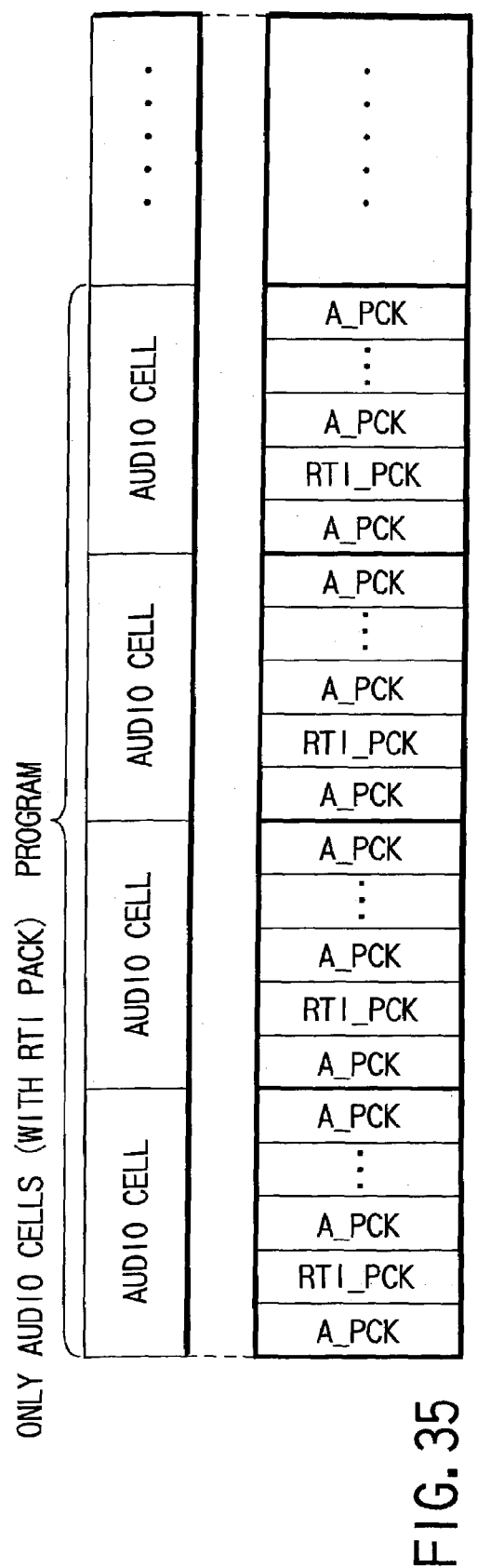
FIG. 35 is a diagram to help explain pack trains when audio-only title audio and real-time data are present.
Figure 36:
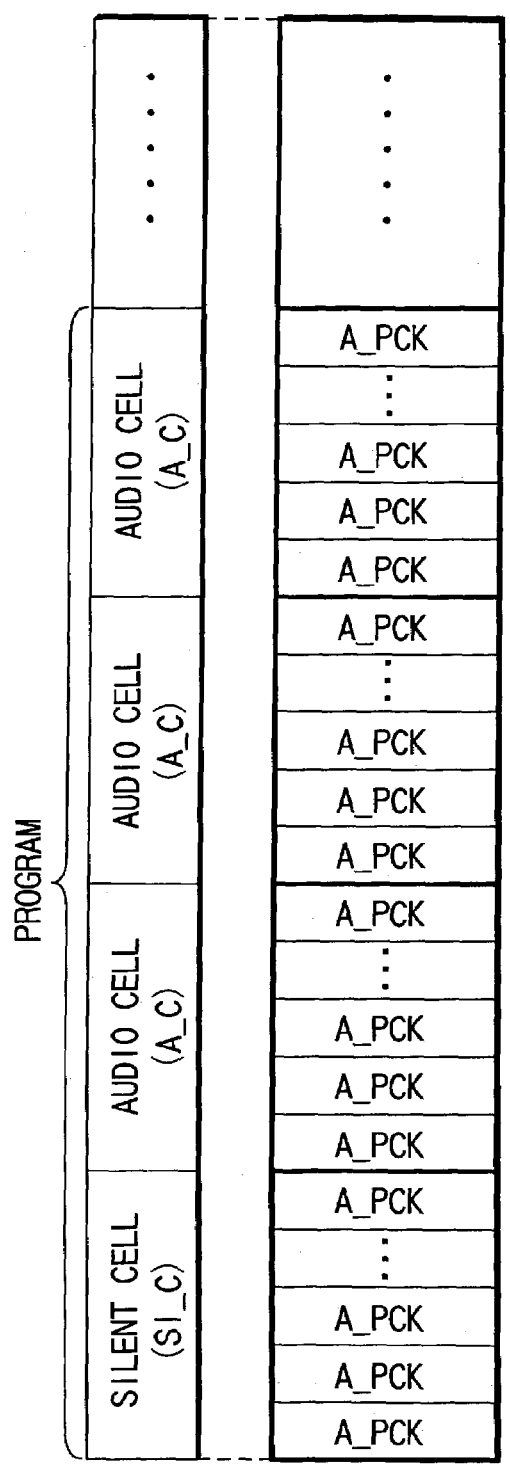
FIG. 36 is a diagram to help explain pack trains when audio-only title audio cells and a silent cell are present.

FIGS. 34, 35, and 36 are diagrams to help explain AOTT_AOB and AOTT_AOBS. In the figures, A_PAK means an audio pack, and PTI_PAC means a real-time information pack.

As described above, the target title is AOTT of the type described in item [B-2]. Therefore, an audio object, the substance of the data, is an Audio Object for Audio Only Title (AOTT_AOB). The AOTT_AOB is composed of one or more ATS_C. Each ATS_C is composed of pack groups.

The data included in the AOTT_AOB is audio data. The audio data includes silent audio data (with an amplitude level of zero as described earlier). It also includes a little additional data of non-image [this is called real-time information data], such as text data, as a special example in the form of RTI packs.

The AOTT_AOB has to include audio data. All the attributes of the audio data in one AOTT_AOB have to be the same. The still picture data is included optionally in the AOTT_AOB. The still picture included in one program (PG) has to be outputted before the audio data in the program is reproduced.

One AOTT_AOB is one program stream or part of the stream written according to the system part of the MPEG-2 standard (ISO/IEC 13818-1). The AOTT_AOBS is a collection of AOTT_AOB. As defined in [D-1] and [D-2], the following two types of cells are defined in one AOTT_AOB.

[G-1] An audio cell (A_C) is composed of only audio data packs groups (see FIG. 34) or of audio data pack groups and additional non-image data (RTI data) pack groups (see FIG. 35). Its presentation time is one second or longer.

[G-2] A silent cell (SI_C) is composed of only silent audio data pack groups (FIG. 36) and is used to set a silent period. The presentation time for one SI_C is 0.5 second or longer.

The following two cases can be considered in connection with the relationship between two adjacent PGs on the PGC:

[I-1] A PG and the preceding PG have the same attributes.

[I-2] A PG and the preceding PG have different attributes.

In the PG, the attributes of the audio data the cells in the PG have and the PG information to define the temporal relationship with the preceding PG are written. By recognizing the contents and information on the cell arrangement (playback sequence) in the PG, two states in item [I-1] and item [I-2] can be recognized easily on a player.

FIGS. 37A to 37C and FIGS. 38A to 38C show the relationship between PTS and playback time in two adjacent PGs in the two cases described in item [I-1] and [I-2].

Figure 37A:
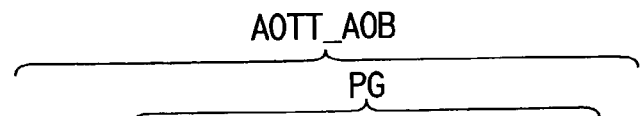
FIGS. 37A to 37C are diagrams to help explain a pack train where programs in front of and behind a program have the same attributes and are composed of only audio cells, and the change of the presentation time stamp and the change of the playback time caused by the playback sequence.
Figure 37B:
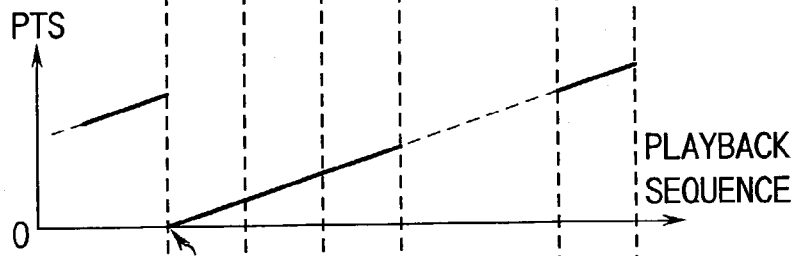
Figure 37C:
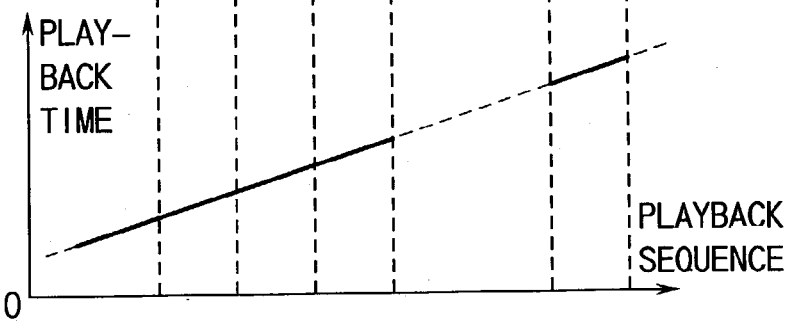

FIGS. 37A to 37C show a case in item [I-1]. FIGS. 37A, 37B, and 37C illustrate the arrangement (PG) of audio packs on a track, the values of presentation time stamps (PTS), and the passage of playback time, respectively. In this case, the consecutive transfer of audio data streams is maintained and the continuity of audio playback is also maintained. The PTS is reset at the beginning of the PG.

In this case, the first cell in the PG might be SI_C but the state remains unchanged. The reason is that SI_C is a kind of audio cell and corresponds to a special case where all the audio data items have an amplitude level of zero.

Figure 38A:
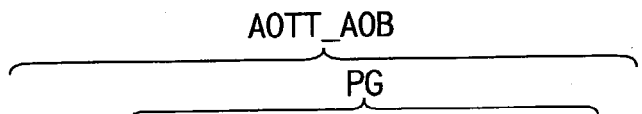
FIGS. 38A to 38C are diagrams to help explain a pack train where programs in front of and behind a program have different attributes and are composed of audio cells including silent cells, and the change of the presentation time stamp and the change of the playback time caused by the playback sequence.
Figure 38B:
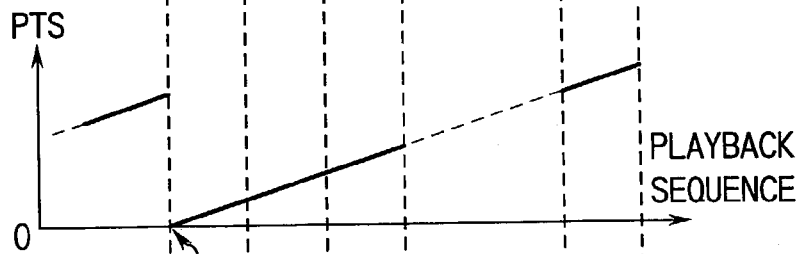
Figure 38C:
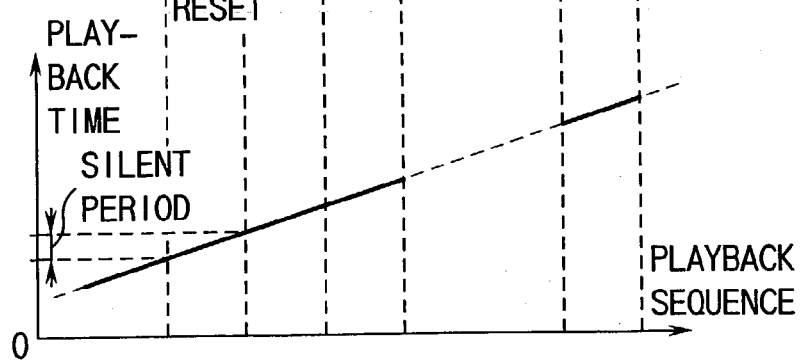

FIGS. 38A to 38C show a case in item [I-2]. FIGS. 38A, 38B, and 38C illustrate the arrangement (PG) of audio packs on a track, the values of presentation time stamps (PTS), and the passage of playback time, respectively. In this case, too, the consecutive transfer of audio data streams is maintained. Since hardware resetting is necessary in changing the attributes, audio playback is discontinued during the resetting.

In this case, the content producer can manage the intervals of silent time by setting the first cell in the PG to SI_C. Specifically, the content producer can set the intervals of silent time at will by setting the length of SI_C (0.5 sec or longer).

Although PTS are written discontinuously between adjacent PGs in FIGS. 37A to 37C and FIGS. 38A to 38C, the PTS may be continuous because the audio data streams in both PGs are continues.

The two types of cells will be described systematically as follows. First, as shown in FIG. 3, the DVD audio zone 71 is composed of a simple audio manager (SAMG) file, an audio manager (AMG) file, an audio still video set (ASVS) file, and an audio title set (ATS) file. The audio title set (ATS) is composed of an audio title set information (ATSI) file, an audio-only title audio object set (AOTT_AOBS) file, and an audio title set information backup (ATS_BUP) file.

As shown in FIG. 23, the audio title set information (ATSI) is composed of an audio title set information management table (ATS_MAT) file and an audio title set program chain information table (ATS_PGCIT) file.

The ATS_PGCIT is composed of an audio title set program chain information table information (ATS_PGCITI) file, an audio title set program chain information search pointer (ATS_PGCI_SRP) file, and an audio title set program chain information (ATS_PGCI) file.

As shown in FIG. 25, the ATS_PGCI is composed of an audio title set program chain general information (ATS_PGC_GI) file, an audio title set program information table (ATS_PGIT) file, an audio title set cell playback information table (ATS_C_PBIT) file, and an audio title set audio still video playback information table (ATS_ASV_PBIT) file.

An item is set as a variable in each piece of audio title set cell playback information (ATS_C_PBI) written the audio title set cell playback information table (ATS_C_PBIT). The variable is the audio title set cell type (ATC_C_TY) shown in FIG. 27. This specifies which one of the following items the cell falls under:

[J-1] An audio cell (A_C) composed of only audio data.

[J-2] An audio cell (A_C) composed of audio data and real-time information.

[J-3] A silent cell (SI_C) composed of only silent audio data with an amplitude level of zero.

Furthermore, "00h" is specified for variable (ATC-_C_IXN) when the cell is SI_C. When the cell is A_C, the index number (in the range of 1 to 99) of the cell is specified.

Because the player knows the types of the individual cells from these pieces of information, it can recognize the presence or absence of a break in sound beforehand.

Figure 39:
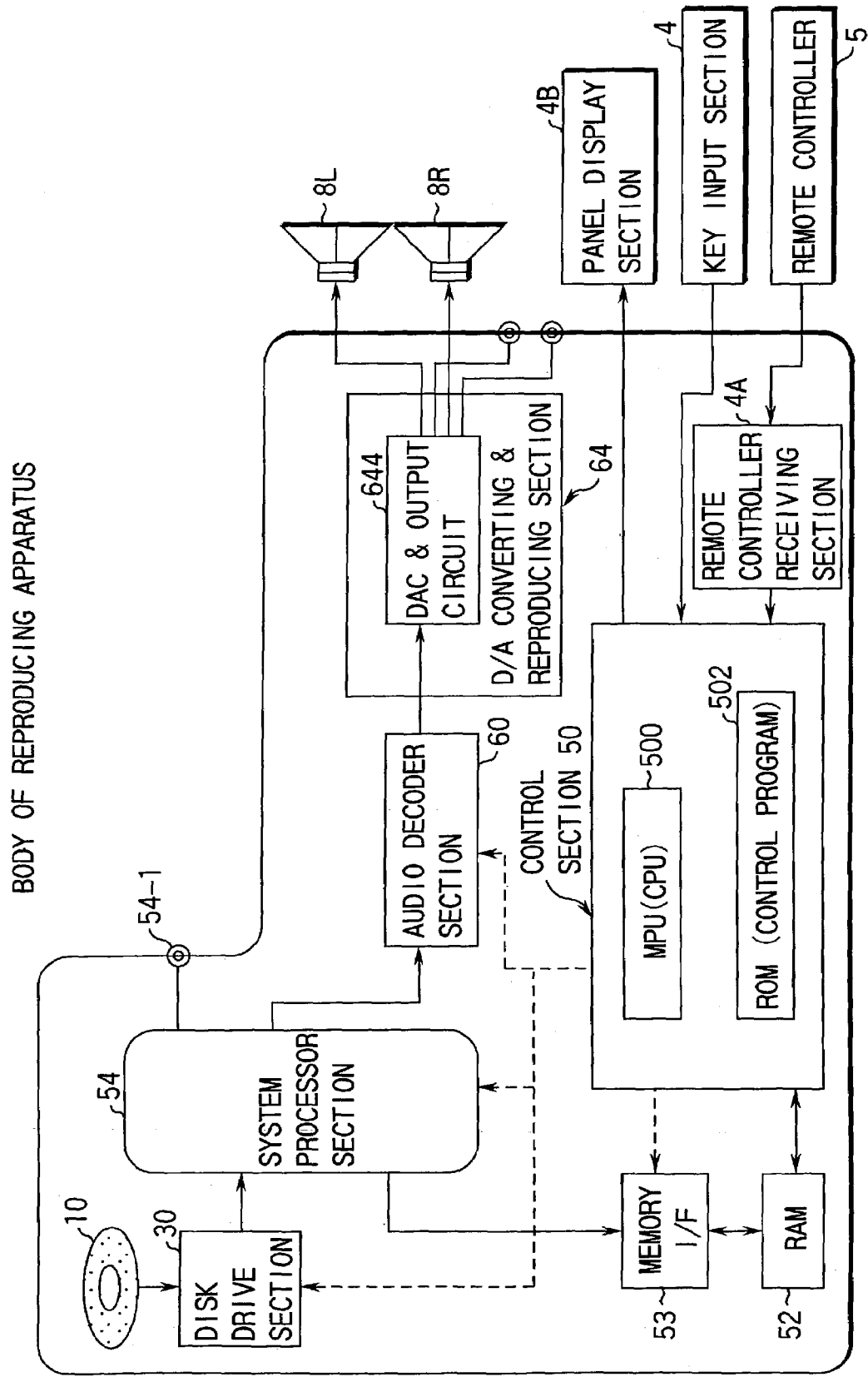
FIG. 39 is a block diagram of another example of the disk reproducing apparatus according to the present invention.

FIG. 39 shows a reproducing apparatus for playing back the DVD audio disk. Because the reproducing apparatus is a unit for reproducing only audio data, it has no system for processing video data and sub-picture data, as compared with the apparatus of FIG. 30. When a disk on which image data has been recorded is played pack, the reproducing apparatus simply ignores the image data periods.

Specifically, even when the image data has arrived, the system processor section 54 does not transfer the data to the audio decoder section 60. When the silent cell data has arrived, it transfers the data as audio data to the audio decoder section 60. The remaining sections are almost the same as those in FIG. 30.

Although in the above embodiment, the image data has been ignored completely, a terminal 54-1 for separating and extracting only the image data may be provided on the system processor section 54. With this configuration, the user can use a disk with images that he or she bought, by, for example, playing back the audio disk at home and supplying the image data to the decoder input terminal of a DVD player. An audio output terminal may, of course, be added.

With this reproducing apparatus, when the real-time information has been recorded on a disk, the data can be demodulated at the system control section 50 or a separately provided demodulating section and displayed on the panel display section 4B. In this case, it is desirable that the panel display section 4B should have, for example, a liquid-crystal screen. Various keys, including a ten-key pad, are used as the key input section 4.

Either type of disk playback apparatus must have the function of identifying the cell type.

Figure 40:
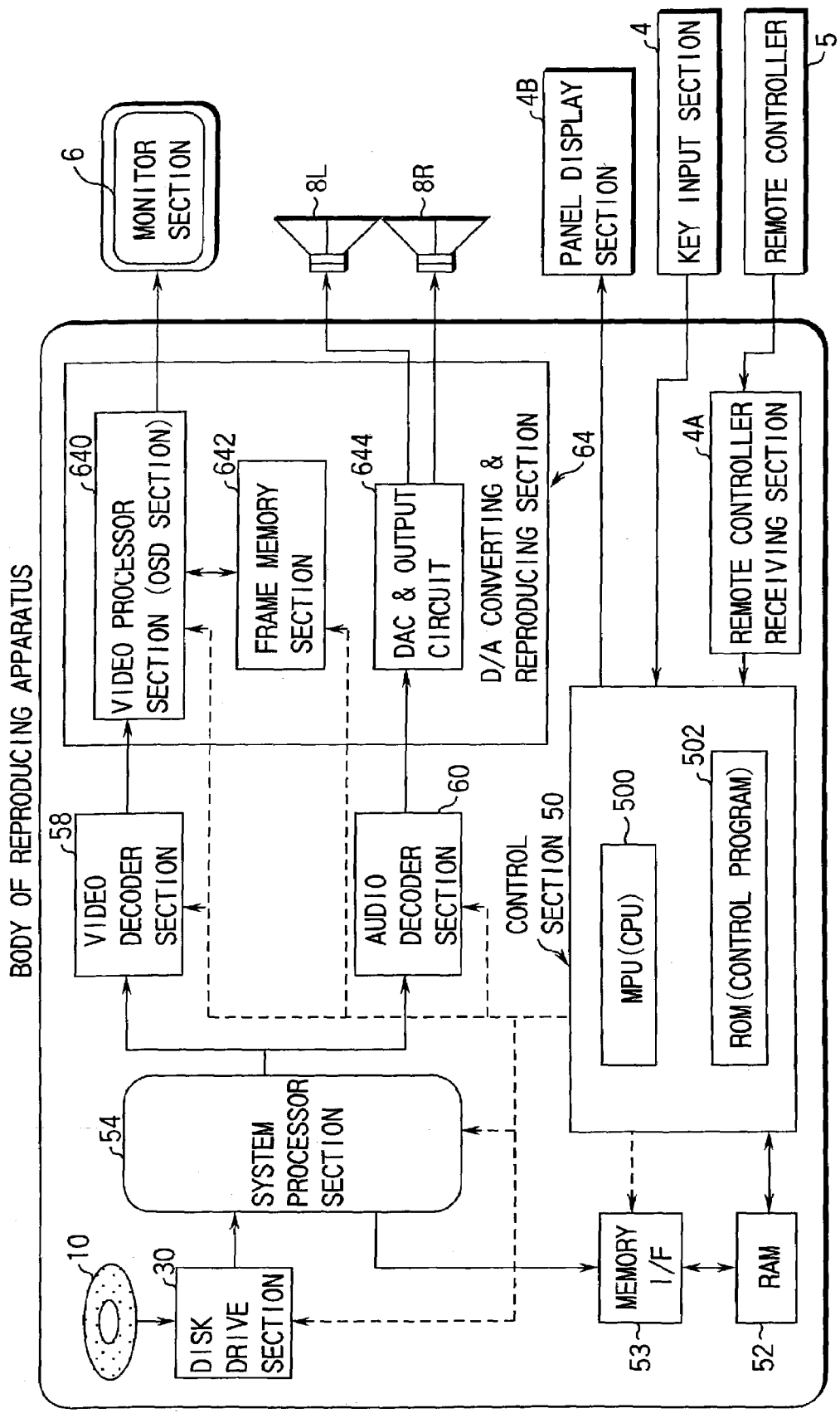
FIG. 40 is a block diagram of still another example of the disk reproducing apparatus according to the present invention.

FIG. 40 shows a reproducing apparatus capable of playing back a disk on which images have been recorded. When image data has been recorded on the disk, the reproducing apparatus reproduces the data and displays it on the monitor 6. When a disk of another type is played back, the reproducing apparatus operates as the apparatus of FIG. 39 does.

While the present invention has been explained using the recording medium and the disk playback apparatus, it may be applied to a case where the audio information defined as described above is transmitted via a transmitting unit and received by a receiving unit and thereafter reproduced. Furthermore, the invention may be applied to a case where a control signal for realizing the function of receiving and processing the aforementioned audio information is transmitted to a receiving unit and thereafter the audio information defined as described above is read from a transmitting or recording medium and reproduced.

INDUSTRIAL APPLICABILITY

As described above, the present invention produces the following effect. The audio attributes can be specified track by track. This causes a sound break problem, which is ascribed to a break in the necessary time for resetting the hardware environment of the player and in the audio output as a result of the change of the audio attributes.

To solve this problem, audio cells and silent cells have been defined and the arrangement of them been limited. The introduction of such a concept enables the content producer to positively manage and set the sound break time. For example, when tracks with sound breaks mingle with tracks with no sound break, silent periods of time can be standardized in any track by placing a silent cell at the head of each track with no sound break. This prevents the mixture of tracks with and without sound breaks from giving unnatural feeling to the user.

The invention claimed is:

1. An audio data recording medium, comprising:
   a video recording zone; and
   an audio recording zone,
   the audio recording zone including an audio manager area and an audio title set recording area configured to store an audio title set,
   the audio manager area being configured to store information used for accessing video information of the video recording zone,
   the audio title set recording area being configured to include an audio object area, a management table configured to describe an identifier of the audio set, a start address of the audio object, and an audio title set program chain information table configured to designate a reproduction order of the audio object,
   the audio object being configured to include a program that is configured to include a plurality of cells, each of the plurality of cells being configured to include a plurality of packs in which data is stored, each of the plurality of packs being configured to include an audio pack and a real time pack, the real time pack being configured to store additional data that is not video data,
   each of the plurality of cells being configured to include audio cells having data contents configured to be used for obtaining an audio output, and silent cells configured to include non-sound output data,
   the management table being configured to include an area in which a table of mixing coefficients is recorded, the table of mixing coefficients being configured to include mixing coefficients for signals for respective reproduction channels such that a plurality of reproduction channels used when the audio object is reproduced are changed to output channels that are smaller in number than a number of the plurality of reproduction channels,
   the audio title set program chain information table being configured to include audio title set program information, cell play back information configured to designate a reproduction order of the audio cells, and a table number of a mixing coefficient to be used,
   the cell playback information being configured to include cell type information that is configured to identify a type of the audio and the silent cells, a start and an end address of the audio and the silent cells, and cell index numbers of the audio and the silent cells, and the cell type information being configured to include information that is configured to identify an audio cell containing only audio data as "00b", to identify an audio cell containing both audio data and real-time information as "01b", and to identify a silent cell as "10b", the cell type information also being configured to include usage information that is configured to indicate that a corresponding cell constitutes a spotlight portion.

2. A reproduction method for reproducing audio information from an information recording medium,
   the information recording medium comprising:
   a video recording zone; and
   an audio recording zone, the audio recording zone including an audio manager area and an audio title set recording area configured to store an audio title set, the audio manager area being configured to store information used for accessing video information of the video recording zone, the audio title set recording area being configured to include an audio object area, a management table configured to describe an identifier of the audio set, a start address of the audio object, and an audio title set program chain information table configured to designate a reproduction order of the audio object, the audio object being configured to include a program that is configured to include a plurality of cells, each of the plurality of cells being configured to include a plurality of packs in which data is stored, each of the plurality of packs being configured to include an audio pack and a real time pack, the real time pack being configured to store additional data that is not video data, each of the plurality of cells being configured to include audio cells having data contents configured to be used for obtaining an audio output, and silent cells configured to include non-sound output data, the management table being configured to include an area in which a table of mixing coefficients is recorded, the table of mixing coefficients being configured to include mixing coefficients for signals for respective reproduction channels such that a plurality of reproduction channels used when the audio object is reproduced are changed to output channels that are smaller in number than a number of the plurality of reproduction channels, the audio title set program chain information table being configured to include audio title set program information, cell play back information configured to designate a reproduction order of the audio cells, and a table number of a mixing coefficient to be used, the cell playback information being configured to include cell type information that is configured to identify a type of the audio and the silent cells, a start and an end address of the audio and the silent cells, and cell index numbers of the audio and the silent cells, and the cell type information being configured to include information that is configured to identify an audio cell containing only audio data as "00b", to identify an audio cell containing both audio data and real-time information as "01b", and to identify a silent cell as "10b", the cell type information also being configured to include usage information that is configured to indicate that a corresponding cell constitutes a spotlight portion, wherein the method comprises:

reproducing information from the management table; and reproducing the audio object based on the information reproduced from the management table.

3. A reproduction apparatus for reproducing audio information from an information recording medium, the information recording medium comprising:

a video recording zone; and an audio recording zone, the audio recording zone including an audio manager area and an audio title set recording area configured to store an audio title set, the audio manager area being configured to store information used for accessing video information of the video recording zone, the audio title set recording area being configured to include an audio object area, a management table configured to describe an identifier of the audio set, a start address of the audio object, and an audio title set program chain information table configured to designate a reproduction order of the audio object, the audio object being configured to include a program that is configured to include a plurality of cells, each of the plurality of cells being configured to include a plurality of packs in which data is stored, each of the plurality of packs being configured to include an audio pack and a real time pack, the real time pack being configured to store additional data that is not video data, each of the plurality of cells being configured to include audio cells having data contents configured to be used for obtaining an audio output, and silent cells configured to include non-sound output data, the management table being configured to include an area in which a table of mixing coefficients is recorded, the table of mixing coefficients being configured to include mixing coefficients for signals for respective reproduction channels such that a plurality of reproduction channels used when the audio object is reproduced are changed to output channels that are smaller in number than a number of the plurality of reproduction channels, the audio title set program chain information table being configured to include audio title set program information, cell play back information configured to designate a reproduction order of the audio cells, and a table number of a mixing coefficient to be used, the cell playback information being configured to include cell type information that is configured to identify a type of the audio and the silent cells, a start and an end address of the audio and the silent cells, and cell index numbers of the audio and the silent cells, and the cell type information being configured to include information that is configured to identify an audio cell containing only audio data as "00b", to identify an audio cell containing both audio data and real-time information as "01b", and to identify a silent cell as "10b", the cell type information also being configured to include usage information that is configured to indicate that a corresponding cell constitutes a spotlight portion, the reproduction apparatus comprising:

means for reproducing information from the management table; and means for reproducing the audio object based on the information reproduced from the management table.

* * * * *